United States Patent
Yesane et al.

(10) Patent No.: US 11,986,753 B2
(45) Date of Patent: May 21, 2024

(54) SEALING SYSTEMS AND METHODS FOR A FILTRATION SYSTEM

(71) Applicant: CUMMINS FILTRATION IP, INC., Columbus, IN (US)

(72) Inventors: Swati Sakharam Yesane, Maharshtra (IN); Hariprasad Mohan Bhalerao, Pune (IN); Wassem Abdalla, Fishers, IN (US); Gerard Malgorn, Ergue Gaberic (FR); Mehvish Jamil, Lucknow (IN); Sunny Nabhiraj Masutage, Pune (IN); Gregory D. Shope, Cookeville, TN (US); Travis E. Goodlund, McFarland, WI (US); Prethi Thomas, Pune (IN); Philip Wayne Martin, Cookeville, TN (US); Joshua Luther Young, Livingston, TN (US); Nilay Shah, Gultekdi (IN); Alain Olier, Quimper (FR); Gauthier Hochart, Bannalec (FR)

(73) Assignee: CUMMINS FILTRATION IP, INC., Columbus, IN (US)

( * ) Notice: Subject to any disclaimer, the term of this patent is extended or adjusted under 35 U.S.C. 154(b) by 486 days.

(21) Appl. No.: 17/121,223

(22) Filed: Dec. 14, 2020

(65) Prior Publication Data
US 2021/0129049 A1 May 6, 2021

Related U.S. Application Data

(63) Continuation of application No. PCT/US2019/036726, filed on Jun. 12, 2019.

(51) Int. Cl.
*B01D 29/11* (2006.01)
*B01D 35/16* (2006.01)
(Continued)

(52) U.S. Cl.
CPC ............ *B01D 29/117* (2013.01); *B01D 35/16* (2013.01); *B01D 35/30* (2013.01); *F01M 11/03* (2013.01);
(Continued)

(58) Field of Classification Search
CPC ...... B01D 29/117; B01D 35/16; B01D 35/30; B01D 2201/291; B01D 2201/347;
(Continued)

(56) References Cited

U.S. PATENT DOCUMENTS

| 4,619,764 A | 10/1986 | Church et al. |
| 4,906,365 A | 3/1990 | Baumann et al. |

(Continued)

FOREIGN PATENT DOCUMENTS

| CN | 1756582 A | 4/2006 |
| CN | 101730570 A | 6/2010 |

(Continued)

OTHER PUBLICATIONS

First Examination Report for Indian Patent App. No. 865/DELNP/2009 dated Jun. 12, 2017, 8 pages.
(Continued)

*Primary Examiner* — Madeline Gonzalez
(74) *Attorney, Agent, or Firm* — Foley & Lardner LLP

(57) ABSTRACT

A filter assembly includes a filter housing, a filter housing lid, a filter cartridge, an endplate, and a seal member. The filter housing defines a first cavity and comprises a return passage in fluid communication with the first cavity. The filter housing lid is selectively coupled to the filter housing and defines a second cavity coextensive with the first cavity. The filter cartridge is positioned within the first cavity. The endplate is coupled to a first end of the filter cartridge. The endplate is configured to interface with the filter housing. The seal member is coupled to the endplate and is configured (Continued)

to be received in the return passage. The endplate is configured to partially separate the filter housing from the filter cartridge.

25 Claims, 62 Drawing Sheets

(51) Int. Cl.
*B01D 35/30* (2006.01)
*F01M 11/03* (2006.01)
*F02M 37/32* (2019.01)
*F16N 39/06* (2006.01)
(52) U.S. Cl.
CPC ....... *F02M 37/32* (2019.01); *B01D 2201/291* (2013.01); *B01D 2201/347* (2013.01); *B01D 2201/4092* (2013.01); *F16N 39/06* (2013.01)
(58) Field of Classification Search
CPC .... B01D 2201/4092; B01D 2201/0415; B01D 2201/295; B01D 2271/027; B01D 29/21; B01D 35/153; F01M 11/03; F02M 37/32; F16N 39/06; F16N 2039/065
USPC ...................... 210/435, 450, 493.2, 248, 194
See application file for complete search history.

(56) References Cited

U.S. PATENT DOCUMENTS

| | | | |
|---|---|---|---|
| 5,098,559 A | 3/1992 | Mack et al. | |
| 5,468,386 A | 11/1995 | Ardes | |
| 5,520,801 A | 5/1996 | Gerber et al. | |
| 5,718,825 A | 2/1998 | Greive et al. | |
| 5,906,733 A | 5/1999 | Purvey | |
| 6,068,762 A | 5/2000 | Stone et al. | |
| 6,308,836 B1 | 10/2001 | Guichaoua et al. | |
| 6,319,402 B1 | 11/2001 | Schwandt et al. | |
| 6,506,303 B1 | 1/2003 | Gustafsson et al. | |
| 6,543,625 B1 | 4/2003 | Le Roux et al. | |
| 6,544,412 B2 | 4/2003 | Michels et al. | |
| 6,554,139 B1 | 4/2003 | Maxwell et al. | |
| 6,555,000 B2 | 4/2003 | Knight | |
| 6,837,993 B2 | 1/2005 | Clausen et al. | |
| 6,910,692 B2 | 6/2005 | Malone et al. | |
| 6,936,162 B1 | 8/2005 | McKenzie | |
| 6,983,851 B2 | 1/2006 | Maxwell et al. | |
| 6,986,426 B2 | 1/2006 | Clausen et al. | |
| 7,086,537 B2 | 8/2006 | Maxwell et al. | |
| 7,175,761 B2 | 2/2007 | Stanhope et al. | |
| 7,204,370 B2 | 4/2007 | Clausen et al. | |
| 7,329,342 B2 | 2/2008 | Faria | |
| 7,335,300 B1 | 2/2008 | Stamey et al. | |
| 7,360,658 B2 | 4/2008 | Clausen et al. | |
| 7,384,547 B2 | 6/2008 | Evanovich et al. | |
| 7,410,575 B1 | 8/2008 | Crawford et al. | |
| 7,435,341 B2 | 10/2008 | Crawford et al. | |
| 7,543,711 B1 | 6/2009 | Stamey et al. | |
| 7,572,306 B2 | 8/2009 | Hawkins et al. | |
| 7,682,507 B2 | 3/2010 | Stamey et al. | |
| 8,034,240 B2 | 10/2011 | Reiland et al. | |
| 8,083,938 B2 | 12/2011 | Lepine et al. | |
| 8,092,690 B2 | 1/2012 | Stamey et al. | |
| 8,119,002 B2 | 2/2012 | Schiavon et al. | |
| 8,127,934 B2 | 3/2012 | Stamey et al. | |
| 8,128,819 B2 | 3/2012 | Beard et al. | |
| 8,168,066 B2 | 5/2012 | Wieczorek et al. | |
| 8,231,781 B2 | 7/2012 | Lepine et al. | |
| 8,349,173 B2 | 1/2013 | Evanovich et al. | |
| 8,425,769 B2 | 4/2013 | Gift et al. | |
| 8,465,643 B2 | 6/2013 | Beard et al. | |
| 8,480,885 B2 | 7/2013 | Bryson et al. | |
| 8,561,808 B2 | 10/2013 | Van Savooijen et al. | |
| 8,727,134 B2 * | 5/2014 | Jokschas | F01M 11/03 5/492 |
| 9,266,044 B2 | 2/2016 | Van Savooijen et al. | |
| 9,433,881 B2 | 9/2016 | Schiavon et al. | |
| 2002/0100720 A1 | 8/2002 | Jainek | |
| 2002/0108897 A1 | 8/2002 | Pavlin et al. | |
| 2003/0127384 A1 | 7/2003 | Kapur | |
| 2004/0094464 A1 | 5/2004 | Baumann et al. | |
| 2004/0206682 A1 | 10/2004 | Hamlin et al. | |
| 2004/0232063 A1 | 11/2004 | Cline et al. | |
| 2005/0279958 A1 | 12/2005 | Baumann | |
| 2006/0118475 A1 | 6/2006 | Girondi | |
| 2006/0118476 A1 | 6/2006 | Weindorf et al. | |
| 2006/0207948 A1 | 9/2006 | Hacker et al. | |
| 2007/0215561 A1 | 9/2007 | Yates et al. | |
| 2008/0035587 A1 | 2/2008 | Wieczorek et al. | |
| 2012/0199522 A1 | 8/2012 | Weindorf | |
| 2013/0025246 A1 * | 1/2013 | Burns | B01D 29/232 55/498 |
| 2014/0091029 A1 | 4/2014 | Van Savooijen et al. | |
| 2014/0202939 A1 | 7/2014 | Luther et al. | |
| 2014/0284266 A1 | 9/2014 | Kamp et al. | |
| 2015/0265948 A1 | 9/2015 | Ellison et al. | |
| 2015/0283486 A1 | 10/2015 | Fisher | |
| 2016/0023145 A1 | 1/2016 | Greco et al. | |
| 2017/0209821 A1 | 7/2017 | Allott et al. | |
| 2018/0333661 A1 | 11/2018 | Vogt | |
| 2018/0333663 A1 | 11/2018 | Vogt | |

FOREIGN PATENT DOCUMENTS

| | | |
|---|---|---|
| DE | 35 38 589 A1 | 5/1987 |
| DE | 19538883 A1 | 4/1997 |
| DE | 10064482 A1 | 7/2002 |
| EP | 1 047 485 B1 | 11/2000 |
| EP | 1 216 740 A1 | 6/2002 |
| EP | 1 616 611 A1 | 1/2006 |
| FR | 3078895 A1 | 1/2022 |
| JP | 3834402 | 10/2006 |
| WO | WO-2004/069373 A1 | 8/2004 |
| WO | WO-2008/021902 A1 | 2/2008 |

OTHER PUBLICATIONS

International Search Report & Written Opinion for PCT/US2008/067328, dated Dec. 30, 2008, 8 pages.
International Search Report and Written Opinion issue for PCT Application No. PCT/US2019/036726, dated Aug. 30, 2019, 21 pages.
Office Action for German Patent App. No. 112007001880.1 dated Feb. 6, 2018, 23 pages (with English translation).
Office Action issued for Chinese Patent Application No. CN 201980040107.X dated Jun. 2, 2022, 15 pages.
First Office Action issued for Chinese Patent Application No. CN 201980040107.X dated Oct. 25, 2021, 12 pages.
Non-Final Office Action issued for U.S. Appl. No. 17/241,463 dated Jan. 20, 2023.

* cited by examiner

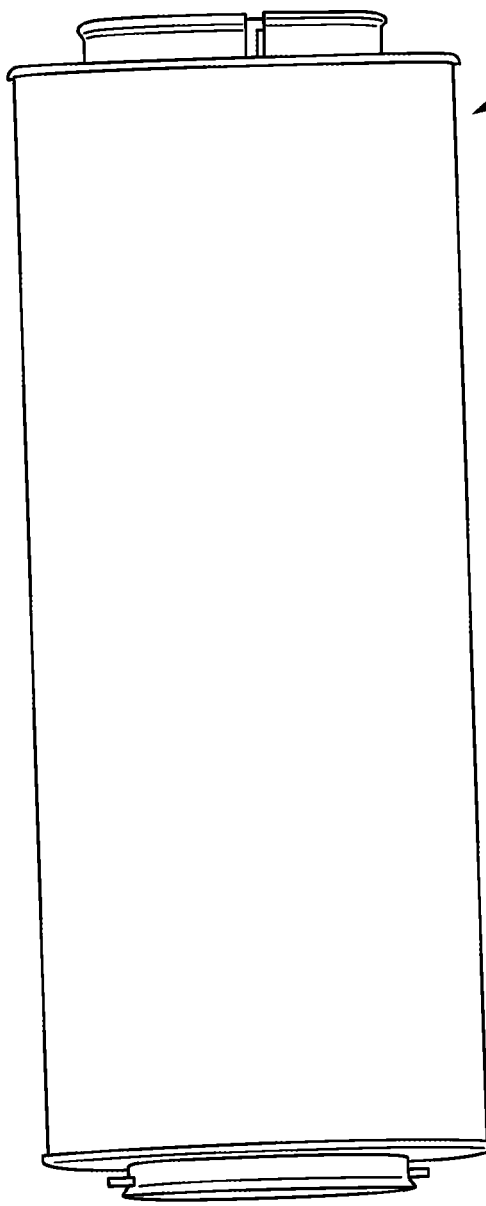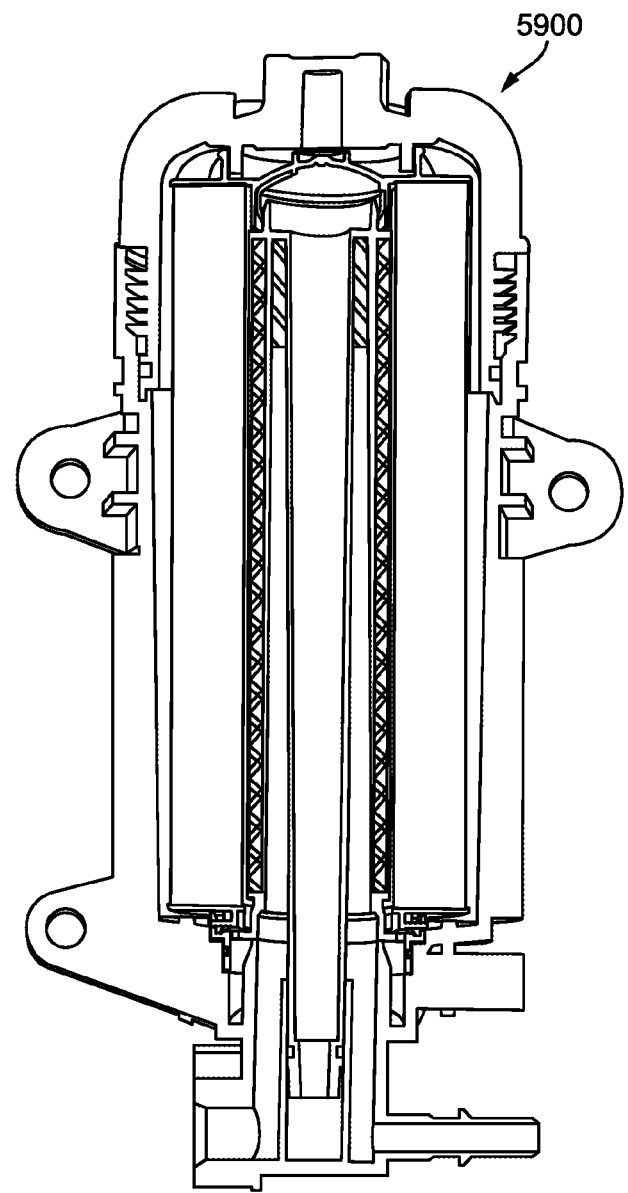
FIG. 64  FIG. 65

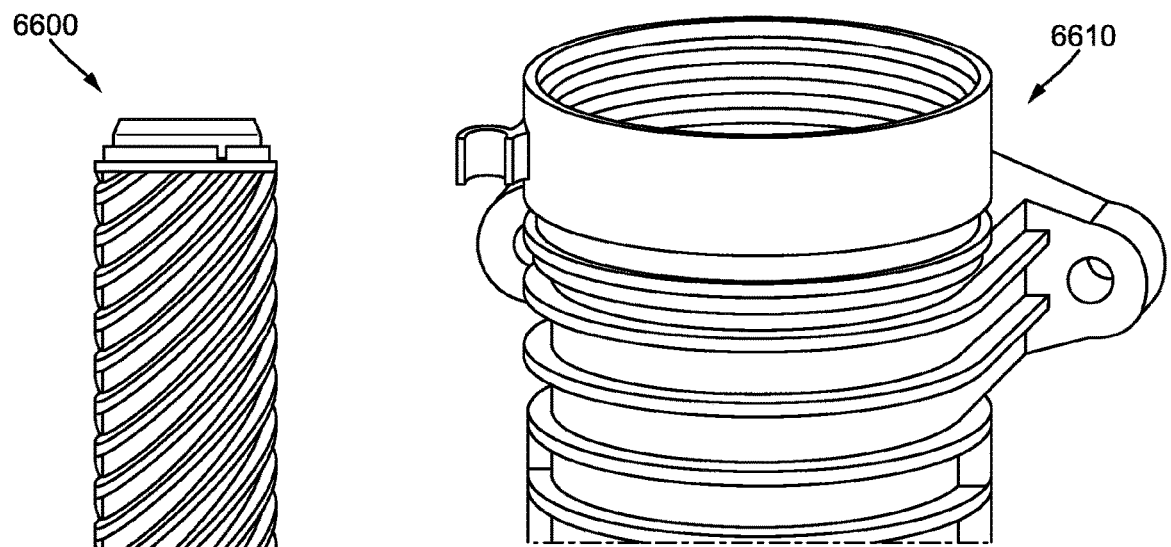
FIG. 67
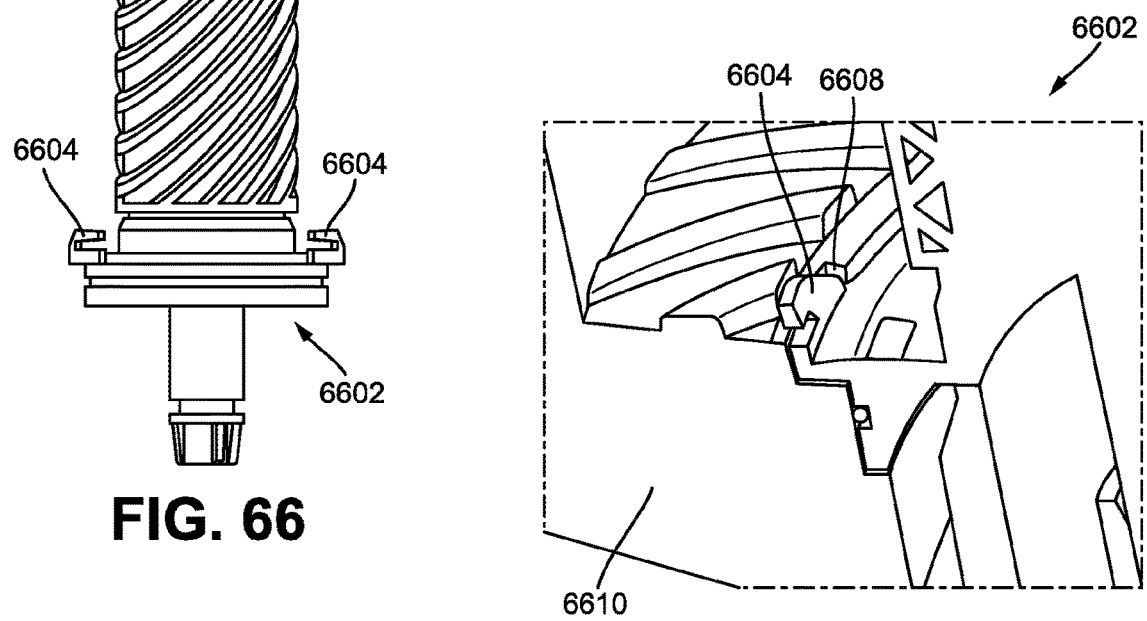
FIG. 66
FIG. 68

SEALING SYSTEMS AND METHODS FOR A FILTRATION SYSTEM

CROSS-REFERENCE TO RELATED APPLICATION

The present application is a continuation of PCT Application No. PCT/US2019/036726, filed Jun. 12, 2019, which claims priority to Indian Provisional Application No. 201841022594, entitled "Sealing Systems and Methods for a Filtration System" and filed Jun. 16, 2018. The contents of these applications are hereby incorporated by reference in their entirety.

TECHNICAL FIELD

The present application relates to sealing systems and methods for use in a filter assembly for a fluid system of an internal combustion engine.

BACKGROUND

Internal combustion engines utilize various fluid systems. These fluid systems include or may include filters. These filters may be changed periodically. Changing of these filters may be a difficult and dirty process. For example, removing the filter may cause fluid to leak onto an operator or components surrounding the internal combustion engine (e.g., frames, electrical components, etc.). Additionally, changing the filter may be a difficult process requiring the use of specialized tools.

SUMMARY

One implementation relates to a filter assembly. The filter assembly includes a filter housing, a filter cartridge, an endplate, and a seal member. The filter housing defines a first cavity and includes a return passage in fluid communication with the first cavity. The filter cartridge is positioned within the first cavity. The endplate is coupled to a first end of the filter cartridge. The endplate is configured to partially separate the filter housing from the filter cartridge. The seal member is coupled to the endplate and configured to be received in the return passage.

Another implementation relates to a filter cartridge assembly. The filter cartridge assembly includes a filter cartridge, a top endplate, a bottom endplate, and a seal member. The top endplate is coupled to a first end of the filter cartridge. The bottom endplate is coupled to a second end of the filter cartridge. The second end is opposite the first end. The bottom endplate includes a bottom endplate flange. The bottom endplate flange interfaces with the filter cartridge. The seal member is coupled to the bottom endplate and separated from the filter cartridge by the bottom endplate flange.

Yet another implementation relates to a filter assembly for a filter cartridge assembly, the filter assembly including a filter housing configured to receive the filter cartridge assembly. The filter housing includes a filter housing inlet, a filter housing outlet, and a return passage. The filter housing inlet is configured to provide fluid to the filter cartridge assembly when the filter cartridge assembly is received within the filter housing. The filter housing outlet is configured to receive fluid from the filter cartridge assembly when the filter cartridge assembly is received within the filter housing. The return passage is configured to removably receive a seal member coupled to the filter cartridge assembly when the filter cartridge assembly is received within the filter housing, the return passage configured to receive fluid when the filter cartridge assembly is removed from the filter housing and configured to be isolated from fluid within the filter cartridge assembly when the seal member is received within the return passage.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 64 shows a perspective view of a portion of a filter assembly according to an example embodiment.
FIG. 65 shows a cross-sectional view of another portion of a filter assembly.
FIG. 66 shows a perspective view of another portion of a filter assembly.
FIG. 67 shows a perspective view of another portion of a filter assembly.
FIG. 68 shows a perspective view of another portion of a filter assembly.

DETAILED DESCRIPTION

In cartridge type top load filter assembly designs, while installing the cartridge the bottom end plate creates an internal seal. The cartridge has three sides: a clean side, a dirty side, and a return passage to fuel tank. During servicing, it is preferred to have clean servicing and self-draining. For example, it is desirable for an operator to be able to remove the cartridge without dirtying the operator or otherwise creating an excessive mess. Additionally, it is desirable for a cartridge to drain itself while it is being removed or once it is removed such that the fluid contained in the cartridge is drained from the vicinity without any additional operation.

Other filters may not have a seal that can hold the clean fluid till the dirty side fluid gets drained to the tank. Similarly, all the aforementioned seals are not available in the market for any filter product. Few concepts directly provide sealing at the required location without adding a new part or a rubber seal. Depending on the fluid volume, a sealing feature (i.e. the delaying length) of the seal can be further modified so that clean fluid can be hold for a longer or shorter time. The delaying length feature can be added on rubber gaskets also.

Figure 1:
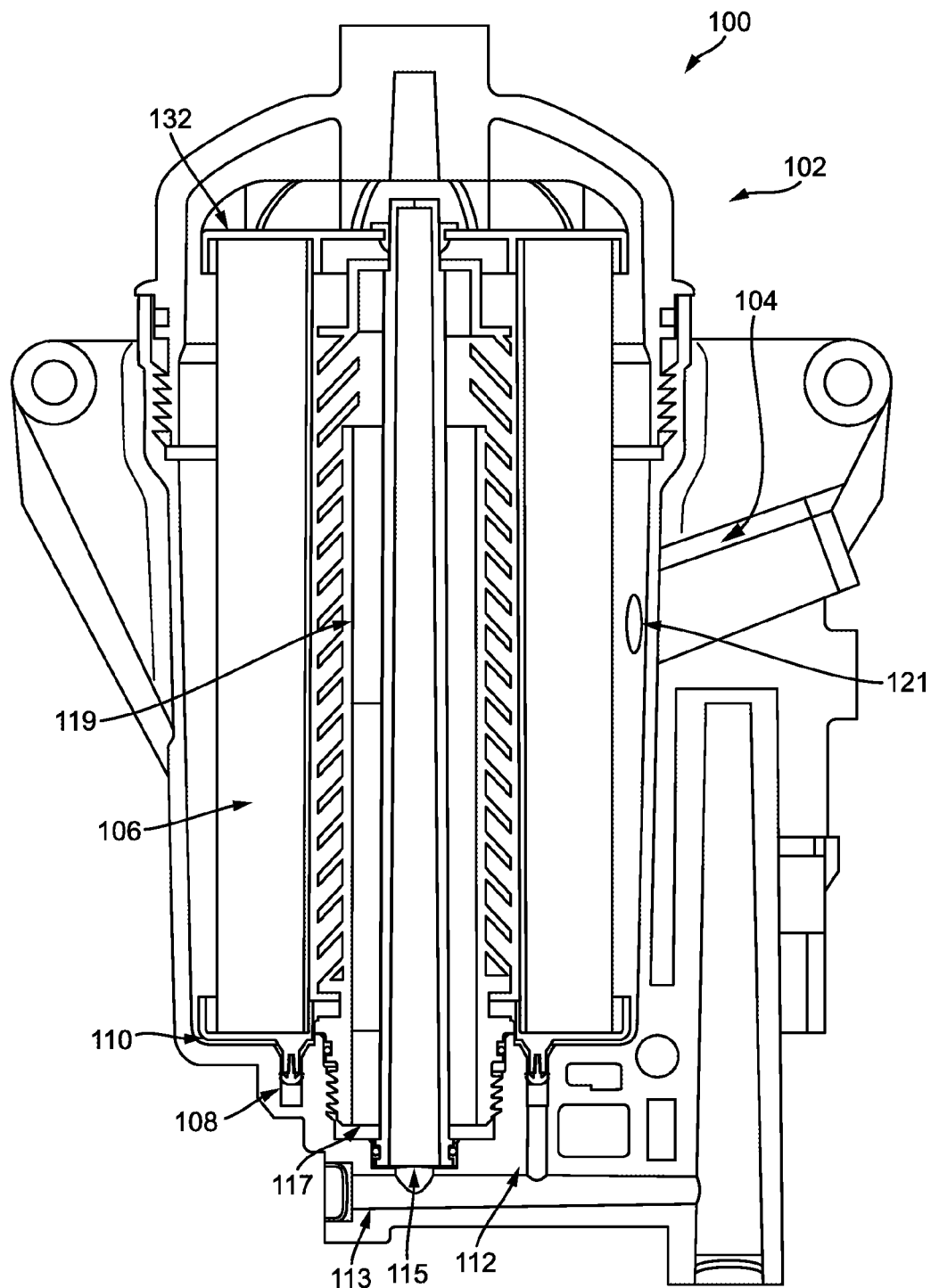
FIG. 1 shows a cross-sectional view of a filter assembly according to an example embodiment.
Figure 2:
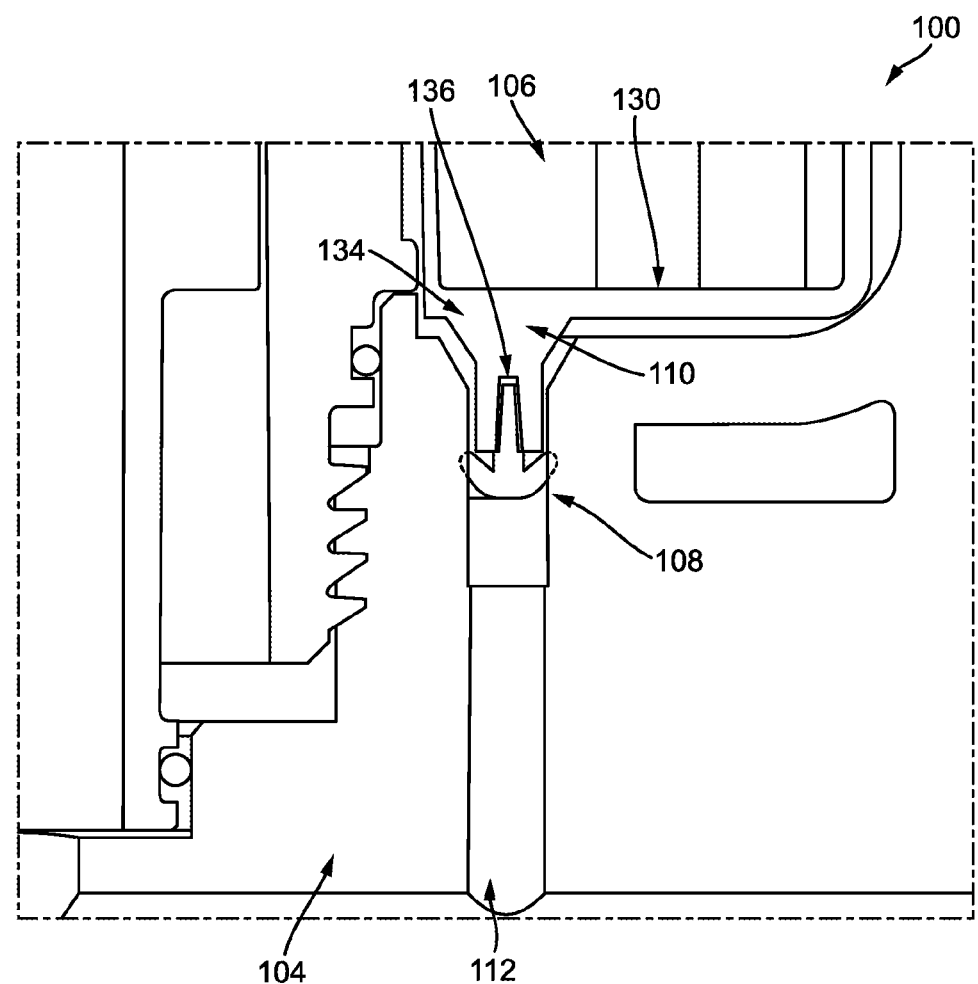
FIG. 2 shows a detailed view of a portion of FIG. 1.

Referring to FIG. 1, a cross-sectional view of a filter assembly 100 is shown according to an example embodiment. The filter assembly 100 includes a filter housing lid 102, a filter housing 104, a filter cartridge 106, a seal member 108, a bottom endplate 110 (e.g., endcap, etc.), and a return passage 112. The filter housing lid 102 may be included as part of the filter housing 104. The filter cartridge 106 interfaces with the bottom endplate 110. The bottom endplate 110 interfaces with the seal member 108. The seal member 108 is positioned within the return passage 112. The return passage 112 is configured to be in fluid communication with a fuel tank and/or an oil pan. The bottom endplate 110 facilitates sealing across the inner pocket of the housing separating clean and dirty side of the filter. Referring to FIG. 2, a detailed view of a portion of the filter assembly 100 is shown according to an example embodiment.

The return passage 112 is in fluid communication with an inlet passage 113 in the filter housing 104. The inlet passage 113 receives a fluid (e.g., fuel, oil, etc.) from a fluid source (e.g., fuel tank, oil pan, etc.) and provides the fluid to a filter housing inlet 115. The filter assembly 100 includes a filter cartridge inlet 117 that is configured to receive the fluid from the filter housing inlet 115. In some embodiments, the filter cartridge inlet 117 is coupled to (e.g., threaded into, etc.) the filter housing inlet 115. In this way, fluid from the return passage 112 flows into the inlet passage 113 and may flow either towards the fluid source or may flow through the filter housing inlet 115 into the filter cartridge inlet 117. After flowing through the filter cartridge inlet 117, the fluid flows within a filter cartridge cavity 119 and flows through the filter cartridge 106 (e.g., radially outward, etc.). After flowing through the filter cartridge 106, the fluid exits the filter cartridge 106 and flows into a cavity between the filter cartridge 106 and the filter housing 104 and/or the filter housing lid 102. The fluid exits this cavity through a filter housing outlet 121. The filter housing outlet 121 is in fluid communication with a cavity between the filter cartridge 106 and the filter housing 104. The filter cartridge cavity 119 is cylindrical in various embodiments. The return passage 112 has a first width (e.g., diameter, etc.) that is less than a second width (e.g., diameter, etc.) of the filter cartridge inlet 117.

The filter cartridge 106 is installed via the filter housing lid 102 (e.g., in a "top side" manner, etc.). As a result, the filter cartridge 106 may be removed with the fluid substantially draining from the filter cartridge 106 into the filter housing 104 via gravity. Additionally, the filter cartridge 106 has features on the bottom side thereof which establish a seal within the return passage 112 when the filter cartridge 106 is installed in the filter housing 104. This seal will break when a cartridge is removed for servicing & allows liquid from filter housing drained to separate reservoir as fuel tank, oil sump, etc.

The filter housing lid 102 contains retaining elements to engage the filter cartridge 106 while removing the filter. The filter housing lid 102 has a hex shape for relatively simple removal.

The bottom endplate 110 includes a bottom endplate flange 130 that interfaces with the filter cartridge 106. Specifically, the filter cartridge 106 is held by the bottom endplate flange 130 against a top endplate 132. The bottom endplate flange 130 is annular (e.g., circular, etc.). The bottom endplate 110 also includes an endplate projection 134 (e.g., rib, etc.). The endplate projection 134 extends (e.g., projects, etc.) from the bottom endplate flange 130 opposite the filter cartridge 106. The endplate projection 134 is annular or extends annularly (e.g., in discontinuous segments disposed annularly, etc.) along the bottom endplate flange 130. The endplate projection 134 is configured to be aligned with (e.g., centered on, etc.) the return passage 112. The endplate projection 134 includes an endplate aperture 136. The endplate aperture 136 is annular or extends annularly along the endplate projection 134. The endplate aperture 136 is configured to receive the seal member 108 and be coupled to the seal member 108. For example, the seal member 108 may be inserted into the endplate aperture 136 and adhesively bonded to or overmolded onto the endplate aperture 136. When the seal member 108 is inserted into the return passage 112, the endplate projection 134 may be partially received within the return passage 112. The endplate projection 134 may be separated from the return passage 112 due to an interaction between the seal member 108 and the return passage 112.

The filter cartridge 106, the seal member 108, the bottom endplate 110, and the top endplate 132 form a filter cartridge assembly. The filter cartridge assembly may be sold individually and used with the filter assembly 100 (e.g., one filter cartridge assembly may be replaced with another filter cartridge assembly, etc.).

The filter assembly 100 provides many benefits compared to other filters. For example, unlike other filters, after removal of the filter cartridge 106 the dead volume inside the filter assembly 100 will be minimized. Additionally, the filter assembly 100 does not require additional operations to drain fluid from the vicinity before servicing of the filter assembly 100. Furthermore, an operator is able to remove the filter cartridge 106 without dirtying his hands.

The seal member 108 and the bottom endplate 110 are constructed from different materials in some embodiments. For example, the seal member 108 may be constructed from a deformable material, such as rubber, a polymer, nylon, nitrile rubber, gasket material, O-ring material, or other similar materials, and the bottom endplate 110 may be constructed from metal (e.g., aluminum, etc.), plastic (e.g., high temperature plastic, thermoset plastic, etc.), or other similar material.

Figure 3:
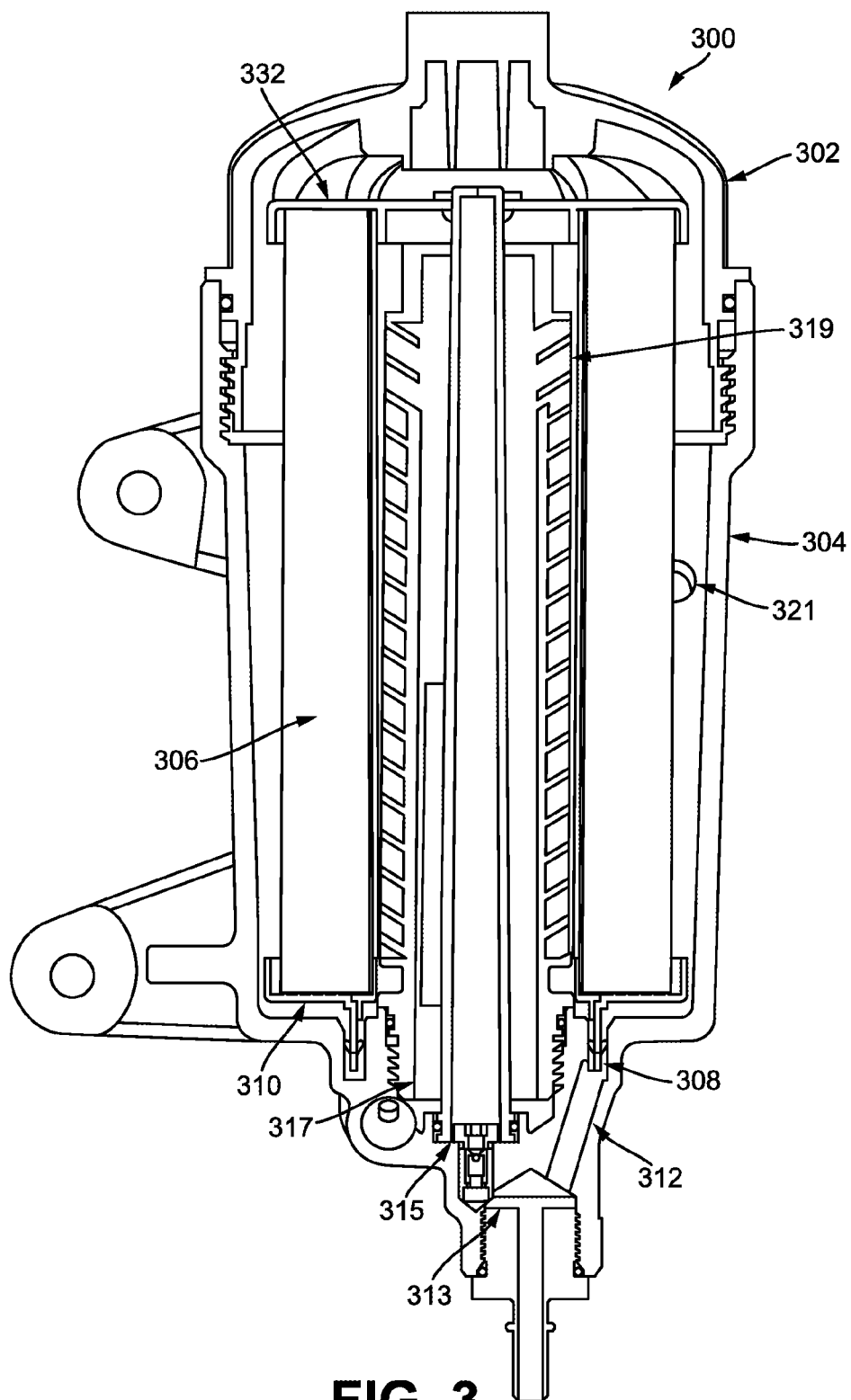
FIG. 3 shows a cross-sectional view of a filter assembly according to another example embodiment.

Referring to FIG. 3, a cross-sectional view of a filter assembly 300 is shown according to an example embodiment. The filter assembly 300 includes a filter lid 302, a filter housing 304, a filter cartridge 306, a seal member 308, a bottom endplate 310, and a return passage 312. The filter housing lid 302 may be included as part of the filter housing 304. The filter cartridge 306 interfaces with the bottom endplate 310. The bottom endplate 310 interfaces with the seal member 308. The seal member 308 is positioned within the return passage 312. The return passage 312 is configured to be in fluid communication with a fuel tank and/or an oil pan. The bottom endplate 310 facilitates sealing across the inner pocket of the housing separating clean and dirty side of the filter. The return passage 312 is integrated into the filter housing 304.

The return passage 312 is in fluid communication with an inlet passage 313 in the filter housing 304. The inlet passage 313 receives a fluid from a fluid source and provides the fluid to a filter housing inlet 315. The filter assembly 300 includes a filter cartridge inlet 317 that is configured to receive the fluid from the filter housing inlet 315. In some embodiments, the filter cartridge inlet 317 is coupled to (e.g., threaded into, etc.) the filter housing inlet 315. In this way, fluid from the return passage 312 flows into the inlet passage 313 and may flow either towards the fluid source or may flow through the filter housing inlet 315 into the filter cartridge inlet 317. After flowing through the filter cartridge inlet 317, the fluid flows within a filter cartridge cavity 319 and flows through the filter cartridge 306 (e.g., radially outward, etc.). After flowing through the filter cartridge 306, the fluid exits the filter cartridge 306 and flows into a cavity between the filter cartridge 306 and the filter housing 304 and/or the filter lid 302. The fluid exits this cavity through a filter housing outlet 321. The filter housing outlet 321 is in fluid communication with a cavity between the filter cartridge 306 and the filter housing 304. The filter cartridge cavity 319 is cylindrical in various embodiments. The return passage 312 has a first width (e.g., diameter, etc.) that is less than a second width (e.g., diameter, etc.) of the filter cartridge inlet 317.

The bottom endplate 310 includes a bottom endplate flange 330 that interfaces with the filter cartridge 306. Specifically, the filter cartridge 306 is held by the bottom endplate flange 330 against a top endplate 332. The bottom endplate flange 330 is annular (e.g., circular, etc.). The bottom endplate 310 also includes an endplate projection 334 (e.g., rib, etc.). The endplate projection 334 extends (e.g., projects, etc.) from the bottom endplate flange 330 opposite the filter cartridge 306. The endplate projection 334 is annular or extends annularly (e.g., in discontinuous segments disposed annularly, etc.) along the bottom endplate flange 330. The endplate projection 334 is configured to be aligned with (e.g., centered on, etc.) the return passage 312. The endplate projection 334 is configured to receive the seal member 308 and be coupled to the seal member 308. For example, the endplate projection 334 may be inserted into an aperture in the seal member 308 and adhesively bonded to or overmolded onto the seal member 308. When the seal member 308 is inserted into the return passage 312, the endplate projection 334 may be partially received within the return passage 312. The endplate projection 334 may be separated from the return passage 312 due to an interaction between the seal member 308 and the return passage 312.

Figure 4:
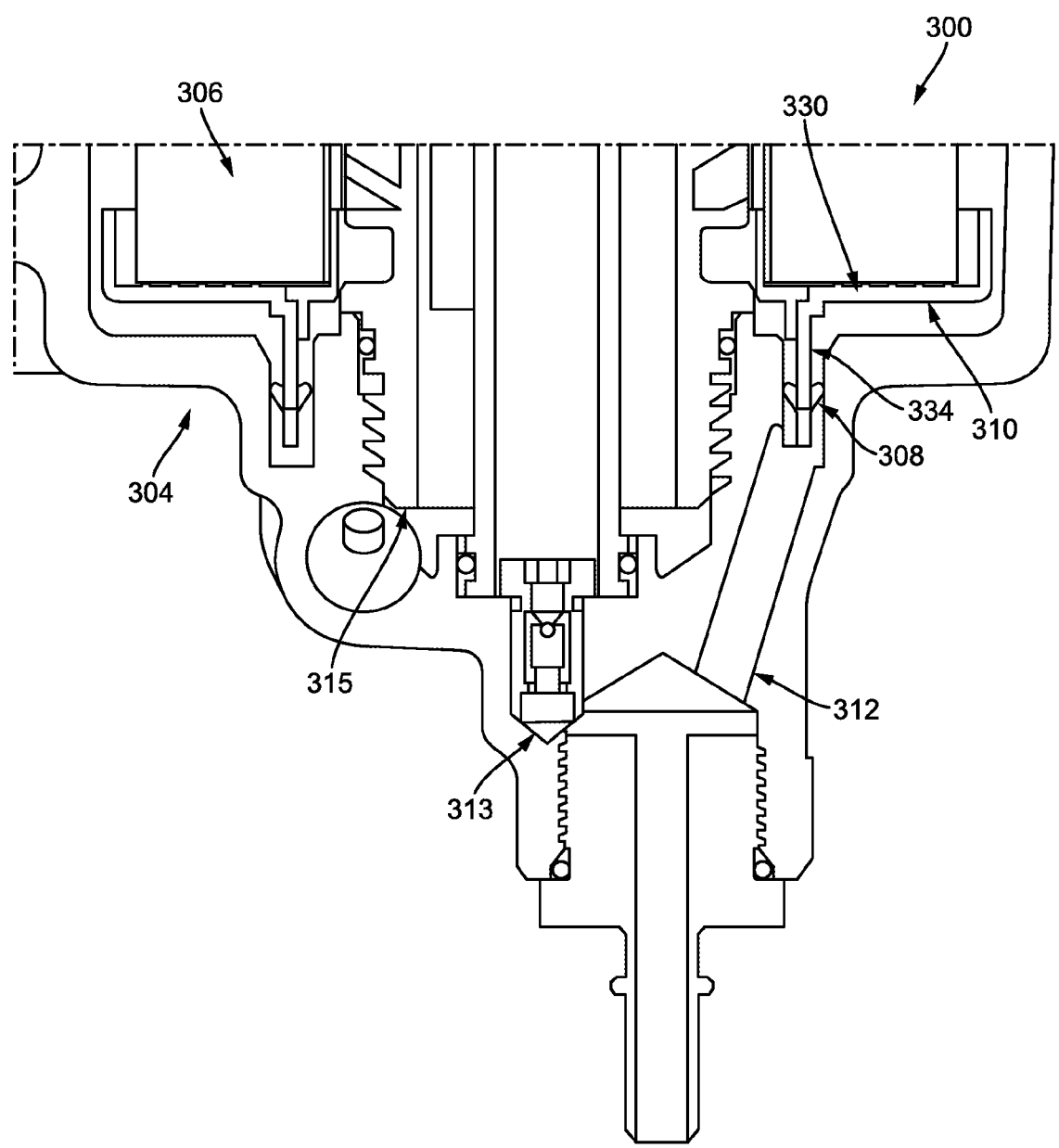
FIG. 4 shows a detailed view of a portion of FIG. 3.
Figure 5:
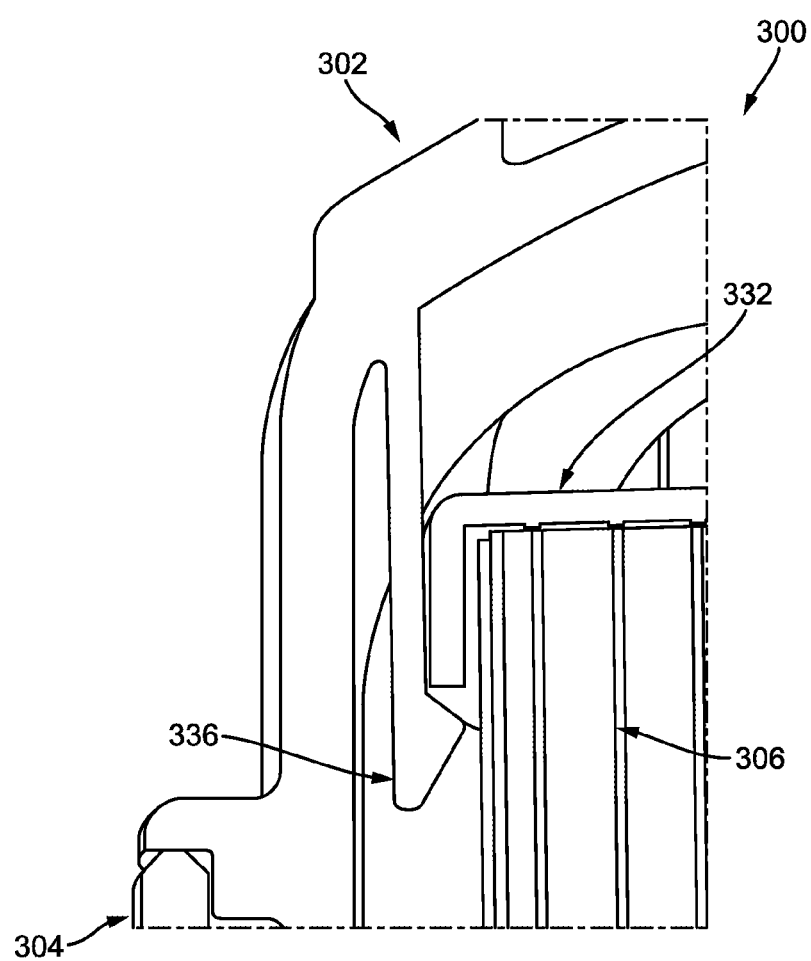
FIG. 5 shows another detailed view of a portion of FIG. 3.

The filter lid 302 contains retaining elements 336 to engage the top endplate 332 while removing the filter cartridge 306 from the filter housing 304. After the filter cartridge 306 has been removed from the filter housing 304, the retaining elements 336 may be biased radially outwards and the filter cartridge 306 may be removed from the filter lid 302. The filter lid 302 has a hex shape for relatively simple removal. Referring to FIG. 4, a detailed view of a portion of the filter assembly 300 is shown according to an example embodiment. Referring to FIG. 5, another detailed view of a portion of the filter assembly 300 is shown according to an example embodiment.

The filter cartridge 306, the seal member 308, the bottom endplate 310, and the top endplate 332 form a filter cartridge assembly. The filter cartridge assembly may be sold individually and used with the filter assembly 300 (e.g., one filter cartridge assembly may be replaced with another filter cartridge assembly, etc.).

The seal member 308 and the bottom endplate 310 are constructed from different materials in some embodiments. For example, the seal member 308 may be constructed from a deformable material, such as rubber, a polymer, nylon, nitrile rubber, gasket material, O-ring material, or other similar materials and the bottom endplate 310 may be constructed from metal (e.g., aluminum, etc.), plastic (e.g., high temperature plastic, thermoset plastic, etc.), or other similar material.

Figure 6:
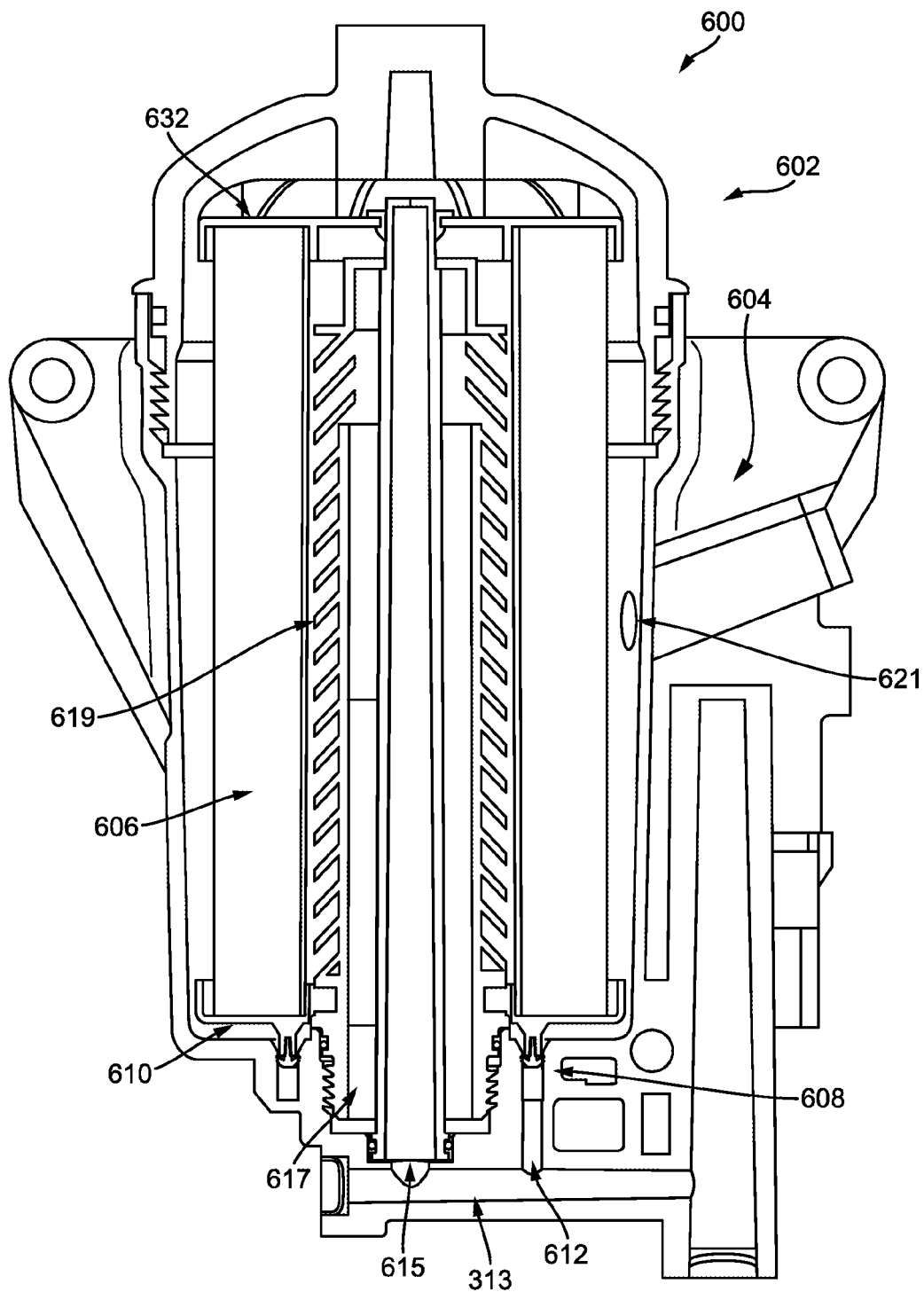
FIG. 6 shows a cross-sectional view of a filter assembly according to another example embodiment.

Referring to FIG. 6, a cross-sectional view of a filter assembly 600 is shown according to an example embodiment. The filter assembly 600 includes a filter lid 602, a filter housing 604, a filter cartridge 606, a seal member 608, a bottom endplate 610, and a return passage 612. The filter housing lid 602 may be included as part of the filter housing 604. The filter cartridge 606 interfaces with the bottom endplate 610. The bottom endplate 610 interfaces with the seal member 608. The seal member 608 is positioned within the return passage 612. The return passage 612 is configured to be in fluid communication with a fuel tank and/or an oil pan. The bottom endplate 610 facilitates sealing across the inner pocket of the housing separating clean and dirty side of the filter. The return passage 612 is integrated into the filter housing 604.

The return passage 612 is in fluid communication with an inlet passage 613 in the filter housing 604. The inlet passage 613 receives a fluid from a fluid source and provides the fluid to a filter housing inlet 615. The filter assembly 600 includes a filter cartridge inlet 617 that is configured to receive the fluid from the filter housing inlet 615. In some embodiments, the filter cartridge inlet 617 is coupled to (e.g., threaded into, etc.) the filter housing inlet 615. In this way, fluid from the return passage 612 flows into the inlet passage 613 and may flow either towards the fluid source or may flow through the filter housing inlet 615 into the filter cartridge inlet 617. After flowing through the filter cartridge inlet 617, the fluid flows within a filter cartridge cavity 619 and flows through the filter cartridge 606 (e.g., radially outward, etc.). After flowing through the filter cartridge 606, the fluid exits the filter cartridge 606 and flows into a cavity between the filter cartridge 606 and the filter housing 604 and/or the filter lid 602. The fluid exits this cavity through a filter housing outlet 621. The filter housing outlet 621 is in fluid communication with a cavity between the filter cartridge 606 and the filter housing 604. The filter cartridge cavity 619 is cylindrical in various embodiments. The return passage 612 has a first width (e.g., diameter, etc.) that is less than a second width (e.g., diameter, etc.) of the filter cartridge inlet 617.

Figure 7:
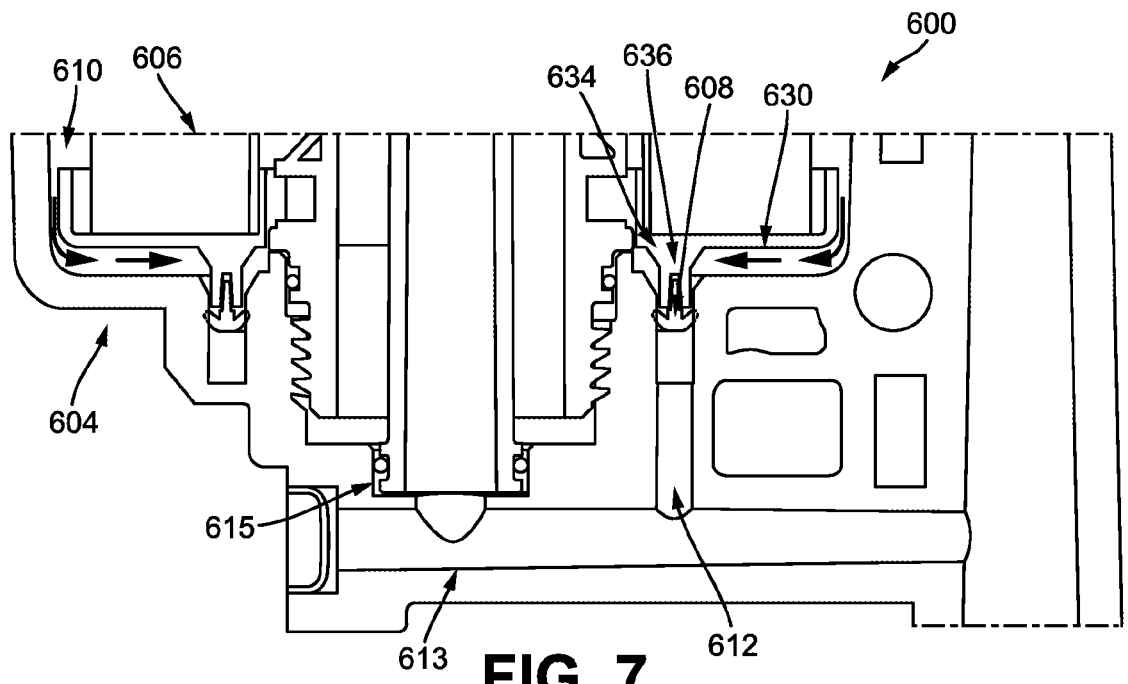
FIG. 7 shows a detailed view of a portion of FIG. 6.
Figure 8:
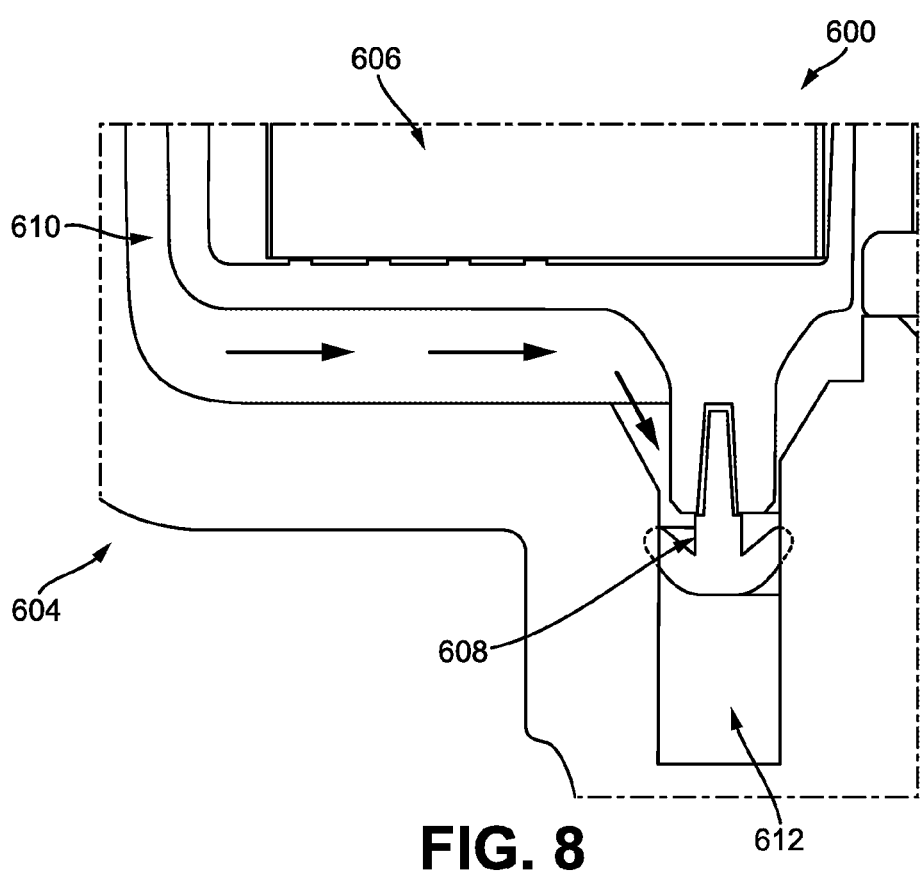
FIG. 8 shows another detailed view of a portion of FIG. 6.

The filter lid 602 contains retaining elements to engage the filter cartridge 606 while removing the filter. The filter lid 602 has a hex shape for relatively simple removal. Referring to FIG. 7, a detailed view of a portion of the filter assembly 600 is shown according to an example embodiment. Referring to FIG. 8, another detailed view of a portion of the filter assembly 600 is shown according to an example embodiment.

The bottom endplate 610 includes a bottom endplate flange 630 that interfaces with the filter cartridge 606. Specifically, the filter cartridge 606 is held by the bottom endplate flange 630 against a top endplate 632. The bottom endplate flange 630 is annular (e.g., circular, etc.). The bottom endplate 610 also includes an endplate projection 634 (e.g., rib, etc.). The endplate projection 634 extends (e.g., projects, etc.) from the bottom endplate flange 630 opposite the filter cartridge 606. The endplate projection 634 is annular or extends annularly (e.g., in discontinuous segments disposed annularly, etc.) along the bottom endplate flange 630. The endplate projection 634 is configured to be aligned with (e.g., centered on, etc.) the return passage 612. The endplate projection 634 includes an endplate aperture 636. The endplate aperture 636 is annular or extends annularly along the endplate projection 634. The endplate aperture 636 is configured to receive the seal member 608 and be coupled to the seal member 608. For example, the seal member 608 may be inserted into the endplate aperture 636 and adhesively bonded to or overmolded onto the endplate aperture 636. When the seal member 608 is inserted into the return passage 612, the endplate projection 634 may be partially received within the return passage 612. The endplate projection 634 may be separated from the return passage 612 due to an interaction between the seal member 608 and the return passage 612.

In FIGS. 6-8, the filter assembly 600 is shown in a normal operation (i.e., not during servicing of the filter assembly 600, etc.). During normal operation, the seal member prevents dirty fuel and clean fuel from going to the tank. The seal member 608 seals against the annular area, which is eventually opened to the fluid reservoir such as fuel tank or oil pan.

The filter cartridge 606, the seal member 608, the bottom endplate 610, and the top endplate 632 form a filter cartridge assembly. The filter cartridge assembly may be sold individually and used with the filter assembly 600 (e.g., one filter cartridge assembly may be replaced with another filter cartridge assembly, etc.).

Figure 9:
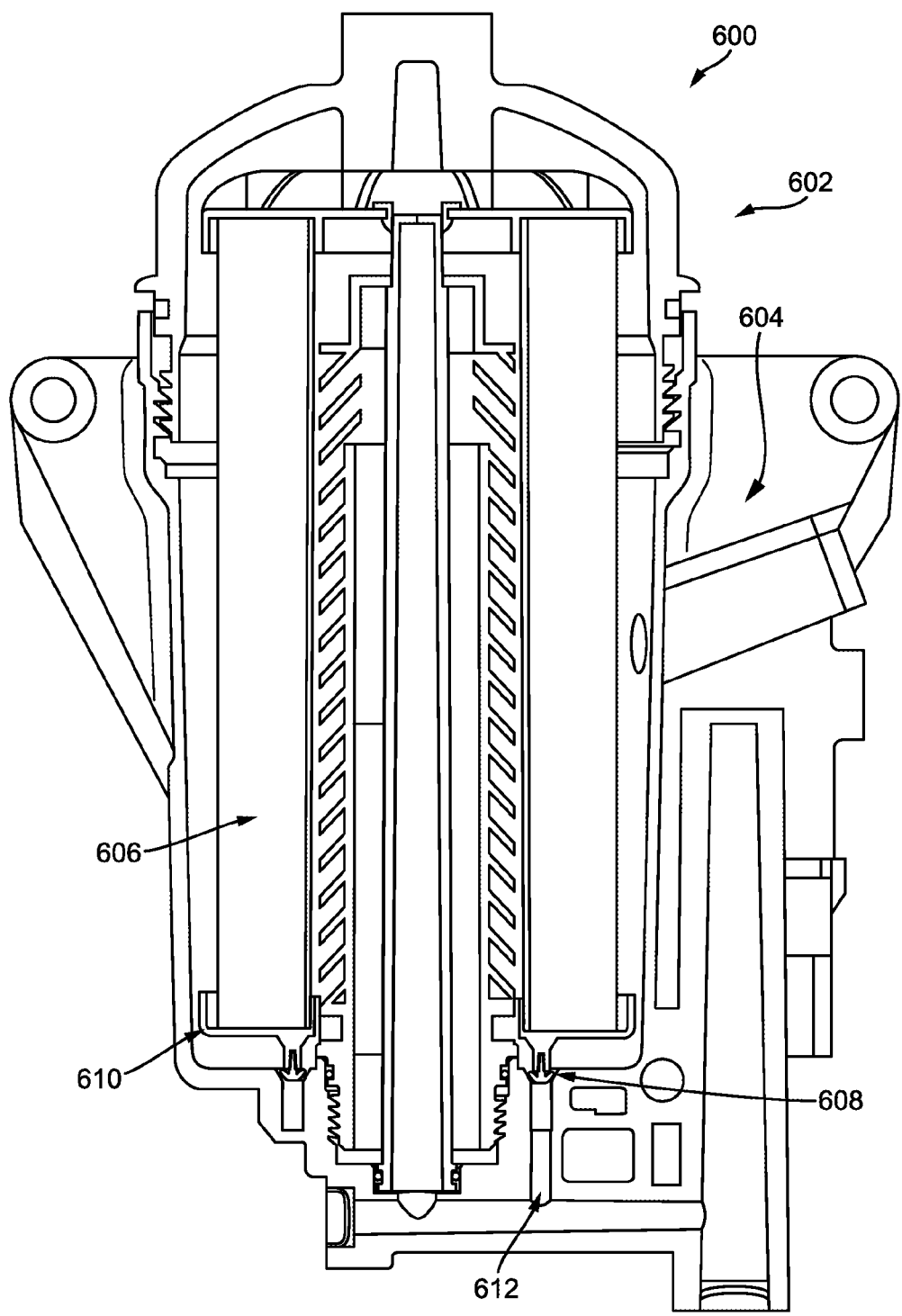
FIG. 9 shows another cross-sectional view of the filter assembly shown in FIG. 6.
Figure 10:
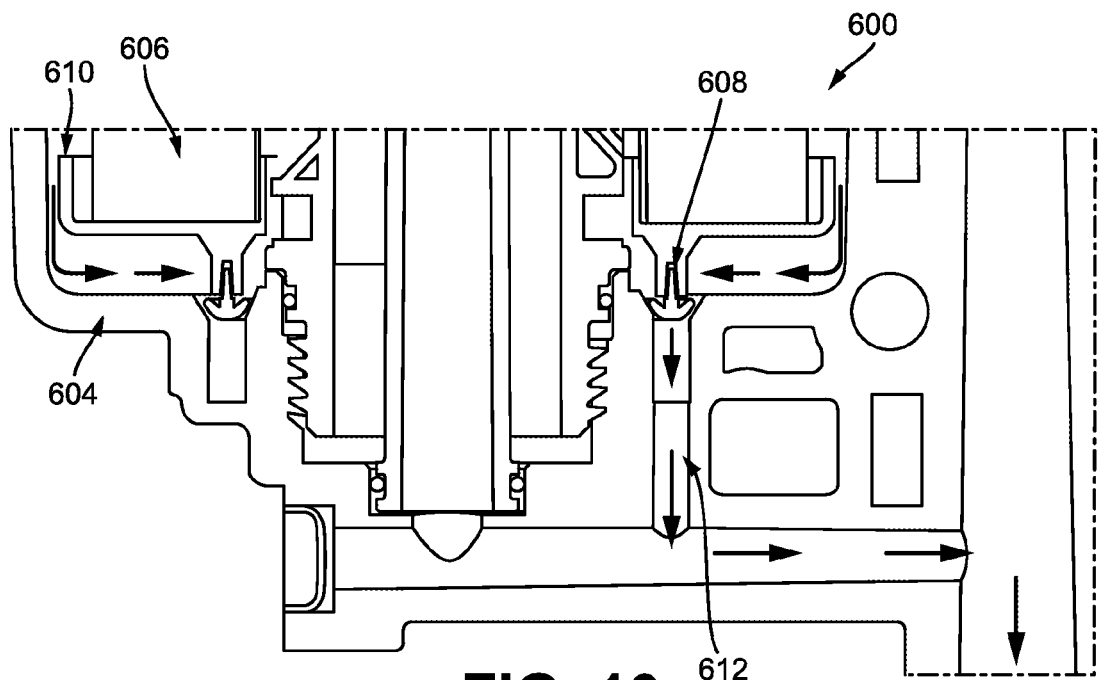
FIG. 10 shows a detailed view of a portion of FIG. 9.
Figure 11:
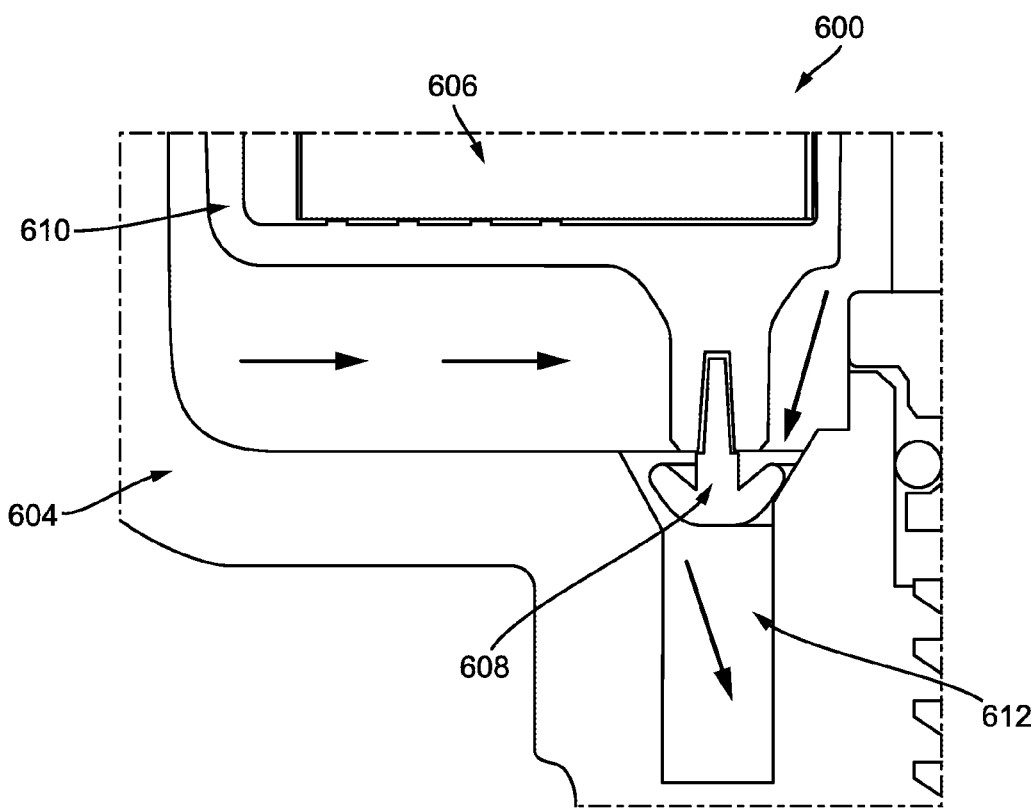
FIG. 11 shows another detailed view of a portion of FIG. 9.
Figure 12:
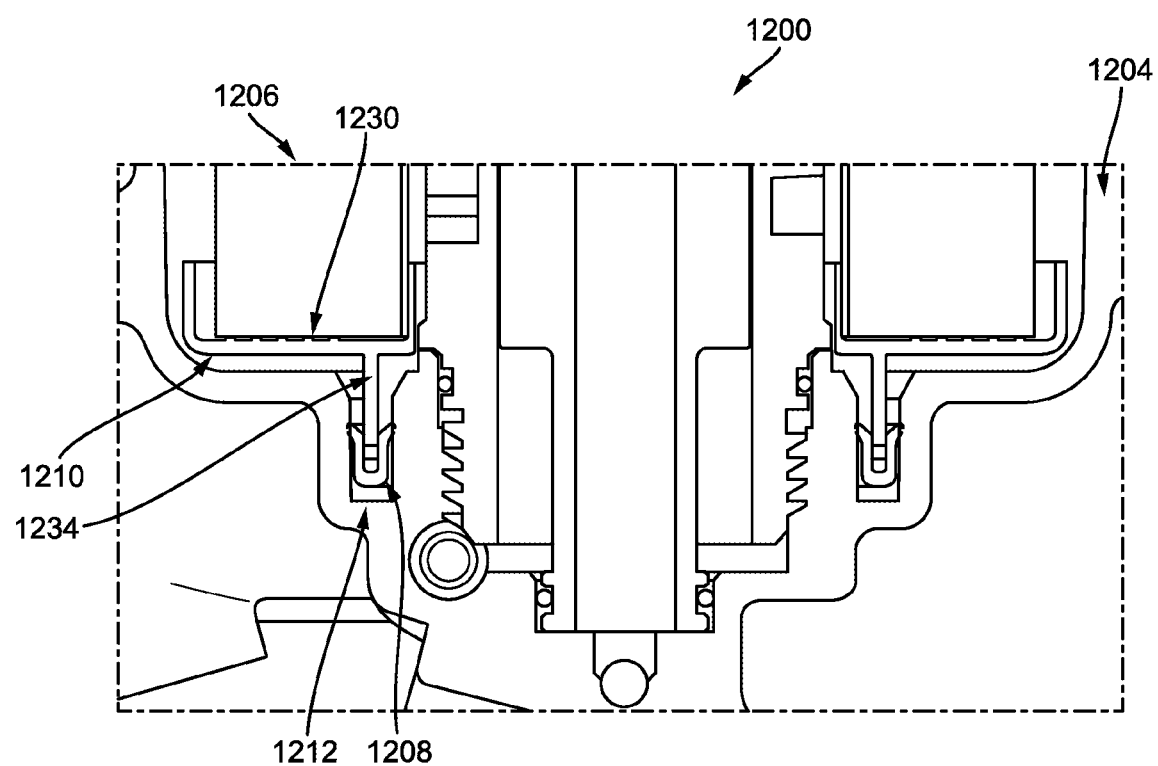
FIG. 12 shows a portion of a cross-sectional view of a filter assembly according to another example embodiment.

In FIGS. 9-11, the filter assembly 600 is shown in during servicing of the filter assembly 600 according to an example embodiment. During servicing, as the filter lid 602 is opened by ¾th turn, all the dirty fluid starts draining while all the clean fluid is still in filter housing 604. Once the filter lid 602 is opened by a complete turn, clean fuel starts draining. Once all the fluid is drained, an operator may open the filter lid 602 completely to service the filter. Draining the fluid may take 2-4 minutes.

The filter assembly 600 provides many benefits compared to other filters. Once the cartridge is removed during servicing, the seal member breaks and allows all the fluid from filter to go to the reservoir (such as fuel tank or oil pan etc.). This design is particularly beneficial in top load filters. Since the fluid inside the filters gets drained as soon the cartridge is removed, there will not be any fluid spillage when the top lid of filter is removed. This will help clean servicing. The sealing geometry of cartridge functions to ensure that the correct media gets assembled to the correct filter. This ensures that an operator receives uninterrupted filter performance. The drain passage and sealing is provided at the bottommost point of the filters and ensures that almost all the fluid gets drained. Thus, this filter assembly 600 mitigates accumulation of dirt/sludge in the dead volume (e.g., the volume of the fluid which does not get drained during servicing), during every servicing operation. The passage for draining may be annular in the housing, filter drain rate is faster, allowing lesser waiting time for operator to self-drain the filter. Due to the flexible lip design, the installation and removal of cartridge becomes easier. The rubber seal member, plastic seal member, and combination seal member in the filter assembly 600 are very low cost. The use of a plastic seal member reduces a required number of components and helps the filter assembly 600 be a relatively low cost product. The return passage 612, annular design of filter assembly 600, and the seal member designs, have provision such that all the dirty side fluid gets drained first and clean side fluid will get drained, wiping away all the contaminants. The seal member is sealing the annular area in the housing at different heights, that is making sequential draining of the dirty and clean fluid respectively.

The seal member 608 and the bottom endplate 610 are constructed from different materials in some embodiments. For example, the seal member 608 may be constructed from a deformable material, such as rubber, a polymer, nylon, nitrile rubber, gasket material, O-ring material, or other similar materials and the bottom endplate 610 may be constructed from metal (e.g., aluminum, etc.), plastic (e.g., high temperature plastic, thermoset plastic, etc.), or other similar material.

FIGS. 12-16 illustrate cross-sectional views of a filter assembly 1200 is shown according to an example embodiment. The filter assembly 1200 includes a filter housing 1204, a filter cartridge 1206, a seal member 1208, a bottom endplate 1210, and a return passage 1212. The filter cartridge 1206 interfaces with the bottom endplate 1210. The bottom endplate 1210 interfaces with the seal member 1208. The seal member 1208 is positioned within the return passage 1212. The return passage 1212 is configured to be in fluid communication with a fuel tank and/or an oil pan. The bottom endplate 1210 facilitates sealing across the inner pocket of the housing separating clean and dirty side of the filter. The return passage 1212 is integrated into the filter housing 1204.

The bottom endplate 1210 includes a bottom endplate flange 1230 that interfaces with the filter cartridge 1206. Specifically, the filter cartridge 1206 is held by the bottom endplate flange 1230 against a top endplate. The bottom endplate flange 1230 is annular (e.g., circular, etc.). The bottom endplate 1210 also includes an endplate projection 1234 (e.g., rib, etc.). The endplate projection 1234 extends (e.g., projects, etc.) from the bottom endplate flange 1230 opposite the filter cartridge 1206. The endplate projection 1234 is annular or extends annularly (e.g., in discontinuous segments disposed annularly, etc.) along the bottom endplate flange 1230. The endplate projection 1234 is configured to be aligned with (e.g., centered on, etc.) the return passage 1212. The endplate projection 1234 is configured to receive the seal member 1208 and be coupled to the seal member 1208. For example, the endplate projection 1234 may be inserted into an aperture in the seal member 1208 and adhesively bonded using adhesive 1235 to the seal member 1208. In another example, the seal member 1208 may be overmolded onto the endplate projection 1234. When the seal member 1208 is inserted into the return passage 1212, the endplate projection 1234 may be partially received within the return passage 1212. The endplate projection 1234 may be separated from the return passage 1212 due to an interaction between the seal member 1208 and the return passage 1212.

Figure 13:
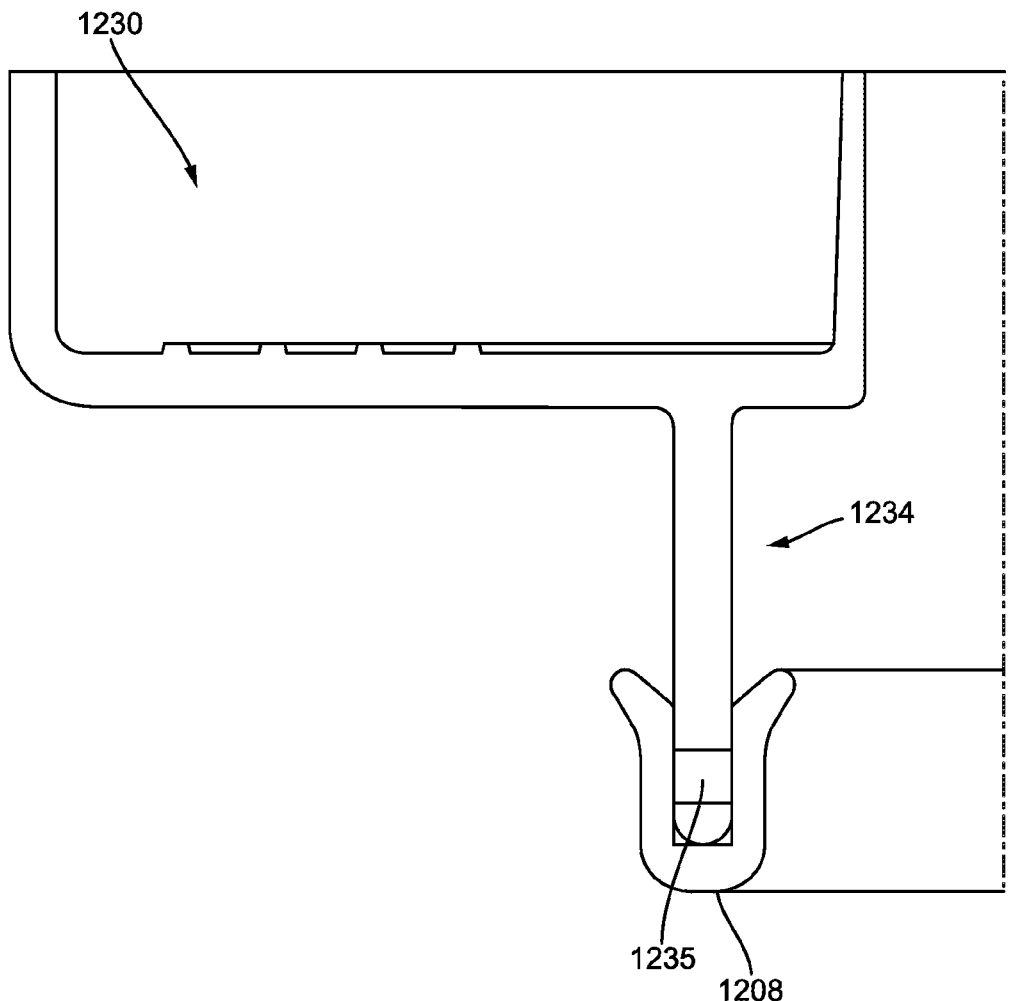
FIG. 13 shows a detailed view of a portion of the filter assembly shown in FIG. 12.
Figure 14:
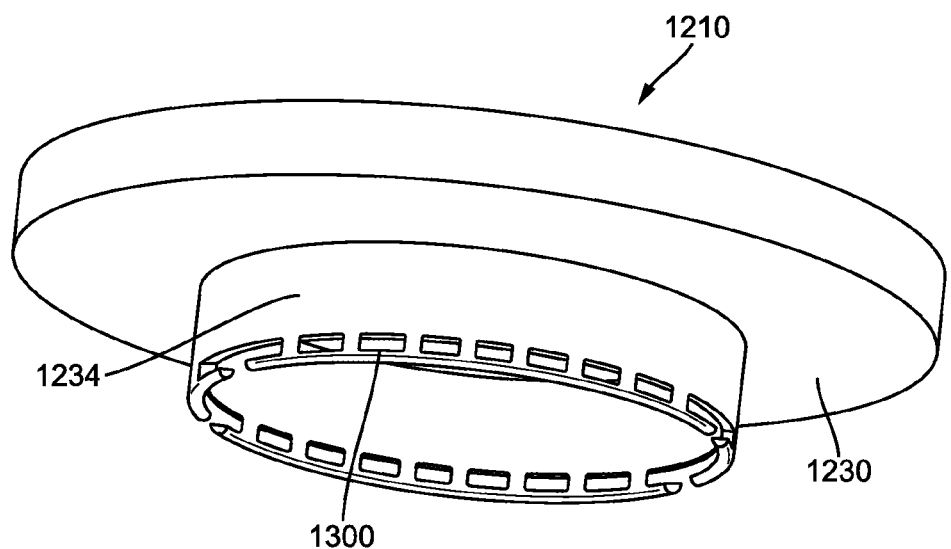
FIG. 14 shows a perspective view of another portion of the filter assembly shown in FIG. 12.
Figure 15:
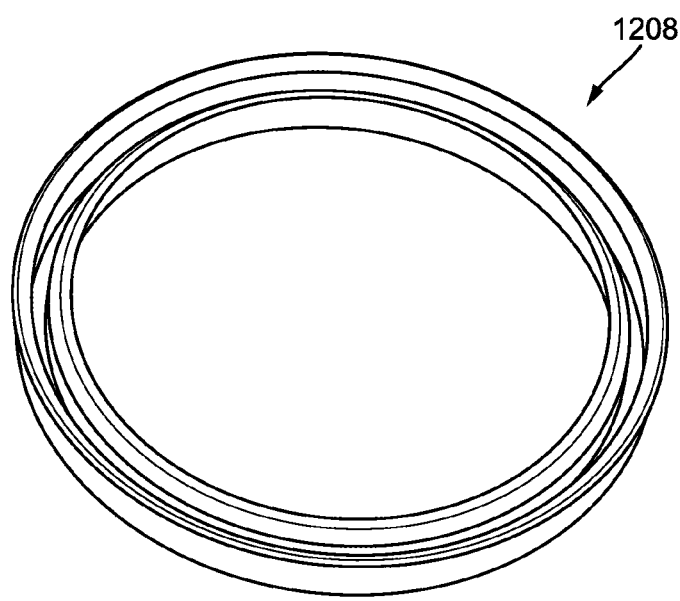
FIG. 15 shows a perspective view of yet another portion of the filter assembly shown in FIG. 12.
Figure 16:
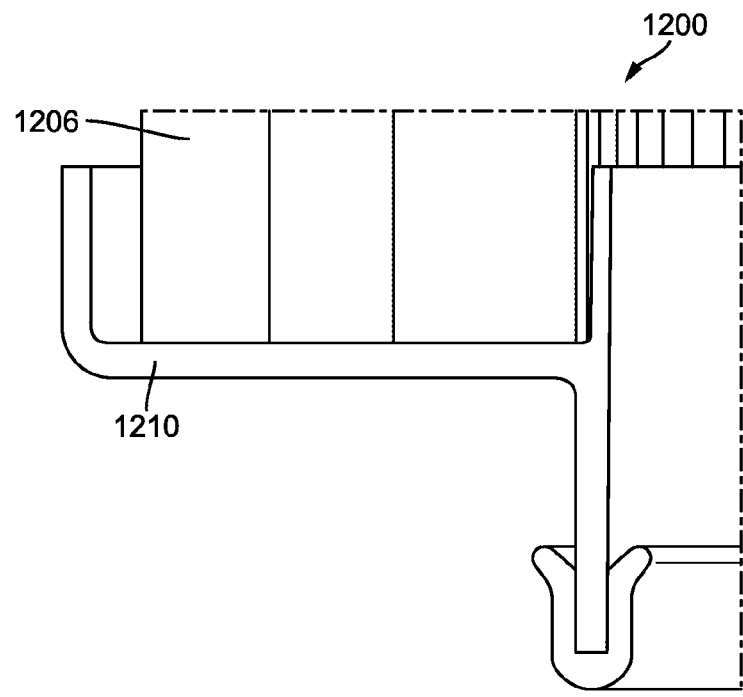
FIG. 16 shows a portion of a cross-sectional view of a filter assembly according to another example embodiment.

Referring to FIG. 13, a detailed view of a portion of the filter assembly 1200 is shown according to an example embodiment. Referring to FIG. 14, a detailed view of the bottom endplate 1210 is shown according to an example embodiment. The endplate projection 1234 includes endplate bonding apertures 1300. The endplate bonding apertures 1300 are configured to receive the adhesive 1235 or the seal member 1208 (e.g., when the seal member 1208 is overmolded onto the endplate projection 1234, etc.) to enhance bonding between the seal member 1208 and the endplate projection 1234. The endplate bonding apertures 1300 may be covered by the seal member 1208 when the seal member 1208 is coupled to the endplate projection 1234. Referring to FIG. 15, a detailed view of the seal member 1208 is shown according to an example embodiment.

In this design the bottom end plate & Y type rubber seal members are manufactured as separate components & then they are glued together using adhesive to form one assembly which will be part of cartridge assembly. This Y type rubber seal member establishes sealing with a drain passage in the housing when installed thereby facilitating drainage of fluid when a filter cartridge is removed. The type of rubber that the rubber seal member is made from, the shape of rubber seal member, the type of glue using in making the rubber seal member, and the geometry of various components of the filter assembly 600 that may be used to facilitate assembly of the rubber seal member may vary as per application and design. During assembly, the cartridge moves inside the groove freely and comes in contact with both walls of the groove. Gasket features may be radially compressed due to this contact. The interference between the gasket and the inner groove wall creates the sealing surface. The profile of the gasket is optimized to keep the installation and removal force to its minimum. The bottom endplate 1210 is manufactured as a single part in one draw. The gasket may be manufactured as a single part. A dispenser dispenses a synthetic glue in the gasket cavity, such as using epoxy or acrylic adhesive. Later, the gasket is pushed against the end plate. In manufacturing of the filter assembly 600, the bottom endplate 1210 and the seal member 1208 are manufactured separately. The seal member 1208 may be made from Viton. The bottom endplate 1210 and the seal member 1208 may be permanently assembled using glue.

The filter cartridge 1206, the seal member 1208, the bottom endplate 1210, and the top endplate form a filter cartridge assembly. The filter cartridge assembly may be sold individually and used with the filter assembly 1200 (e.g., one filter cartridge assembly may be replaced with another filter cartridge assembly, etc.).

The seal member 1208 and the bottom endplate 1210 are constructed from different materials in some embodiments. For example, the seal member 1208 may be constructed from a deformable material, such as rubber, a polymer, nylon, nitrile rubber, gasket material, O-ring material, or other similar materials and the bottom endplate 1210 may be constructed from metal (e.g., aluminum, etc.), plastic (e.g., high temperature plastic, thermoset plastic, etc.), or other similar material.

Figure 17:
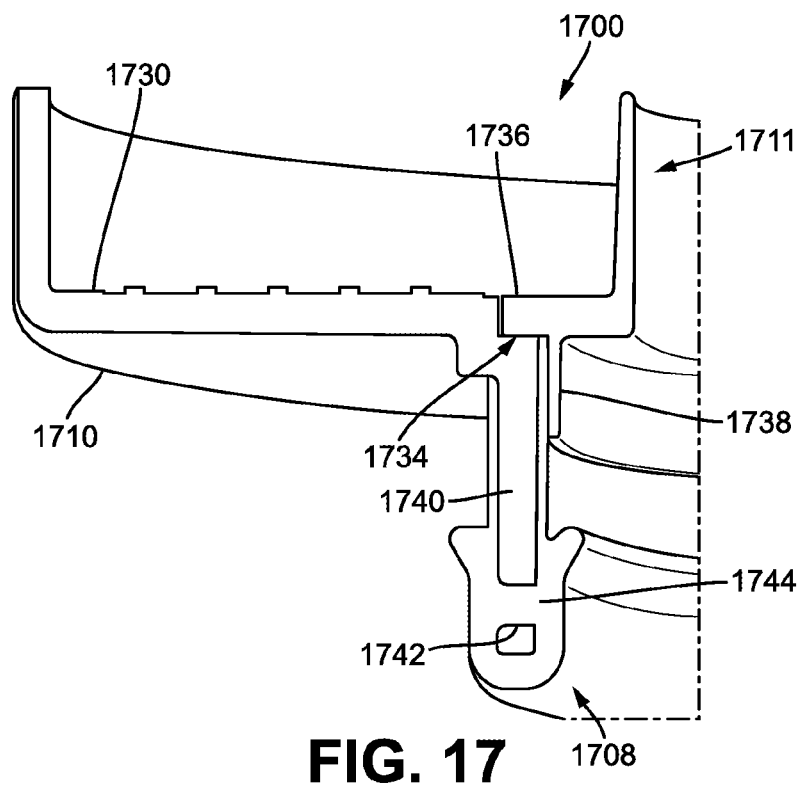
FIG. 17 shows a cross-sectional view of a portion of the filter assembly shown in FIG. 16.
Figure 18:
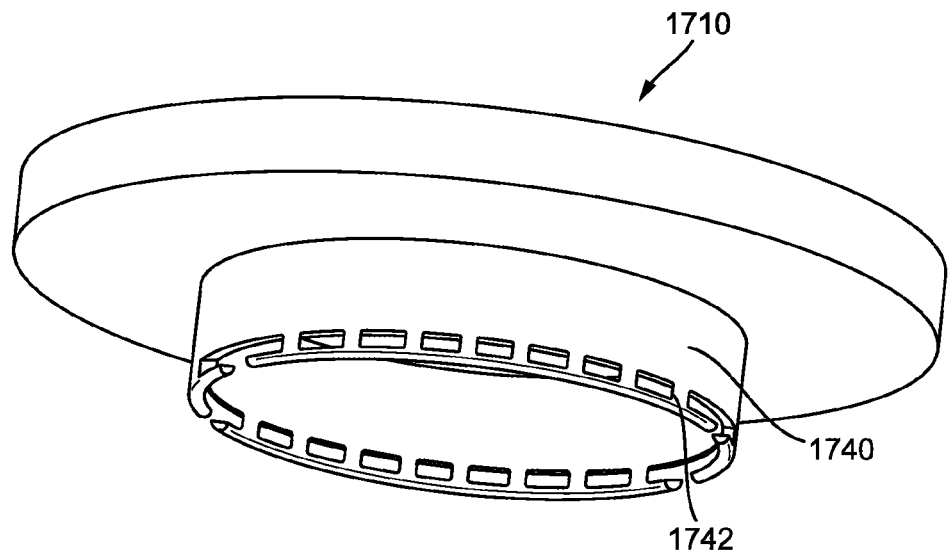
FIG. 18 shows a perspective view of another portion of the filter assembly shown in FIG. 16.
Figure 19:
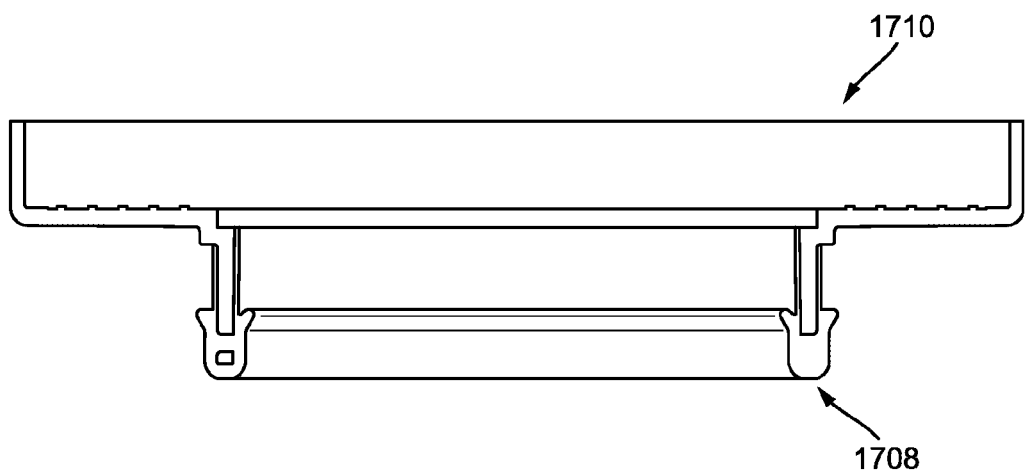
FIG. 19 shows a cross-sectional view of a portion of the filter assembly shown in FIG. 16.

FIGS. 17-19 illustrate cross-sectional views of another filter assembly according to multiple example embodiments. In this design, the bottom endplate is manufactured as separate part & then this endplate will be placed on tooling of rubber seal member manufacturing process & rubber material is poured around endplate to create over molded rubber seal member design. The original endplate may be divided in 2 separate pieces to enable over molding operation of rubber & later they tied together using adhesive during potting process. Type of rubber, shape of rubber seal member and endplate design may vary as per application and design. During assembly, the cartridge moves inside the groove freely and comes in contact with both walls of the groove. Thus gasket features get compressed radially. The interference between gasket and inner groove wall creates the sealing surface. The gasket profile is optimized to keep the installation and removal force to its minimum. In these embodiments, the seal member is over-molded with the bottom endplate. Thus, no glue is required to attach the seal member to the endplate.

The bottom endplate may be manufactured in 2 pieces. Then gasket may be over-molded with the one piece. After that, the second piece of the endplate may be snap fitted to it. In the embodiment shown in FIG. 16, as compared to the embodiment shown in FIG. 17, the endplate is not manufactured in two pieces, but the gasket is still over-molded on the endplate.

Referring to FIG. 17, a cross-sectional view of a portion of a filter assembly 1700 is shown according to an example embodiment. The filter assembly 1700 includes a filter housing lid, a filter housing, a filter cartridge, a seal member 1708, a bottom endplate 1710 (e.g., endcap, etc.), a bottom endplate insert 1711, and a return passage. The filter cartridge interfaces with the bottom endplate 1710. The bottom endplate insert 1711 interfaces with the seal member 1708. The seal member 1708 is positioned within the return passage. The return passage is configured to be in fluid communication with a fuel tank and/or an oil pan. The bottom endplate 1710 facilitates sealing across the inner pocket of the housing separating clean and dirty side of the filter.

The return passage is in fluid communication with an inlet passage in the filter housing. The inlet passage receives a fluid (e.g., fuel, oil, etc.) from a fluid source (e.g., fuel tank, oil pan, etc.) and provides the fluid to a filter housing inlet. The filter assembly includes a filter cartridge inlet that is configured to receive the fluid from the filter housing inlet. In some embodiments, the filter cartridge inlet is coupled to (e.g., threaded into, etc.) the filter housing inlet. In this way, fluid from the return passage flows into the inlet passage and may flow either towards the fluid source or may flow through the filter housing inlet into the filter cartridge inlet. After flowing through the filter cartridge inlet, the fluid flows within a filter cartridge cavity and flows through the filter cartridge (e.g., radially outward, etc.). After flowing through the filter cartridge, the fluid exits the filter cartridge and flows into a cavity between the filter cartridge and the filter housing and/or the filter lid. The fluid exits this cavity through a filter housing outlet. The filter housing outlet is in fluid communication with a cavity between the filter cartridge and the filter housing. The filter cartridge cavity is cylindrical in various embodiments. The return passage has a first width (e.g., diameter, etc.) that is less than a second width (e.g., diameter, etc.) of the filter cartridge inlet.

The filter cartridge is installed via the filter lid (e.g., in a "top side" manner, etc.). As a result, the filter cartridge may be removed with the fluid substantially draining from the filter cartridge into the filter housing via gravity. Additionally, the filter cartridge has features on the bottom side thereof which establish a seal within the return passage when the filter cartridge is installed in the filter housing. This seal will break when a cartridge is removed for servicing & allows liquid from filter housing drained to separate reservoir as fuel tank, oil sump etc.

The bottom endplate 1710 includes a bottom endplate flange 1730 that interfaces with the filter cartridge. Specifically, the filter cartridge is held by the bottom endplate flange 1730 against a top endplate. The bottom endplate flange 1730 is annular (e.g., circular, etc.). The bottom endplate 1710 also includes a bottom endplate shelf 1734. The bottom endplate shelf 1734 is annular. The bottom endplate insert 1711 includes a bottom endplate insert shelf 1736 and a bottom endplate insert projection 1738. The bottom endplate insert shelf 1736 is configured to interface with the bottom endplate shelf 1734 to support the bottom endplate insert 1711 on the bottom endplate 1710. The bottom endplate insert projection 1738 is configured to be disposed adjacent an endplate projection 1740 of the bottom endplate 1710.

The endplate projection 1740 includes endplate bonding apertures 1742. The endplate bonding apertures 1742 are configured to receive the adhesive 1744 or the seal member 1708 (e.g., when the seal member 1708 is overmolded onto the endplate projection 1740, etc.) to enhancing bonding between the seal member 1708 and the endplate projection 1740. The endplate bonding apertures 1742 may be covered by the seal member 1708 when the seal member 1708 is coupled to the endplate projection 1740.

The filter cartridge, the seal member 1708, the bottom endplate 1710, and the top endplate form a filter cartridge assembly. The filter cartridge assembly may be sold individually and used with the filter assembly 1700 (e.g., one filter cartridge assembly may be replaced with another filter cartridge assembly, etc.).

The seal member 1708 and the bottom endplate 1710 are constructed from different materials in some embodiments. For example, the seal member 1708 may be constructed from a deformable material, such as rubber, a polymer, nylon, nitrile rubber, gasket material, O-ring material, or other similar materials and the bottom endplate 1710 may be constructed from metal (e.g., aluminum, etc.), plastic (e.g., high temperature plastic, thermoset plastic, etc.), or other similar material.

FIGS. 20-24 illustrate cross-sectional views of another filter assembly according to multiple example embodiments. In this design, the endplate and gasket are manufactured separately. These two parts have matching locking features (such as snaps, dimples, rings, etc.) to facilitate mechanical locking. These two parts are locked against each other using mechanical lock (like snap fit, press fit etc.), and then adhesive is poured to make this lock more robust and avoid pull back during operation. The geometry of a seal member, endplate design, locking feature design, type of adhesive may vary as per application and design. During assembly, the cartridge moves inside the groove freely and comes in contact with both walls of the groove. Thus, gasket features get compressed radially. The interference between the gasket and inner groove wall creates the sealing surface. The gasket profile is optimized to keep the installation and removal force to its minimum. The filter cartridge is manufactured such that the gasket and endplate are manufactured separately and then gasket is pushed inside the endplate groove (interference fit). The protrusions have a mechanical lock with endplate once assembled. A potting method ensures the proper bonding between endplate & gasket and it will fill all the space between endplate and gasket.

Figure 20:
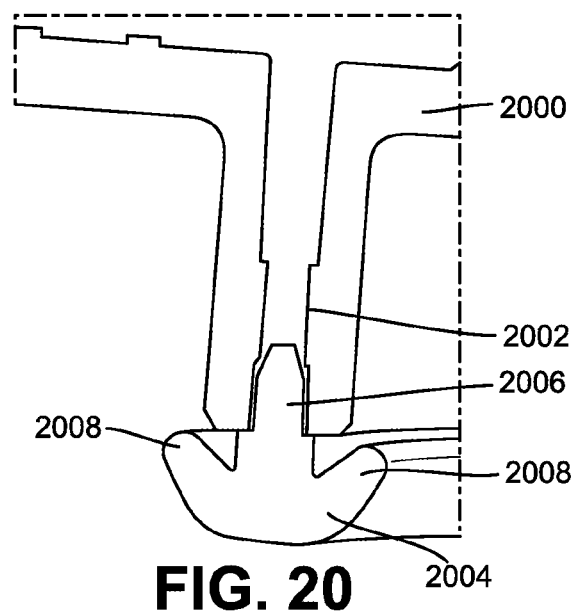
FIG. 20 shows a cross-sectional view of a portion of a filter assembly according to an example embodiment.
Figure 22:
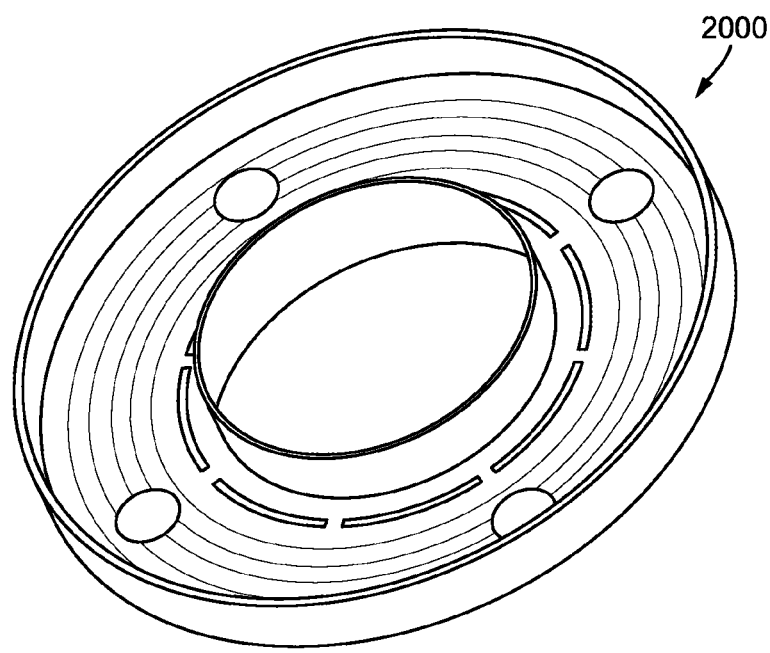
FIG. 22 shows a perspective view of a portion of a filter assembly according to an example embodiment.
Figure 23:
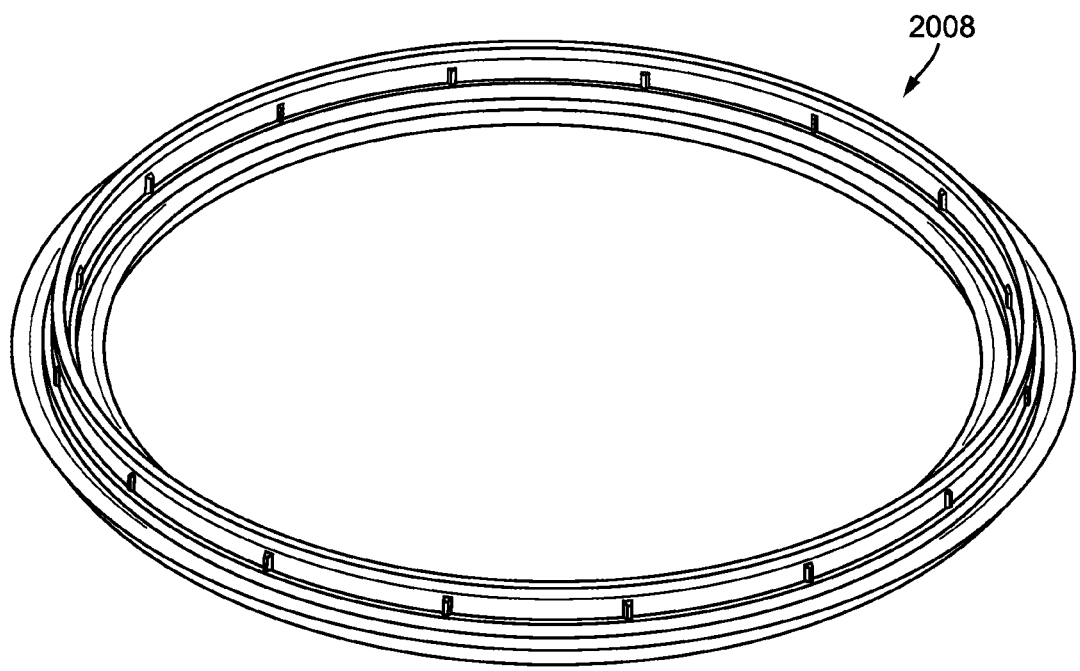
FIG. 23 shows a perspective view of a portion of a filter assembly according to an example embodiment.
Figure 24:
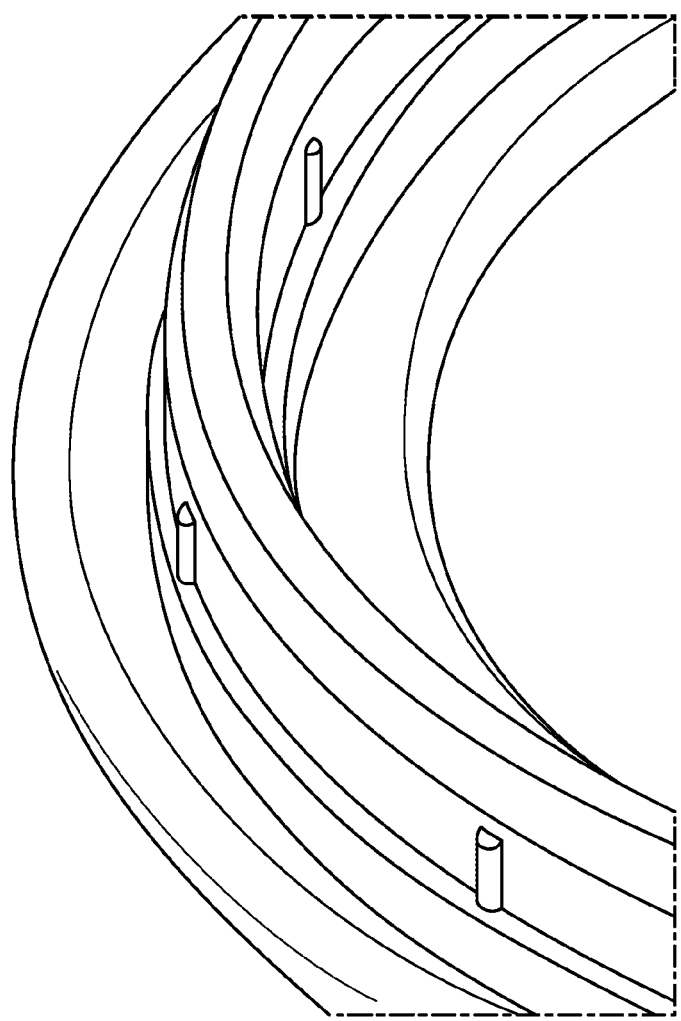
FIG. 24 shows a detailed view of a portion of FIG. 23.

Referring to FIG. 20, a bottom endplate 2000 is shown to include a bottom endplate aperture 2002 and a seal member 2004 is shown to include a seal member projection 2006 according to an example embodiment. The seal member 2004 is configured to be coupled to the bottom endplate 2000 by insertion of the seal member projection 2006 into the bottom endplate aperture 2002. The seal member 2004 includes seal member flanges 2008 and a seal member stop 2010. The seal member stop 2010 is configured to prevent over insertion of the seal member projection 2006 into the bottom endplate aperture 2002. The seal member flanges 2008 are configured to deflect relative to the seal member projection 2006, and therefore relative to the bottom endplate 2000, when the seal member projection 2006 is inserted into the bottom endplate aperture 2002. Deflection of the seal member flanges 2008 enables the seal member 2004 to attain a seal when inserted into a return passage. FIG. 22 illustrates the bottom endplate 2000 and FIGS. 23 and 24 illustrate the seal member 2004.

Figure 21:
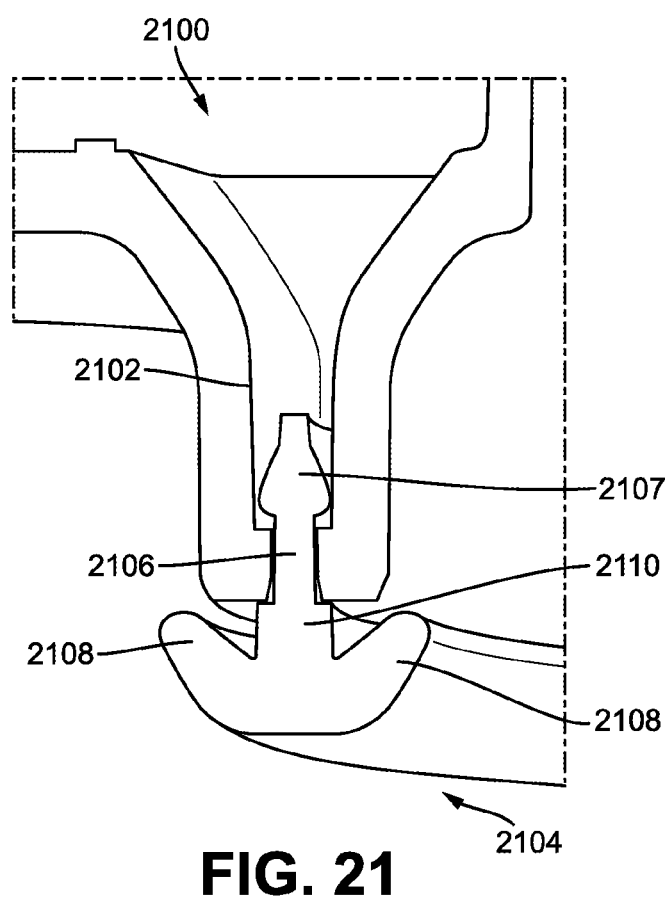
FIG. 21 shows a cross-sectional view of a portion of a filter assembly according to an example embodiment.

Referring to FIG. 21, a bottom endplate 2100 is shown to include a bottom endplate aperture 2102 and a seal member 2104 is shown to include a seal member projection 2106 according to an example embodiment. The seal member 2104 is configured to be coupled to the bottom endplate 2100 by insertion of the seal member projection 2106 into the bottom endplate aperture 2102. The seal member projection 2106 includes a mechanical lock 2107 that interfaces with the bottom endplate aperture 2102 to retain the seal member projection 2106 in the bottom endplate aperture 2102. For example, the mechanical lock 2107 retain the seal member projection 2106 in the bottom endplate aperture 2102 without the use of adhesive or glue. The seal member 2104 includes seal member flanges 2108 and a seal member stop 2110. The seal member stop 2110 is configured to prevent over insertion of the seal member projection 2106 into the bottom endplate aperture 2102. The seal member flanges 2108 are configured to deflect relative to the seal member projection 2106, and therefore relative to the bottom endplate 2100, when the seal member projection 2106 is inserted into the bottom endplate aperture 2102. Deflection of the seal member flanges 2108 enables the seal member 2104 to attain a seal when inserted into a return passage.

Figure 25:
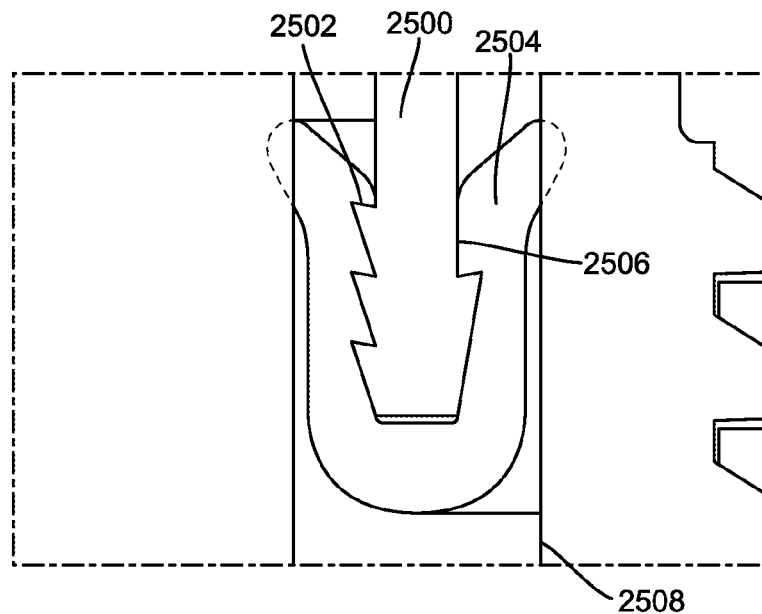
FIG. 25 shows a cross-sectional view of a portion of a filter assembly according to an example embodiment.
Figure 26:
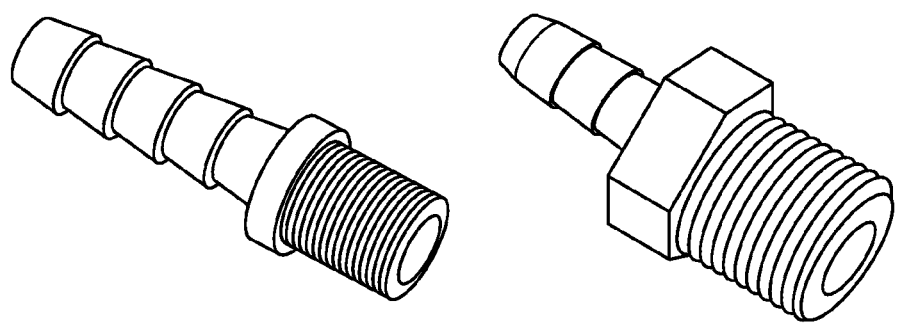
FIG. 26 shows barb fittings.

FIG. 25 illustrates a cross-sectional view of another filter assembly according to an example embodiment. In this design, endplate and gaskets are manufactured as separate parts & they have features which are suitable for press fit application such as a barb feature, transition fit tolerances, press fit using retaining elements etc. The geometry of a seal member, endplate design, locking feature design, etc. may vary as per application and design. During assembly, the cartridge moves inside the groove freely and comes in contact with both walls of the groove. Thus, the gasket features get compressed radially. The interference between gasket and inner groove wall creates the sealing surface. The gasket profile is optimized to keep the installation and removal force to its minimum. The filter assembly is manufactured such that the barb profile is to be developed on the outer and inner surface of the plastic endplate. The gasket is assembled with endplate with the help of a fixture. The barb profile is known to be leak proof and a reliable assembly.

Referring to FIG. 25, a bottom endplate projection 2500 is shown to include a barb profile 2502 according to an example embodiment. A seal member 2504 is shown to include a seal member aperture 2506. The bottom endplate projection 2500 is inserted into the seal member aperture 2506 such that the barb profile 2502 is at least partially located within the seal member aperture 2506. The barb profile 2502 facilitates retention of the seal member 2504 on the bottom endplate projection 2500 when a bottom endplate having the bottom endplate projection 2500 is removed from a filter housing having a return passage 2508 within which the seal member 2504 was inserted.

Figure 27:
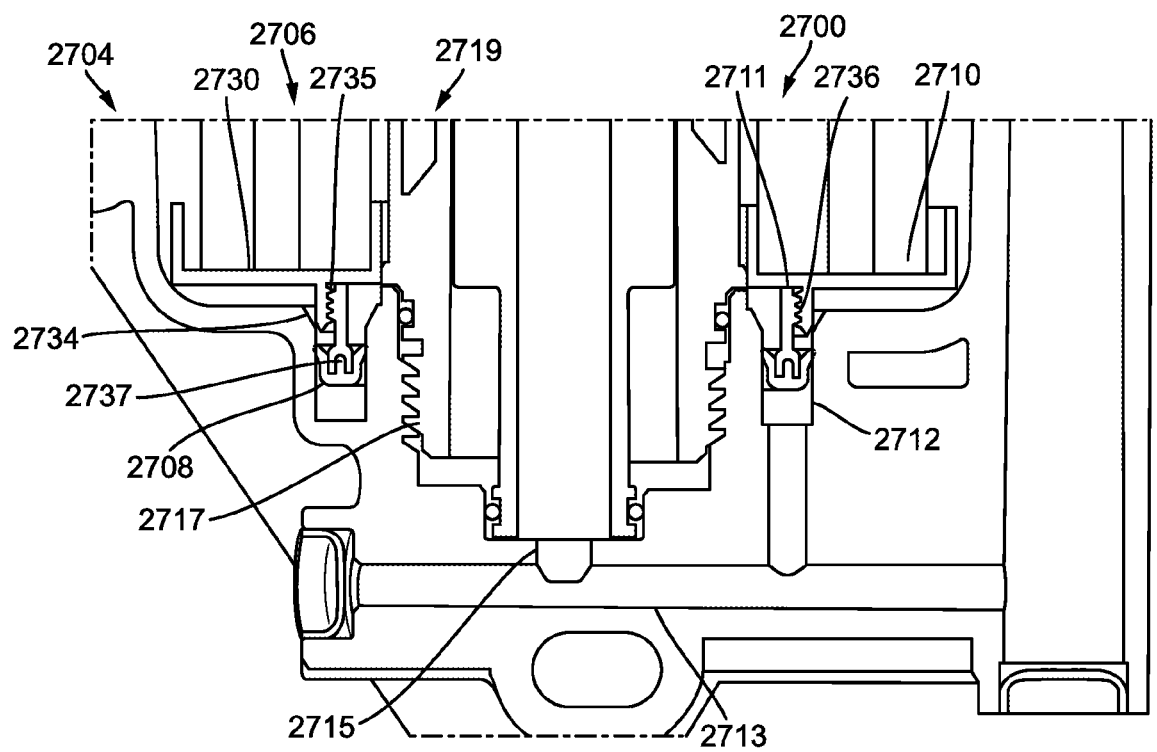
FIG. 27 shows a cross-sectional view of a portion of a filter assembly according to an example embodiment.
Figure 28:
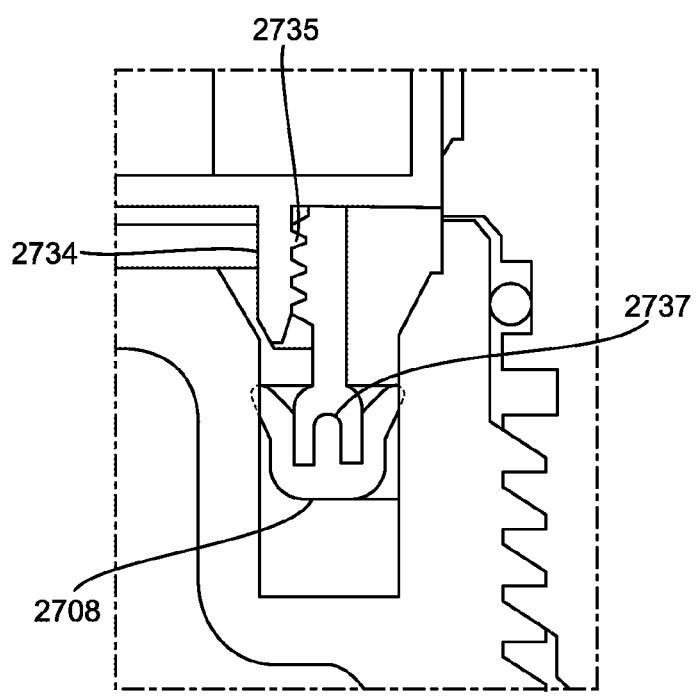
FIG. 28 shows a detailed view of a portion of FIG. 27.
Figure 29:
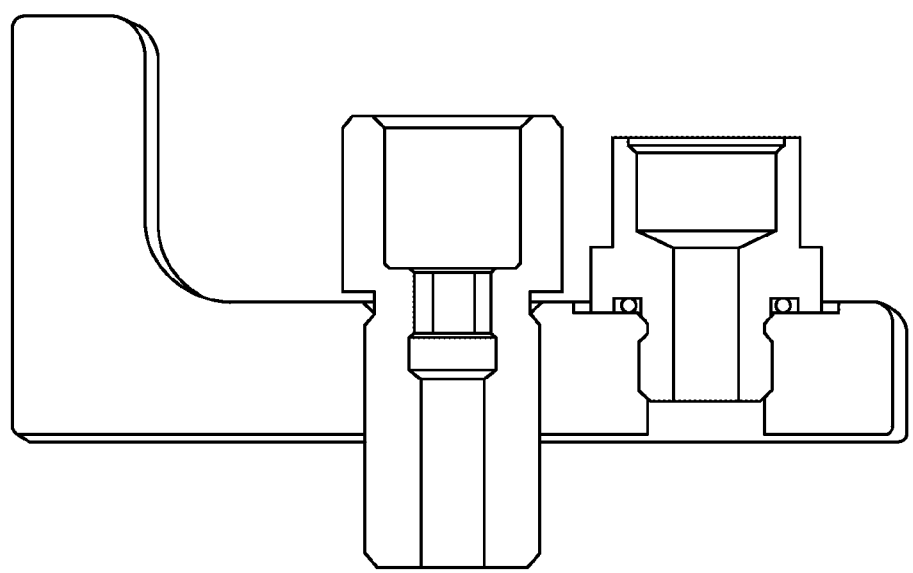
FIG. 29 shows a leak proof threading with sealant.

FIGS. 27-29 illustrate cross-sectional views of another filter assembly according to multiple example embodiments. In this design, over molded rubber seal member is created on separate piece of endplate & later this piece of endplate is attached to original endplate using threading 2 parts together, using welding method (vibration welding, ultrasonic welding etc.) or using hardware like screws/bolts etc. Various types of sealant may be used to avoid leakage through threads, welding geometry etc. The type of attachment & over molded seal member may vary as per application and design. During assembly, the cartridge moves inside the groove freely and comes in contact with both walls of the groove. Thus gasket features get compressed radially. The interference between gasket and inner groove wall creates the sealing surface. The gasket profile is optimized to keep the installation and removal force to its minimum. The filter cartridge may be manufactured such that the endplate is manufactured with the threaded interface separately, the endplate is assembled (threaded) with over molded assembly using Loctite, thereby resulting in a permanent leak-proof assembly. FIG. 29 is an example of a leak proof threading with sealant.

Referring to FIG. 27, a cross-sectional view of a filter assembly 2700 is shown according to an example embodiment. The filter assembly 2700 includes a filter housing lid, a filter housing 2704, a filter cartridge 2706, a seal member 2708, a bottom endplate 2710 (e.g., endcap, etc.), a bottom endplate insert 2711, and a return passage 2712. The filter cartridge 2706 interfaces with the bottom endplate 2710. The bottom endplate insert 2711 interfaces with the seal member 2708. The seal member 2708 is positioned within the return passage 2712. The return passage 2712 is configured to be in fluid communication with a fuel tank and/or an oil pan. The bottom endplate 2710 facilitates sealing across the inner pocket of the housing separating clean and dirty side of the filter.

The return passage 2712 is in fluid communication with an inlet passage 2713 in the filter housing 2704. The inlet passage 2713 receives a fluid (e.g., fuel, oil, etc.) from a fluid source (e.g., fuel tank, oil pan, etc.) and provides the fluid to a filter housing inlet 2715. The filter assembly 2700 includes a filter cartridge inlet 2717 that is configured to receive the fluid from the filter housing inlet 2715. In some embodiments, the filter cartridge inlet 2717 is coupled to (e.g., threaded into, etc.) the filter housing inlet 2715. In this way, fluid from the return passage 2712 flows into the inlet passage 2713 and may flow either towards the fluid source or may flow through the filter housing inlet 2715 into the filter cartridge inlet 2717. After flowing through the filter cartridge inlet 2717, the fluid flows within a filter cartridge cavity 2719 and flows through the filter cartridge 2706 (e.g., radially outward, etc.). After flowing through the filter cartridge 2706, the fluid exits the filter cartridge 2706 and flows into a cavity between the filter cartridge 2706 and the filter housing 2704 and/or the filter lid. The fluid exits this cavity through a filter housing outlet. The filter housing outlet is in fluid communication with a cavity between the filter cartridge 2706 and the filter housing 2704. The filter cartridge cavity 2719 is cylindrical in various embodiments. The return passage 2712 has a first width (e.g., diameter, etc.) that is less than a second width (e.g., diameter, etc.) of the filter cartridge inlet 2717.

The filter cartridge 2706 is installed via the filter lid (e.g., in a "top side" manner, etc.). As a result, the filter cartridge 2706 may be removed with the fluid substantially draining from the filter cartridge 2706 into the filter housing 2704 via gravity. Additionally, the filter cartridge 2706 has features on the bottom side thereof which establish a seal within the return passage 2712 when the filter cartridge 2706 is installed in the filter housing 2704. This seal will break when a cartridge is removed for servicing & allows liquid from filter housing drained to separate reservoir as fuel tank, oil sump etc.

The bottom endplate 2710 includes a bottom endplate flange 2730 that interfaces with the filter cartridge 2706. Specifically, the filter cartridge 2706 is held by the bottom endplate flange 2730 against a top endplate. The bottom endplate flange 2730 is annular (e.g., circular, etc.). The bottom endplate 2710 also includes an endplate projection 2734 (e.g., rib, etc.). The endplate projection 2734 extends (e.g., projects, etc.) from the bottom endplate flange 2730 opposite the filter cartridge 2706. The endplate projection 2734 is annular or extends annularly (e.g., in discontinuous segments disposed annularly, etc.) along the bottom endplate flange 2730. The endplate projection 2734 is configured to be aligned with (e.g., centered on, etc.) the return passage 2712.

The endplate projection 2734 includes an endplate projection threaded surface 2735. The endplate projection threaded surface 2735 is configured to be coupled to a bottom endplate insert threaded surface 2736 of the bottom endplate insert 2711. The bottom endplate insert 2711 includes a bottom endplate insert aperture 2737. The bottom endplate insert aperture 2737 is annular or extends annularly along the bottom endplate insert 2711. The bottom endplate insert aperture 2737 is configured to receive the seal member 2708 and be coupled to the seal member 2708. For example, the seal member 2708 may be inserted into the bottom endplate insert aperture 2737 and adhesively bonded to or overmolded onto the bottom endplate insert aperture 2737. When the seal member 2708 is inserted into the return passage 2712, the bottom endplate insert 2711 may be partially received within the return passage 2712. The bottom endplate insert 2711 may be separated from the return passage 2712 due to an interaction between the seal member 2708 and the return passage 2712. While the bottom endplate insert 2711 is shown as being located radially inward of the endplate projection 2734, it is understood that the bottom endplate insert 2711 is instead located radially outward of the endplate projection 2734 in some embodiments.

The filter cartridge 2706, the seal member 2708, the bottom endplate 2710, and the top endplate form a filter cartridge assembly. The filter cartridge assembly may be sold individually and used with the filter assembly 2700 (e.g., one filter cartridge assembly may be replaced with another filter cartridge assembly, etc.).

The seal member 2708 and the bottom endplate 2710 are constructed from different materials in some embodiments. For example, the seal member 2708 may be constructed from a deformable material, such as rubber, a polymer, nylon, nitrile rubber, gasket material, O-ring material, or other similar materials, and the bottom endplate 2710 may be constructed from metal (e.g., aluminum, etc.), plastic (e.g., high temperature plastic, thermoset plastic, etc.), or other similar material.

Figure 32:
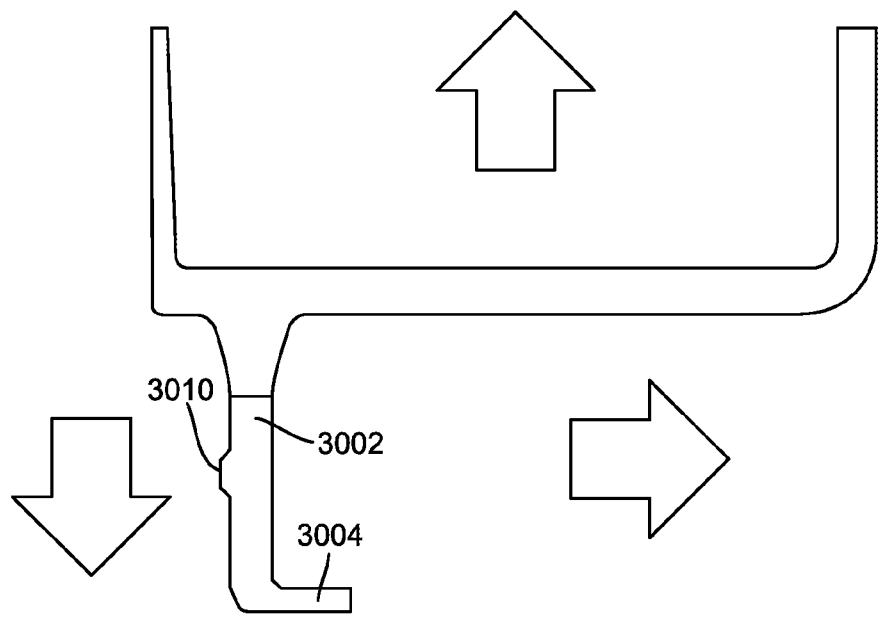
FIG. 32 shows a detailed view of a portion of FIG. 30.

FIGS. 30-33 illustrate cross-sectional views of another filter assembly according to multiple example embodiments. This design concept looks like a letter L or a right angle. On the inner wall of end-plate, a dimple is created which may get crushed to provide a seal member on the fluid 1 side. The tip of the extended leg provides the sealing on fluid 2 side. A small radial clearance is maintained between the tip of the leg and the wall of groove. Contrary to this, an interference is kept on the inside wall and the dimple. During assembly, the leg will move inside the groove freely until the dimple comes in contact with inside wall of groove. The interference between dimple and inner groove wall creates the sealing surface and at the same time bend the leg so that the leg tip makes a firmer contact with outer wall. Further downward motion of end plate creates sealing surface on both sides. During servicing, when the end plate moves in the upward direction, the seal member created by dimple disengages first, thus creating an opening for fluid 1 to drain. Further upward movement of endplate disengages the seal member developed by tip of L shaped seal member and fluid 2 now can drain. A draft on the groove surface will further reduce the installation and removal force. The delaying length feature can be modified to meet a target application. The filter cartridge is configured such that the end plate is manufactured as a single part in one draw. The core out directions are shown in FIG. 32.

Figure 30:
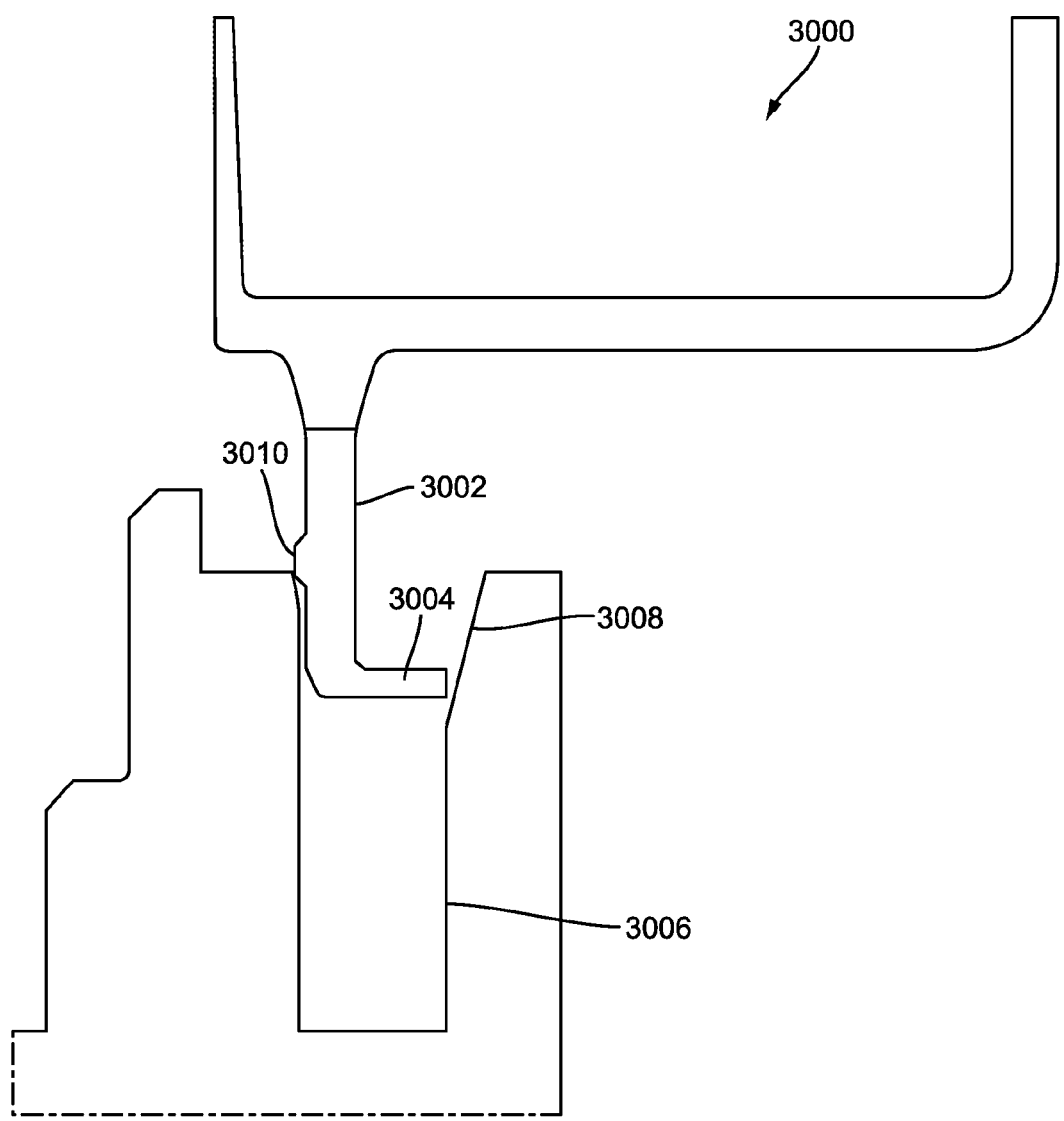
FIG. 30 shows a cross-sectional view of a portion of a filter assembly according to an example embodiment.
Figure 31:
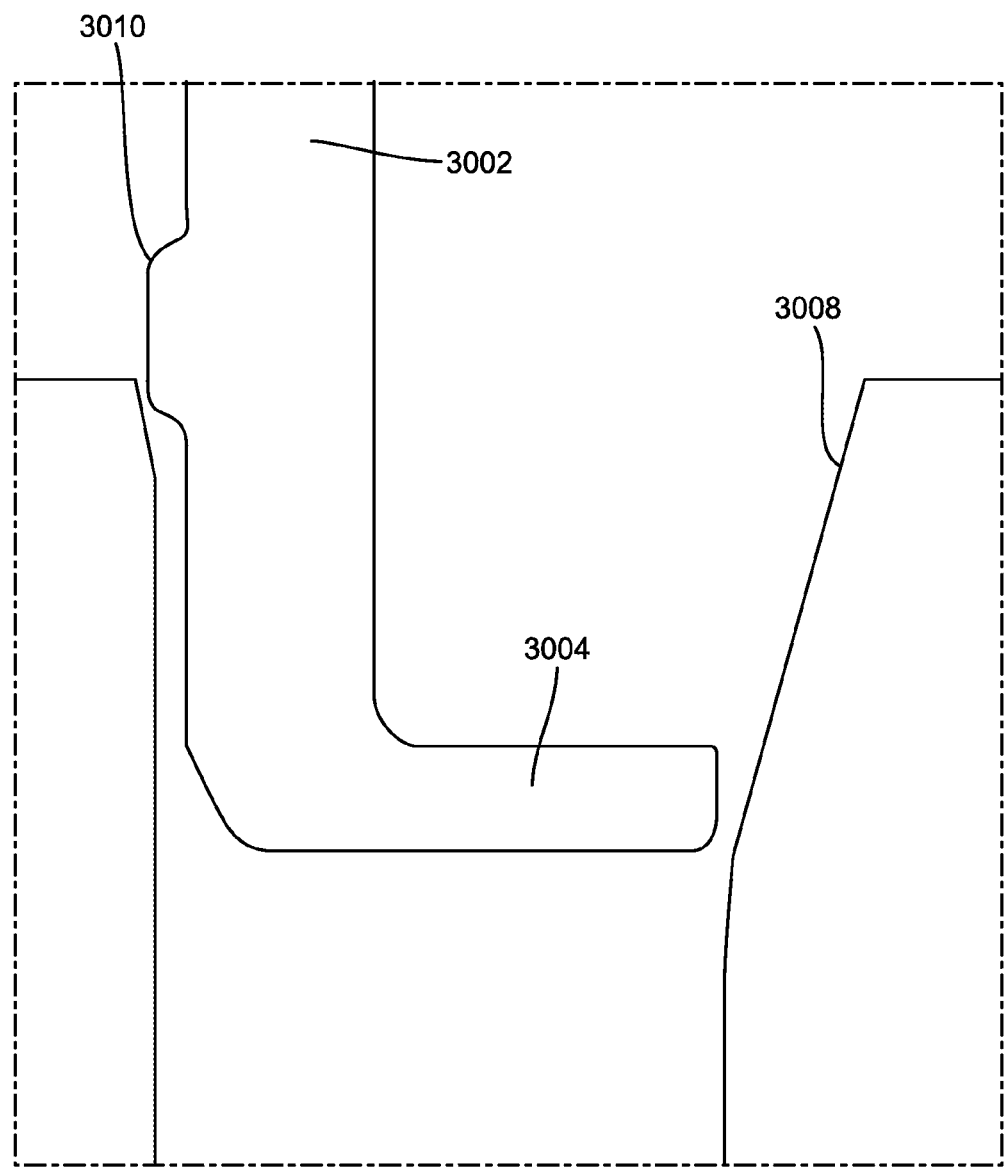
FIG. 31 shows a detailed view of a portion of FIG. 30.

Referring to FIG. 30, a bottom endplate 3000 is shown with a bottom endplate projection 3002 having a seal member 3004 structurally integrated therewith (and therefore structurally integrated with the bottom endplate 3000) according to an example embodiment. As used herein, structurally integrated means that two elements (e.g., the bottom endplate 3000 and the seal member 3004, etc.) are contained within (e.g., formed in, present in, part of, features of, etc.) a single unitary member and are not joined, adhesively attached, or otherwise connected to form an assembly of the two elements. As used herein, a single unitary member that contains two elements is not an assembly of the two elements. In some examples, the single unitary member is formed from molding or casting. In other examples, the single unitary member is formed via machining or printing.

The seal member 3004 extends from the bottom endplate projection 3002 at an angle (e.g., a right angle, etc.) such that a separate seal member is not necessary. Upon insertion of the bottom endplate projection 3002 into a return passage 3006, the seal member 3004 may deflect (e.g., bend upwards, etc.) relative to the bottom endplate projection 3002. The return passage 3006 includes a sloped portion 3008 and the bottom endplate projection 3002 includes a dimple 3010 on a side of the bottom endplate projection 3002 that is opposite to a side from which the seal member 3004 extends. As the bottom endplate projection 3002 is inserted into the return passage 3006, the seal member 3004 may be guided along the sloped portion 3008 and, upon sufficient insertion into the return passage 3006, the dimple 3010 causes translation of the seal member 3004 (e.g., to the right in FIG. 30), so as to cause the seal member 3004 to be biased against the return passage 3006. The sloped portion 3008 may guide insertion of the bottom endplate projection 3002 into the return passage 3006 and the dimple 3010 may increase sealing between the seal member 3004 and the return passage 3006.

Figure 33:
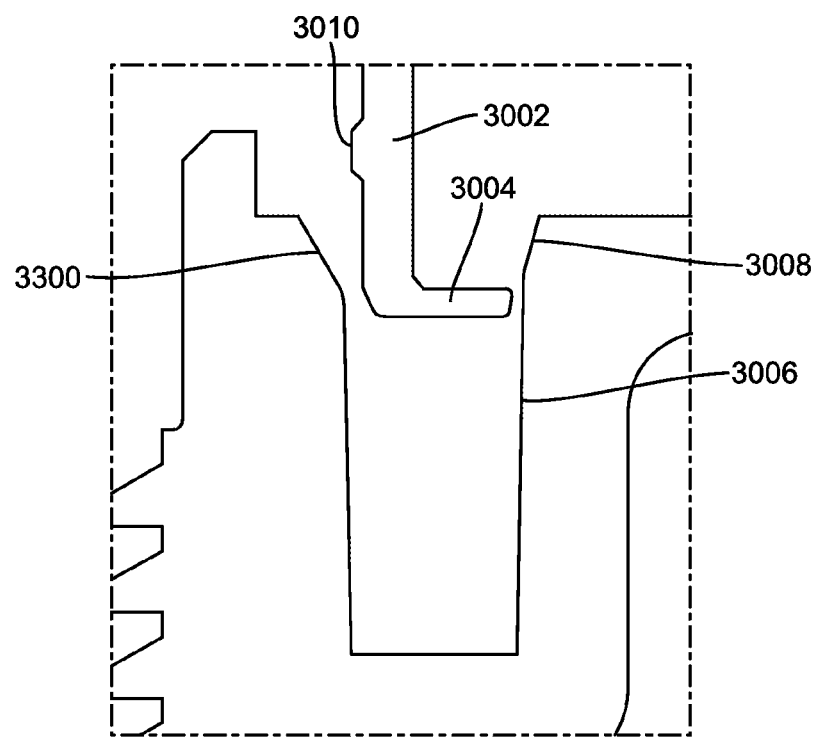
FIG. 33 shows a detailed view of a portion of FIG. 30.

In some embodiments, as shown in FIG. 33, the return passage 3006 includes a drafted surface 3300 opposite the sloped portion 3008. The drafted surface 3300 may assist in guiding insertion of the bottom endplate projection 3002 into the return passage 3006.

Figure 34:
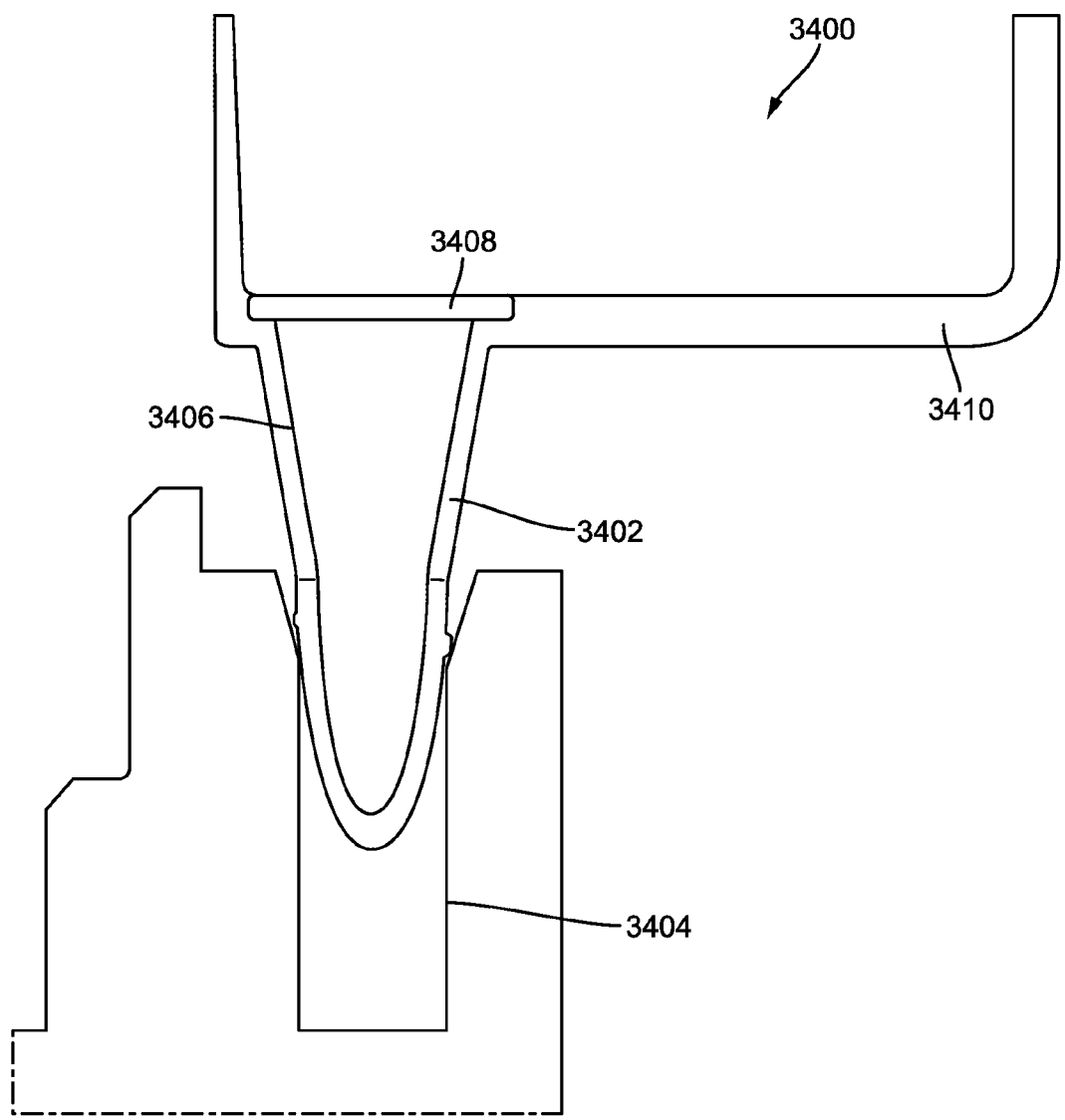
FIG. 34 shows a cross-sectional view of a portion of a filter assembly according to an example embodiment.
Figure 35:
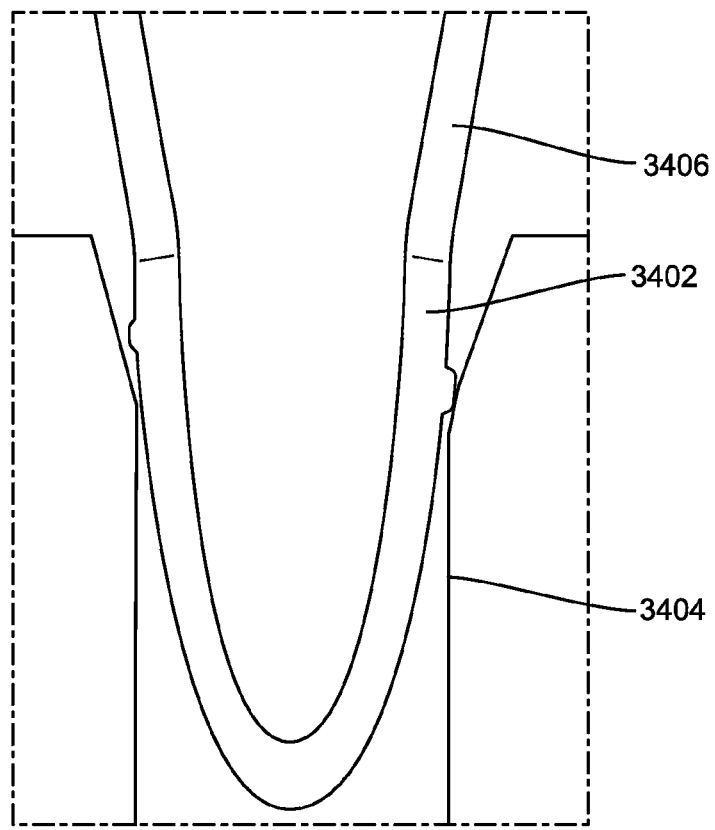
FIG. 35 shows a detailed view of a portion of FIG. 34.
Figure 36:
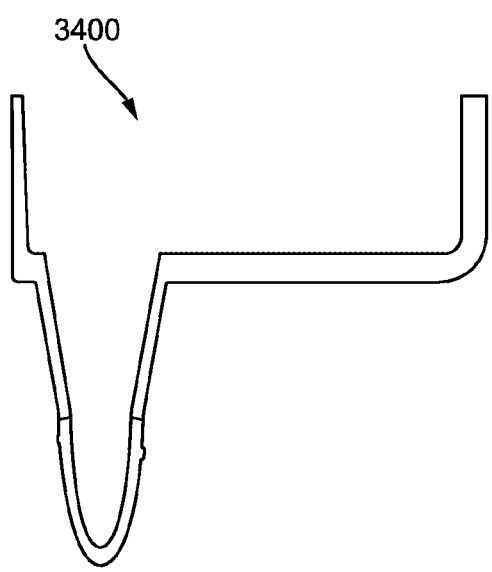
FIG. 36 shows a detailed view of a portion of FIG. 34.

FIGS. 34-36 illustrate cross-sectional views of another filter assembly according to multiple example embodiments. A bubble shaped feature is created in the end plate that gets compressed radially in this concept. Since the sealing achieved by radial compression, this concept is easiest to install and remove. Here also, 2 dimples are created on inner and outer side of bubble to create a seal member surface. The delaying length feature can be modified to meet a target application. The end plate is manufactured in one draw. The draw directions are shown in FIG. 36. If the epoxy used for gluing the media to the end-plate enters the bulb feature, it may not allow the bulb to deform easily, thereby increasing installation and removal force. Hence, to avoid the epoxy entering the bulb feature a separate plate is used that is snap fitted on the bulb end-plate.

Figure 37:
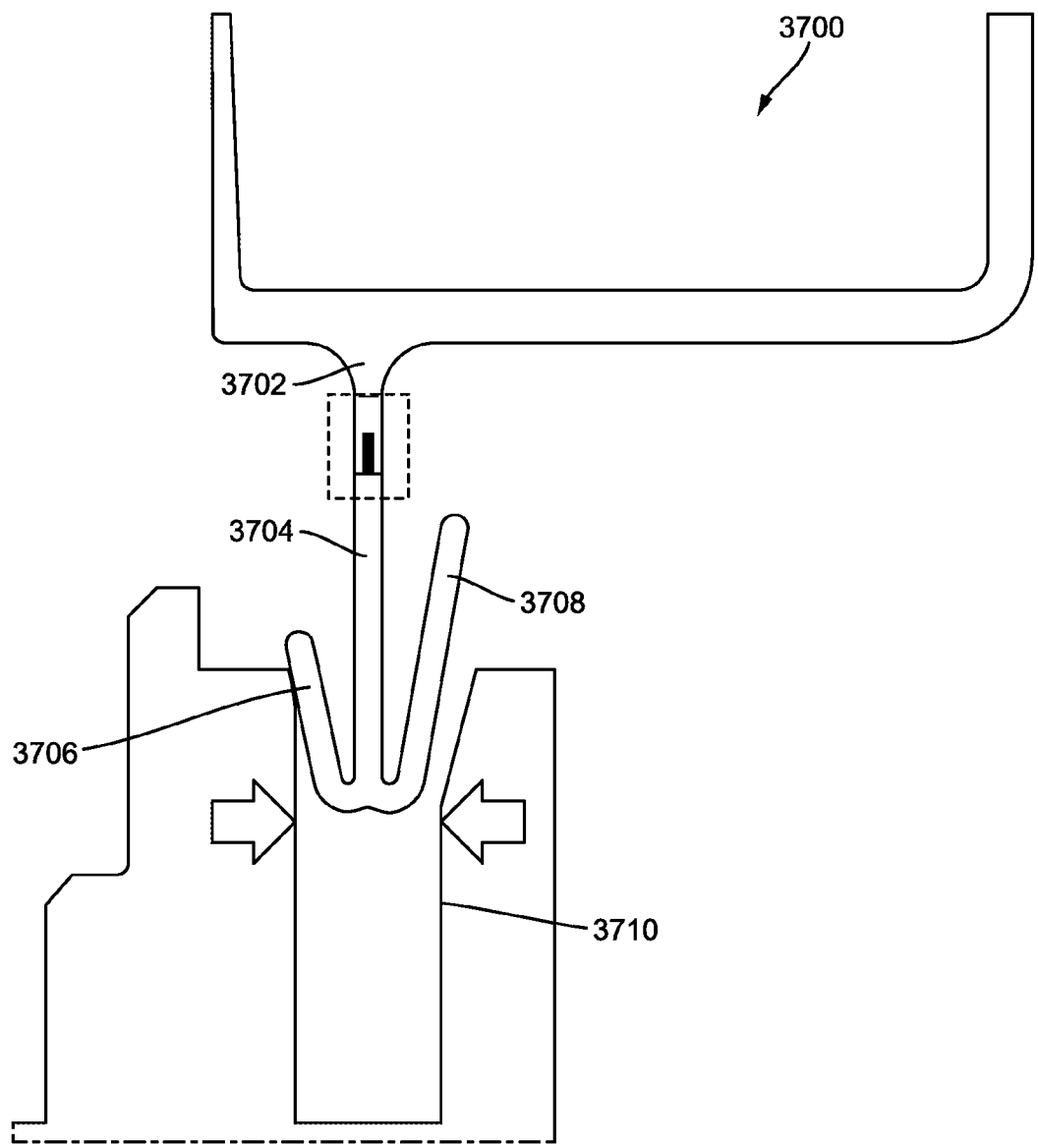
FIG. 37 shows a cross-sectional view of a portion of a filter assembly according to an example embodiment.
Figure 38:
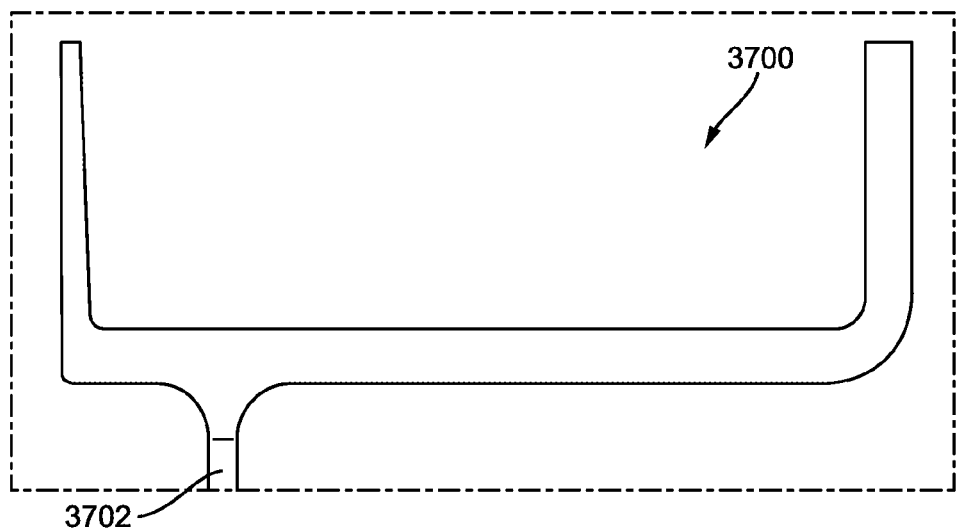
FIG. 38 shows a detailed view of a portion of FIG. 37.
Figure 39:
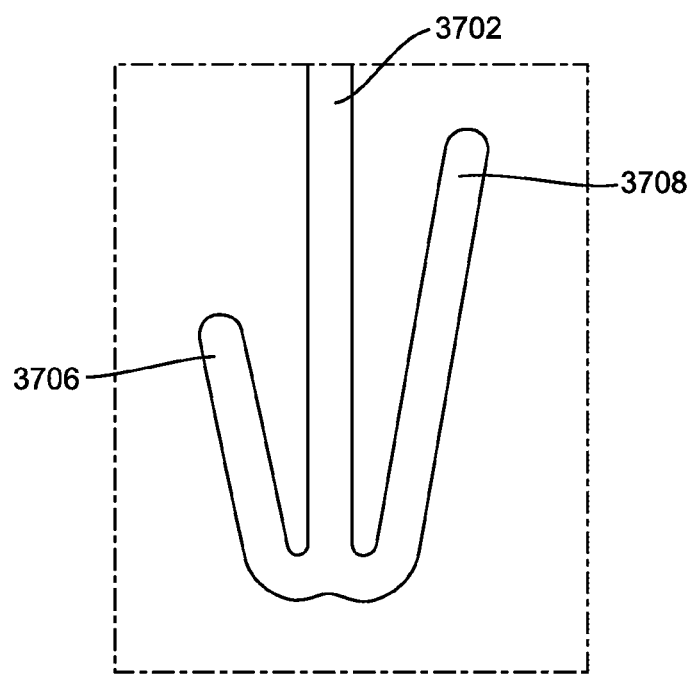
FIG. 39 shows a detailed view of a portion of FIG. 37.

FIGS. 37-39 illustrate cross-sectional views of another filter assembly according to multiple example embodiments. Sealing is achieved by using double lip pattern on both sides. Here also, sealing is achieved by radial compression of lips. Because of radial sealing, installation force is small for this design also. By adjusting the lengths of lips, sealing is achieved late for inner lip and first on outer lip. During downward motion of end plate (i.e. installation) an inner lip makes contact first and an outer lip seal member makes contact last. During upward motion of end plate (i.e. removal) an inner lip seal member disengages first while an outer lip seal member disengages last. The length of the lip seal members can be altered and interchanged also to obtain desirable results in every scenario. The delaying length feature can be modified to meet a target application. Because the lip seal member can't be manufactured directly (or in one draw), the lip seal member is separately produced. The end plate and lip seal member then can be joined together using friction or ultrasonic welding as shown in the figure. Thus, end plate is manufactured first in one draw. Next, the lip seal member is separately manufactured in one draw. Both parts are then joined together using a friction or ultra-sonic weld technology.

Referring to FIG. 34, a bottom endplate 3400 is shown with a bottom endplate projection 3402 that functions as a seal member according to an example embodiment. Specifically, the bottom endplate projection 3402 is configured to compress upon insertion into a return passage 3404. Compression of the bottom endplate projection 3402 is facilitated due to a void 3406 formed within the bottom endplate projection 3402. The void 3406 is bordered by a plate 3408 that is contiguous with a bottom endplate flange 3410 that interfaces with a filter cartridge. The plate 3408 mitigates accumulation of debris (e.g., epoxy, dirt, etc.) within the void 3406 and thereby functions to maintain desirable operation of the bottom endplate projection 3402.

Referring to FIG. 37, a bottom endplate 3700 is shown with a bottom endplate projection 3702 and a seal member 3704 welded thereto according to an example embodiment. The seal member 3704 includes a first seal member flange 3706 and a second seal member flange 3708. Both the first seal member flange 3706 and the second seal member flange 3708 are configured to deflect (e.g., towards the seal member 3704, etc.) upon insertion of the seal member 3704 into a return passage 3710.

Figure 40:
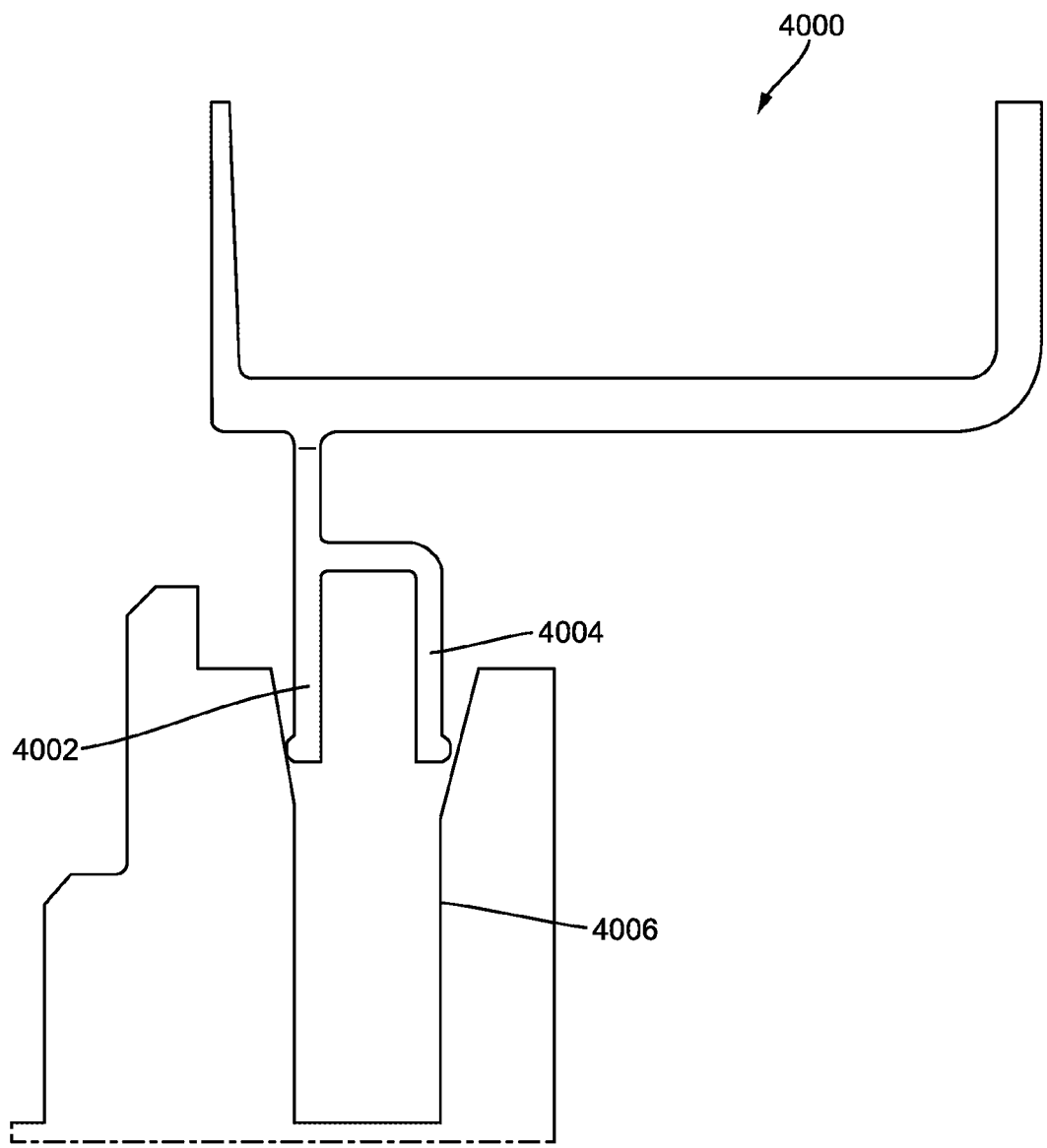
FIG. 40 shows a cross-sectional view of a portion of a filter assembly according to an example embodiment.
Figure 41:
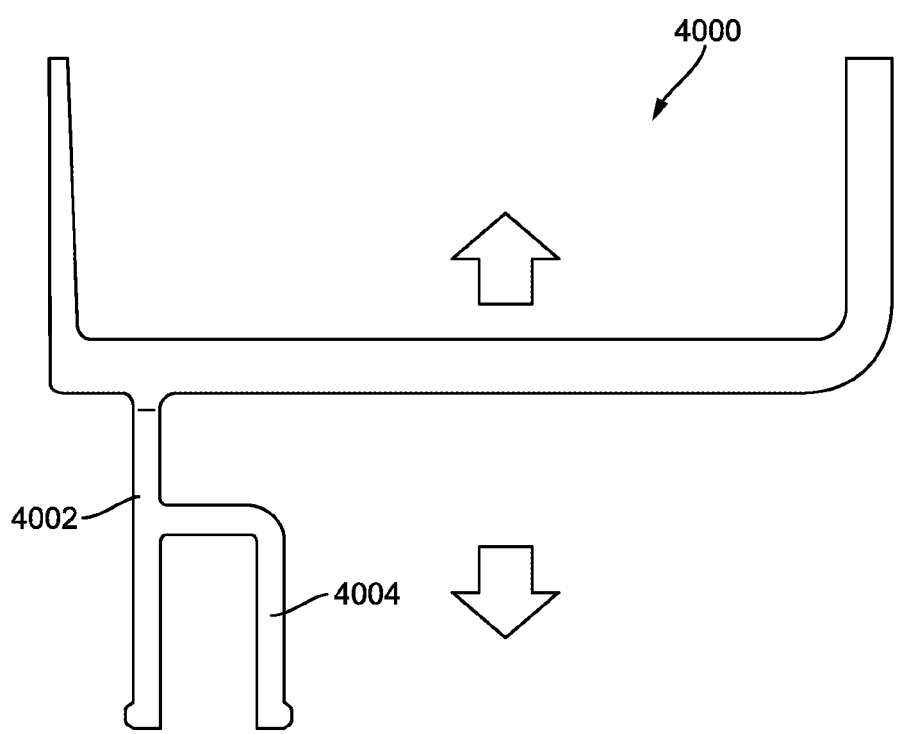
FIG. 41 shows a detailed view of a portion of FIG. 40.

FIGS. 40 and 41 illustrate cross-sectional views of another filter assembly according to multiple example embodiments. Sealing is achieved at the tip of two legs of h using dimples. A length of each of the two legs is adjusted such that inner leg engages last but disengages first. Keeping length of both legs same, chamfer on the groove can be adjusted to get similar effect as mentioned above. The delaying length feature can be modified to meet a target application. The end plate is manufactured as a single part in one draw. The core out directions are shown in FIG. 41.

Referring to FIG. 40, a bottom endplate 4000 is shown with a bottom endplate projection 4002 that functions as a seal member and that has an additional seal member 4004 structurally integrated therewith (and therefore structurally integrated with the bottom endplate 4000) according to an example embodiment. Both the bottom endplate projection 4002 and the additional seal member 4004 are configured to deflect (e.g., towards each other, etc.) upon insertion of the bottom endplate projection 4002 into a return passage 4006. The additional seal member 4004 may be substantially parallel to the bottom endplate projection 4002.

Figure 42:
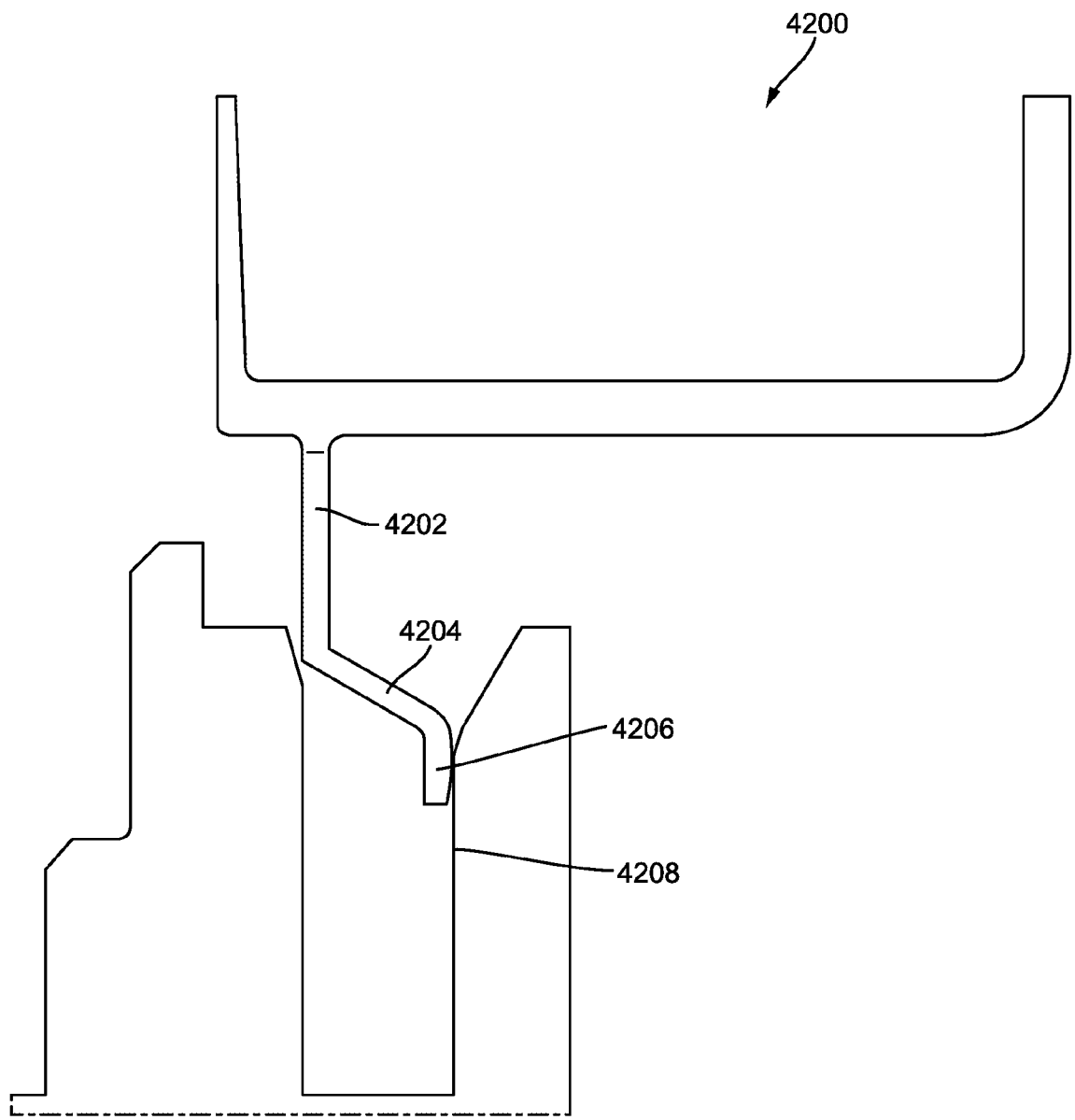
FIG. 42 shows a cross-sectional view of a portion of a filter assembly according to an example embodiment.
Figure 43:
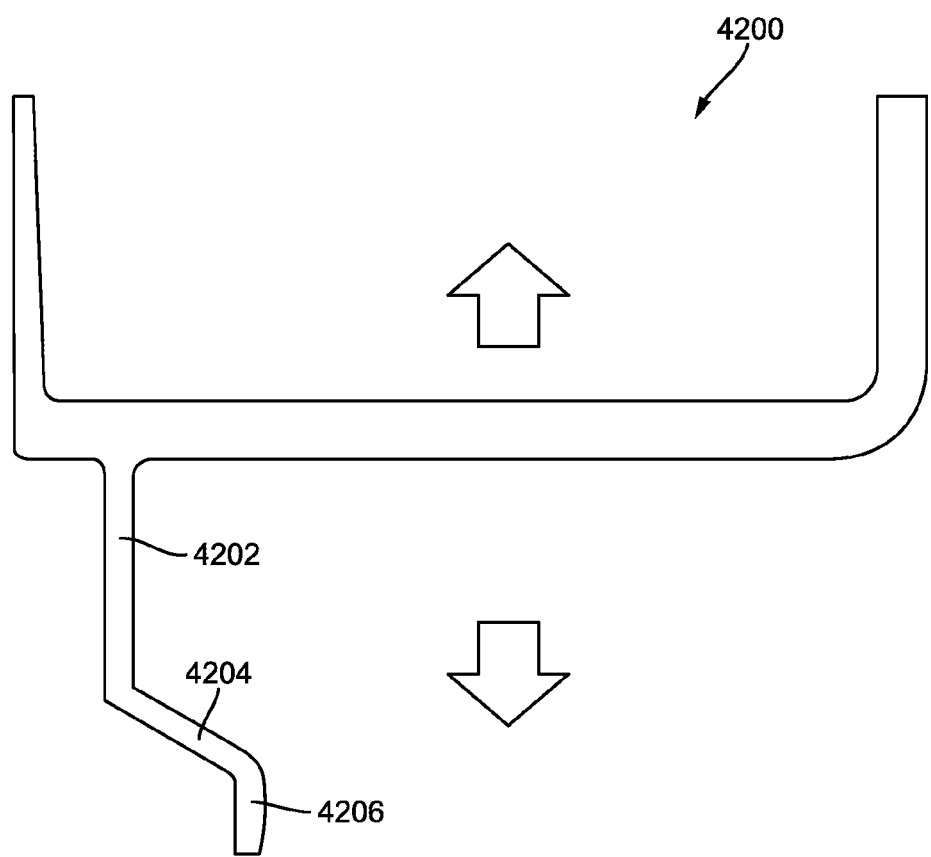
FIG. 43 shows a detailed view of a portion of FIG. 42.

FIGS. 42 and 43 illustrate cross-sectional views of another filter assembly according to multiple example embodiments. In such embodiments, sealing is achieved on the outer surface first while there is a small radial clearance at outer side. Once an inner surface comes in contact with the groove wall, the Z seal member starts bending and deflect in inward direction. Therefore, with more downward motion, the inner wall of z seal member also makes contact with groove wall. The delaying length feature can be modified to meet a target application. The end plate is manufactured as a single part in one draw. The core out directions are shown in FIG. 43.

Referring to FIG. 42, a bottom endplate 4200 is shown with a bottom endplate projection 4202 that includes a hinge member 4204 and a seal member 4206 structurally integrated therewith (and therefore structurally integrated with the bottom endplate 4200) according to an example embodiment. Insertion of the bottom endplate projection 4202 into a return passage 4208 causes compression of the seal member 4206 towards the bottom endplate projection 4202. This compression is facilitated by the hinge member 4204.

Figure 44:
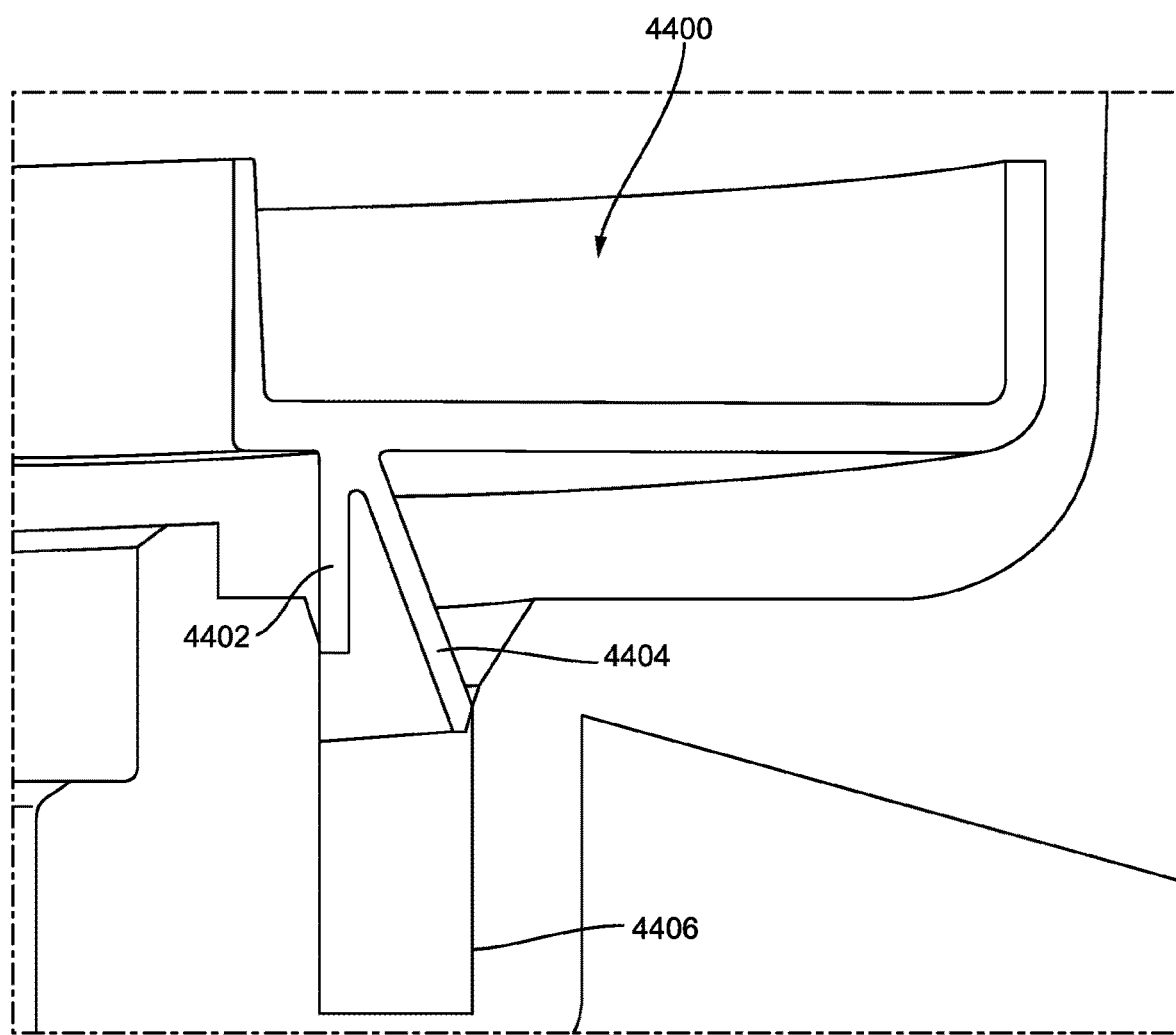
FIG. 44 shows a cross-sectional view of a portion of a filter assembly according to an example embodiment.
Figure 45:
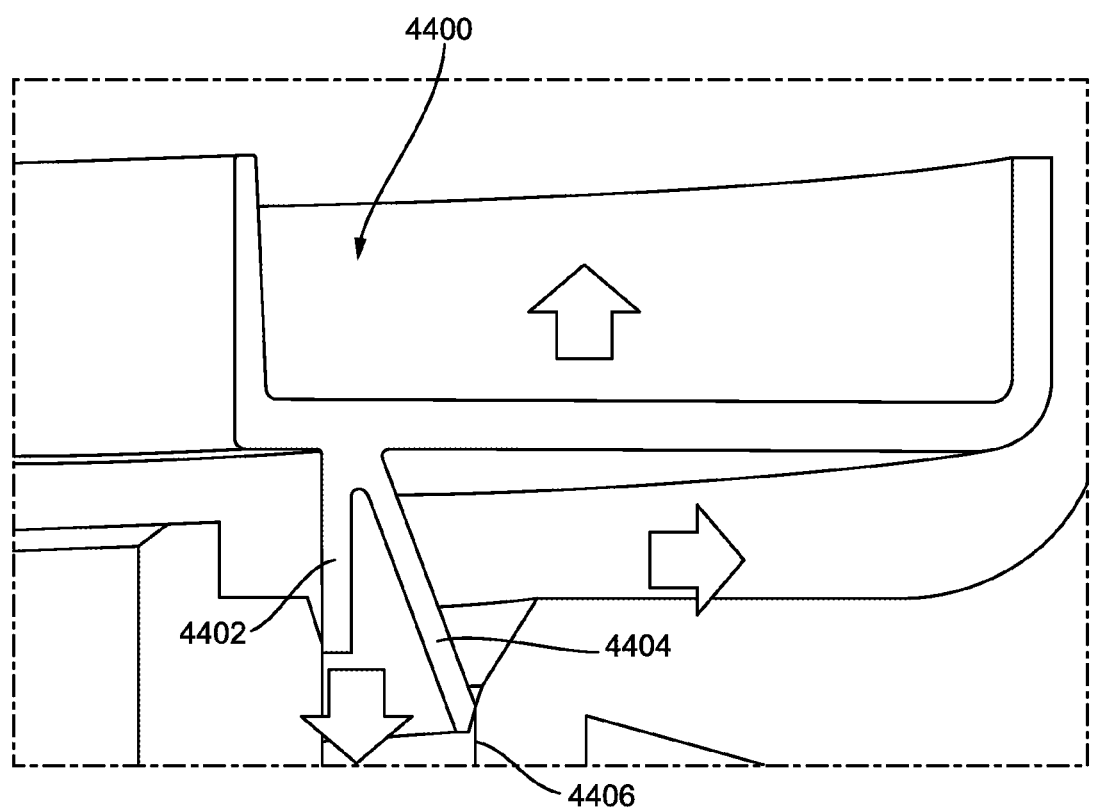
FIG. 45 shows a detailed view of a portion of FIG. 44.

FIGS. 44 and 45 illustrate cross-sectional views of another filter assembly according to multiple example embodiments. Yet in another concept, a v shape profile is developed to develop a seal member. Sealing is achieved by radial compression. The length of inner and outer arm of "v" is modified to achieve sealing at different timings. A small chamfer is added on outer arm of v to ensure smooth entry. The delaying length feature can be modified to meet a target application. The end plate is manufactured as a single part in one draw. The core out directions are shown in FIG. 45.

Referring to FIG. 44, a bottom endplate 4400 is shown with a bottom endplate projection 4402 that includes a seal member 4404 structurally integrated therewith (and therefore structurally integrated with the bottom endplate 4400)

according to an example embodiment. Insertion of the bottom endplate projection 4402 into a return passage 4406 causes compression of the seal member 4404 towards the bottom endplate projection 4402. This compression causes a void between the seal member 4404 and the bottom endplate projection 4402 to be decreased.

Figure 46:
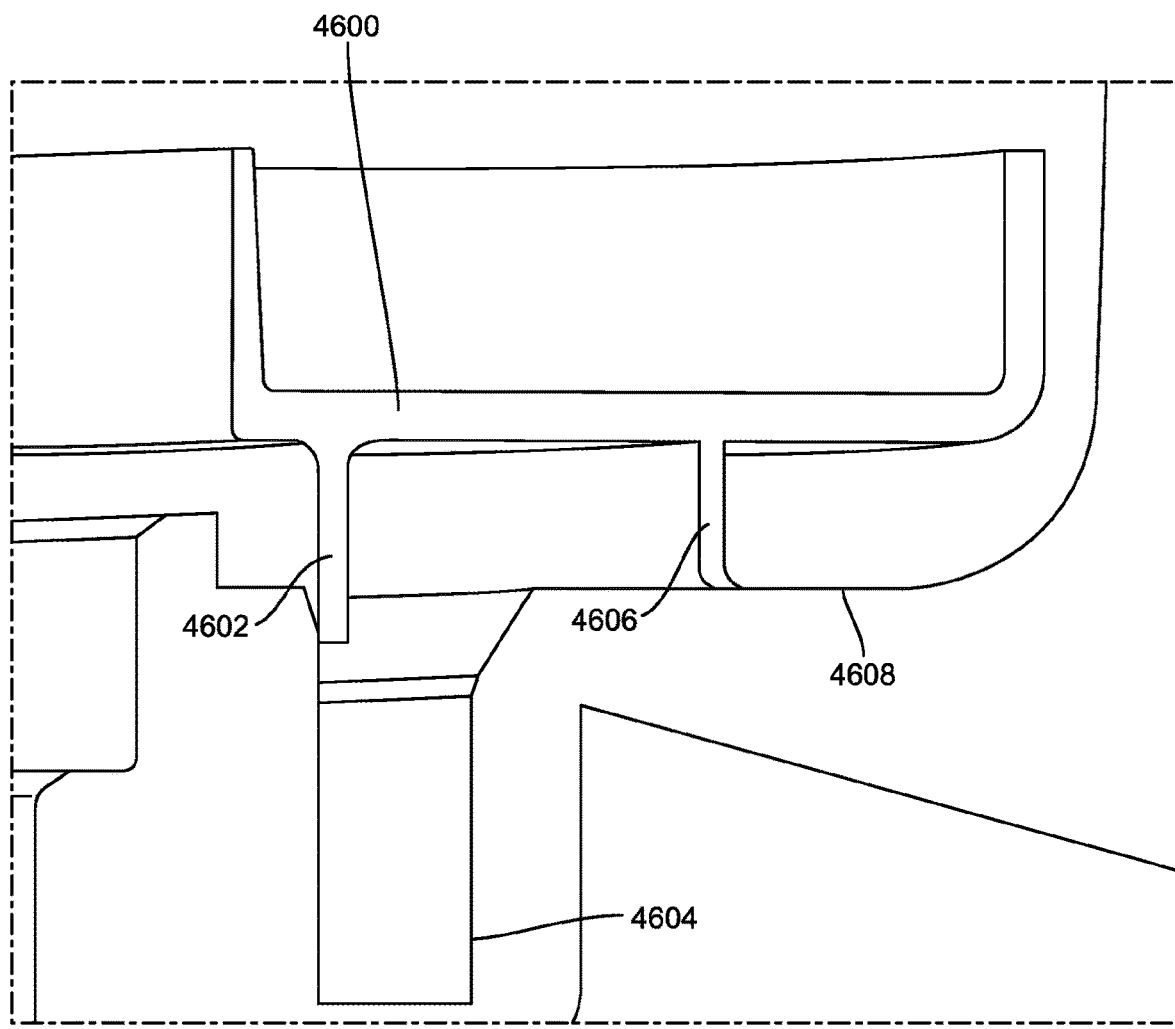
FIG. 46 shows a cross-sectional view of a portion of a filter assembly according to an example embodiment.
Figure 47:
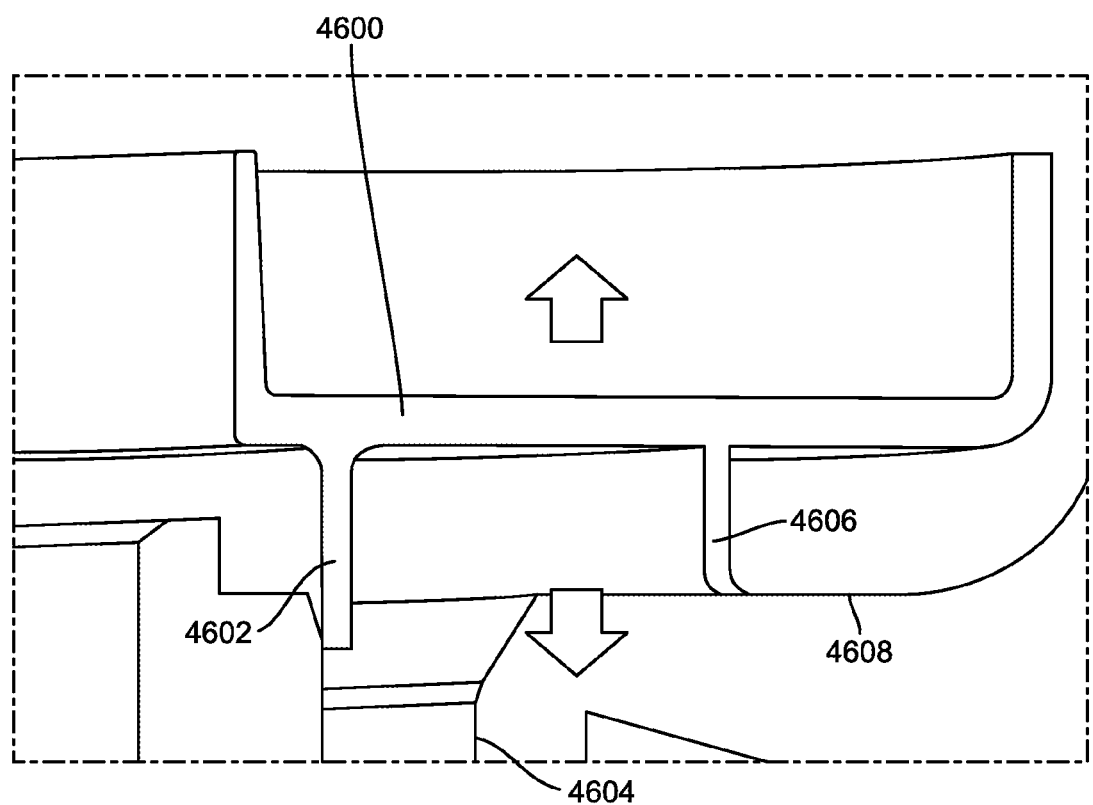
FIG. 47 shows a detailed view of a portion of FIG. 46.

FIGS. 46 and 47 illustrate cross-sectional views of another filter assembly according to multiple example embodiments. This is a combination seal member concept. Here for fluid at one side, sealing is established by a collapsible/deformable vertical leg. This sealing is achieved is on horizontal surface. The leg may maintain sealing on the horizontal surface as long as there is a downward force on it due to cartridge assembly. The other sealing surface may be same and here, it is achieved on the inner vertical surface of groove. The delaying length feature can be modified to meet a target application. The end plate is manufactured as a single part in one draw. The core out directions are shown in FIG. 47.

Referring to FIG. 46, a bottom endplate 4600 is shown with a bottom endplate projection 4602 that functions as a seal member according to an example embodiment. Rather than forming a seal exclusively in a return passage 4604 upon insertion of the bottom endplate projection 4602 in the return passage 4604, the bottom endplate 4600 includes a seal member 4606 protecting therefrom an interfacing with a filter housing 4608 (e.g., with a floor of the filter housing 4608, etc.) radially outward of the return passage 4604. As a result of inserting the bottom endplate projection 4602 in the return passage 4604, the seal member 4606 is compressed against the filter housing 4608 and a seal is formed between the bottom endplate projection 4602, the return passage 4604, the bottom endplate 4600, the seal member 4606, and the filter housing 4608.

Figure 48:
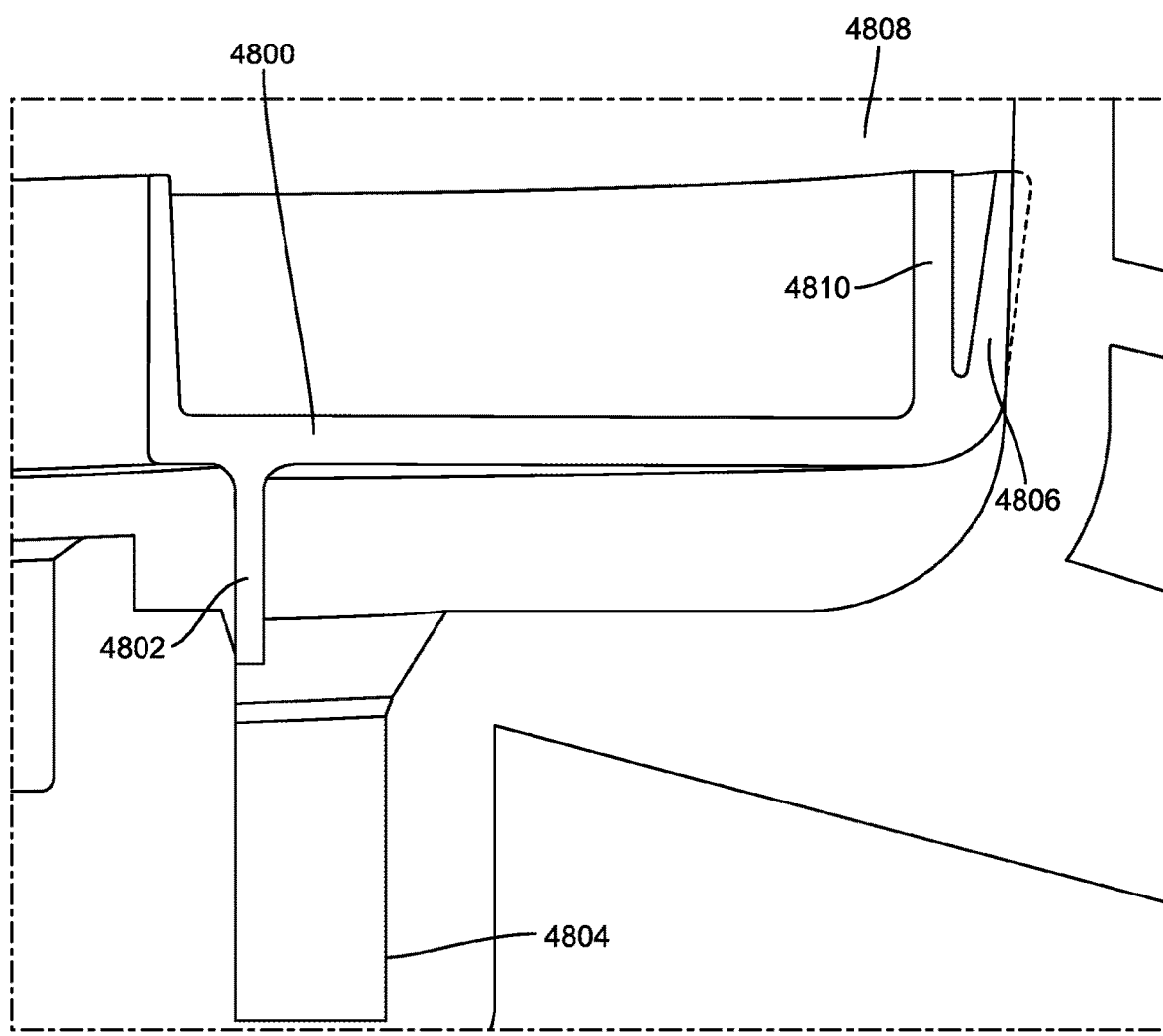
FIG. 48 shows a cross-sectional view of a portion of a filter assembly according to an example embodiment.
Figure 49:
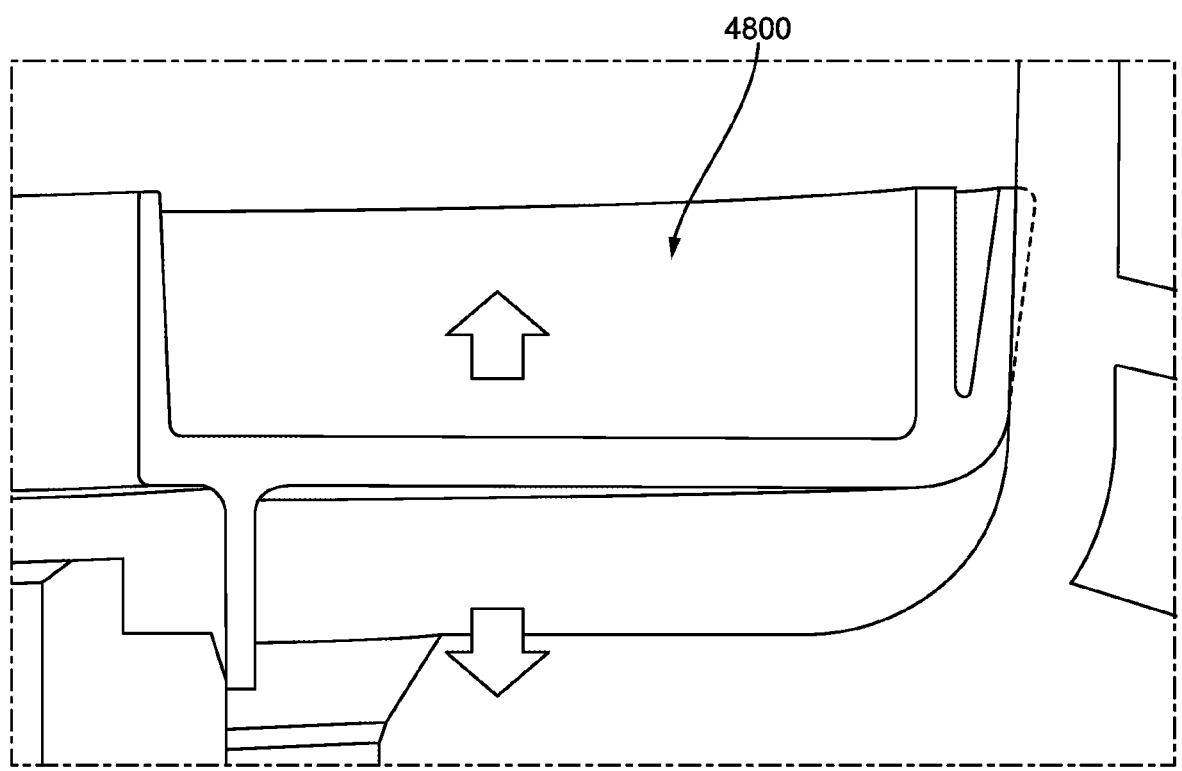
FIG. 49 shows a detailed view of a portion of FIG. 48.

FIGS. 48 and 49 illustrate cross-sectional views of another filter assembly according to multiple example embodiments. In this concept, a lip seal member is present at the outermost diameter of end plate. Near an inner portion, the sealing is achieved by a straight feature as shown in FIG. 49. The installation force is low due to highly deformable lip seal member feature. Delaying length feature can be modified to meet a target application. The end plate is manufactured as a single part in one draw. The core out directions are shown in FIG. 49.

Referring to FIG. 48, a bottom endplate 4800 is shown with a bottom endplate projection 4802 that functions as a seal member according to an example embodiment. Rather than forming a seal exclusively in a return passage 4804 upon insertion of the bottom endplate projection 4802 in the return passage 4804, the bottom endplate 4800 includes a seal member 4806 protecting therefrom an interfacing with a filter housing 4808 (e.g., with a wall of the filter housing 4808, etc.) radially outward of the return passage 4804. As a result of inserting the bottom endplate projection 4802 in the return passage 4804, the seal member 4806 is compressed against the filter housing 4808 and a seal is formed between the bottom endplate projection 4802, the return passage 4804, the bottom endplate 4800, the seal member 4806, and the filter housing 4808. The bottom endplate 4800 includes a bottom endplate flange 4810 that interfaces with a filter cartridge (e.g., with an outer surface of the filter cartridge, etc.). The seal member 4806 is contiguous with the bottom endplate flange 4810. Compression of the seal member 4806 caused by insertion of the bottom endplate projection 4802 in the return passage 4804 causes a void between the seal member 4806 and the bottom endplate flange 4810 to be decreased. The filter housing 4808 may be shaped (e.g., rounded, filleted, chamfered, etc.) to increase deflection of the seal member 4806 upon insertion of the bottom endplate projection 4802 into the return passage 4804, thereby increasing sealing between the seal member 4806 and the filter housing 4808.

Figure 50:
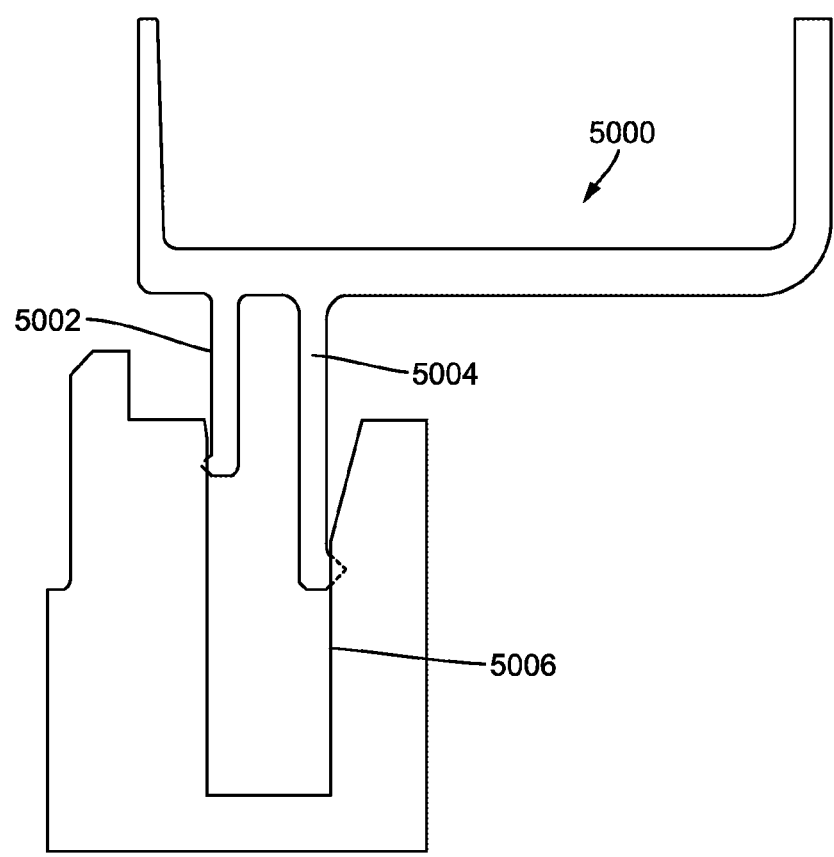
FIG. 50 shows a cross-sectional view of a portion of a filter assembly according to an example embodiment.
Figure 51:
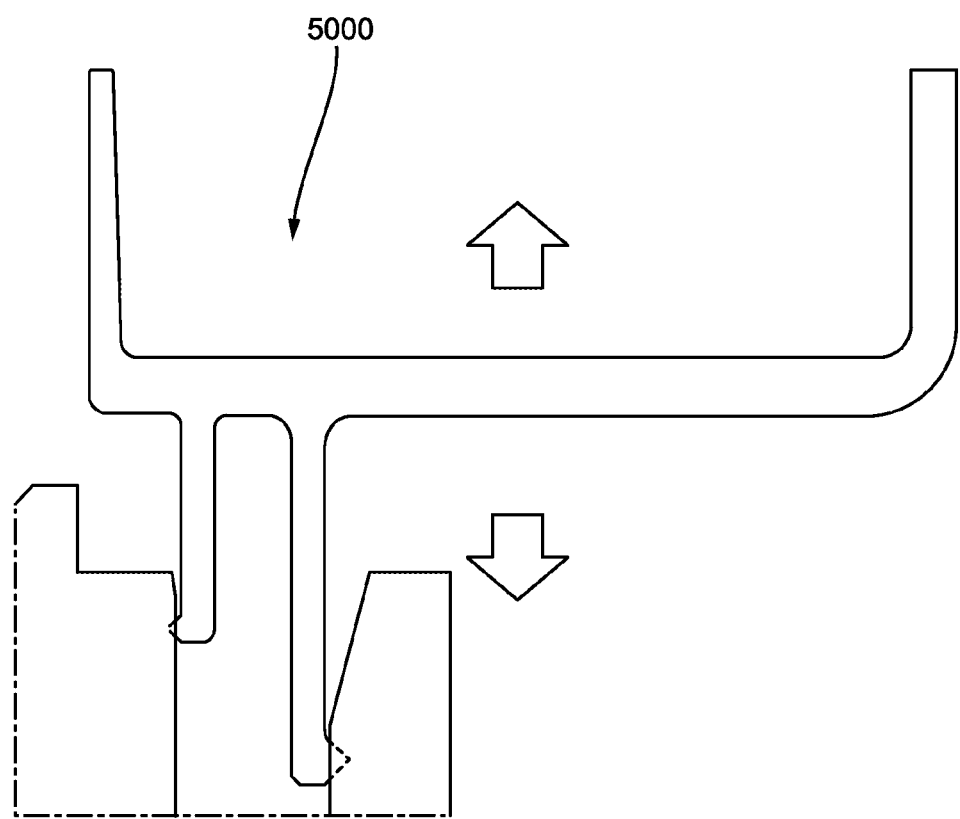
FIG. 51 shows a detailed view of a portion of FIG. 50.

FIGS. 50 and 51 illustrate cross-sectional views of another filter assembly according to multiple example embodiments. In this concept, two straight legs/arms develop the required sealing surface. The seal member is developed due to the bending of legs/arms. A crushable dimple feature can be added on both legs/arms to ensure a tight seal. The end plate is manufactured as a single part in one draw. The core out directions are shown in FIG. 51.

Referring to FIG. 50, a bottom endplate 5000 is shown with a bottom endplate projection 5002 that functions as a seal member and with a separate seal member 5004 according to an example embodiment. The bottom endplate 5000 is configured such that both the bottom endplate projection 5002 and the separate seal member 5004 may be inserted into a return passage 5006 simultaneously. Insertion of the bottom endplate projection 5002 and the separate seal member 5004 into the return passage 5006 causes compression of the bottom endplate projection 5002 towards the separate seal member 5004 and vice versa.

Figure 52:
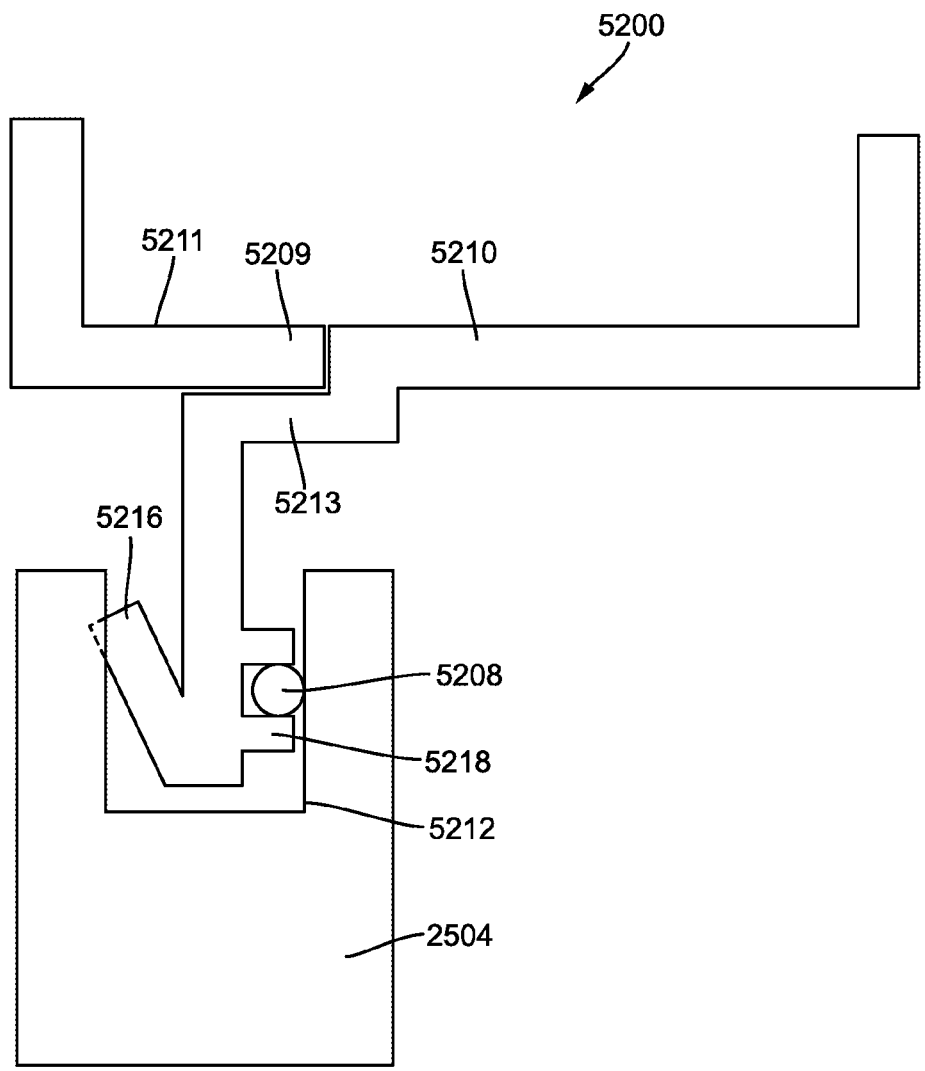
FIG. 52 shows a cross-sectional view of a portion of a filter assembly according to an example embodiment.
Figure 53:
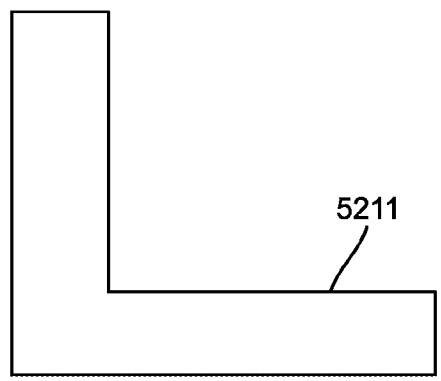
FIG. 53 shows a detailed view of a portion of FIG. 52.
Figure 54:
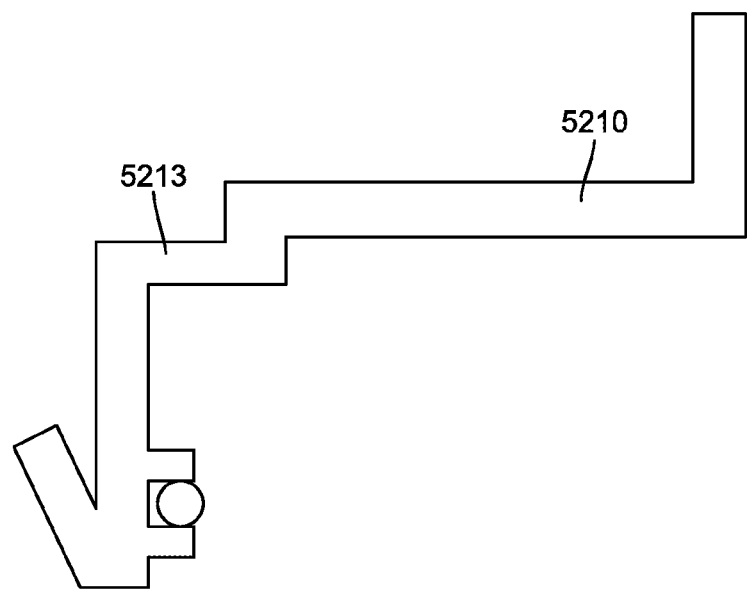
FIG. 54 shows a detailed view of another portion of FIG. 52.

FIGS. 52-54 illustrate cross-sectional views of another filter assembly according to multiple example embodiments. Fluids at two sides are separated by an O-ring and a lip seal member. Here also, the delaying feature can be added to control the drainage. The end-plate is manufactured in two different stages. At first, the inner end plate is developed in one draw as per draw direction in FIG. 53. In next stage, the outer portion of end plate is developed in one draw. The draw directions are as shown in FIG. 54. Both parts are then joined together at the sitting area with snaps. Pouring the epoxy during media installation forms the joint between two parts.

Referring to FIG. 52, a cross-sectional view of a filter assembly 5200 is shown according to an example embodiment. The filter assembly 5200 includes a filter housing lid, a filter housing 5204, a filter cartridge, a seal member 5208, a bottom endplate 5210 (e.g., endcap, etc.), a bottom endplate insert 5211, and a return passage 5212. The filter cartridge interfaces with the bottom endplate 5210. The bottom endplate insert 5211 includes a bottom endplate insert shelf 5209 that interfaces with a bottom endplate shelf 5213 of the bottom endplate 5210. The bottom endplate 5210 includes a bottom endplate projection 5214 which is configured to be inserted in the return passage 5212. The bottom endplate projection 5214 includes a structurally integrated seal member 5216 and a seal member receiver 5218 configured to receive the seal member 5208. The structurally integrated seal member 5216 is also structurally integrated with the bottom endplate 5210. Upon insertion of the bottom endplate projection 5214 into the return passage 5212, the structurally integrated seal member 5216 is compressed towards the seal member receiver 5218 and the seal member 5208 is compressed towards the structurally integrated seal member 5216.

Figure 55:
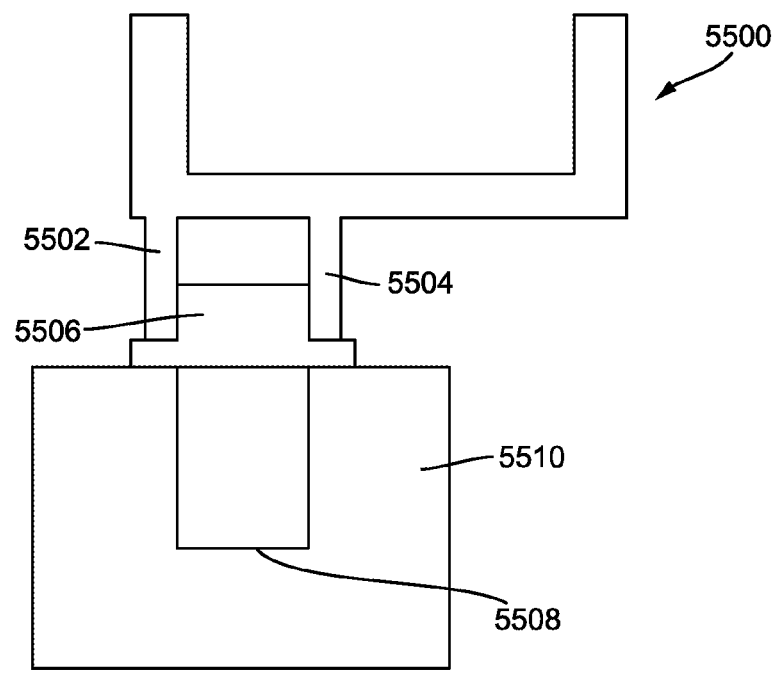
FIG. 55 shows a cross-sectional view of a portion of a filter assembly according to an example embodiment.
Figure 56:
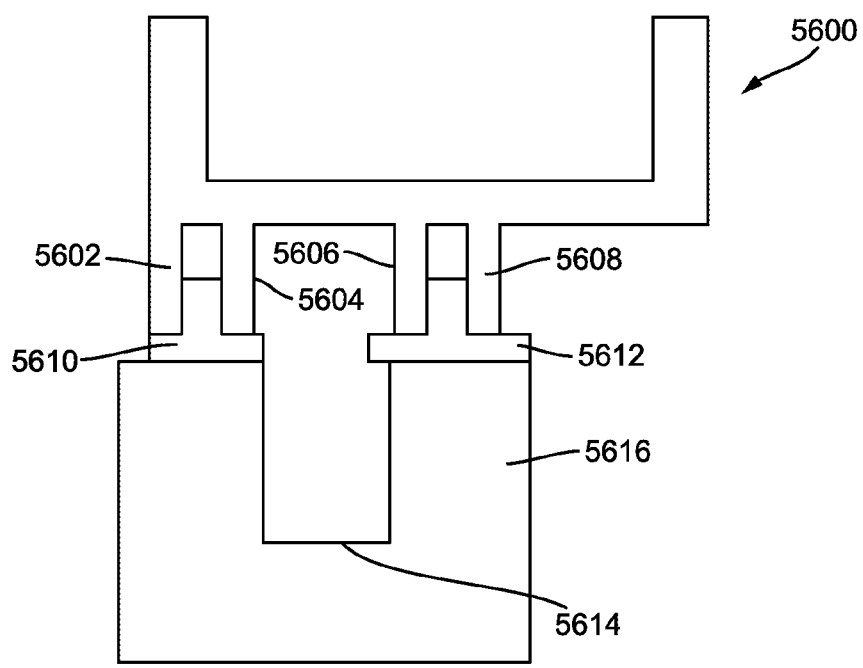
FIG. 56 shows a cross-sectional view of a portion of a filter assembly according to an example embodiment.
Figure 57:
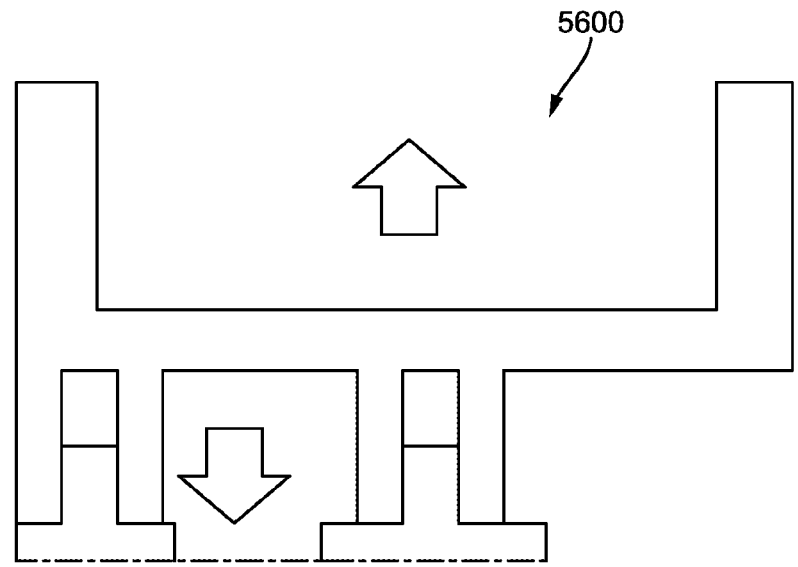
FIG. 57 shows a detailed view of another portion of FIG. 56.
Figure 58:
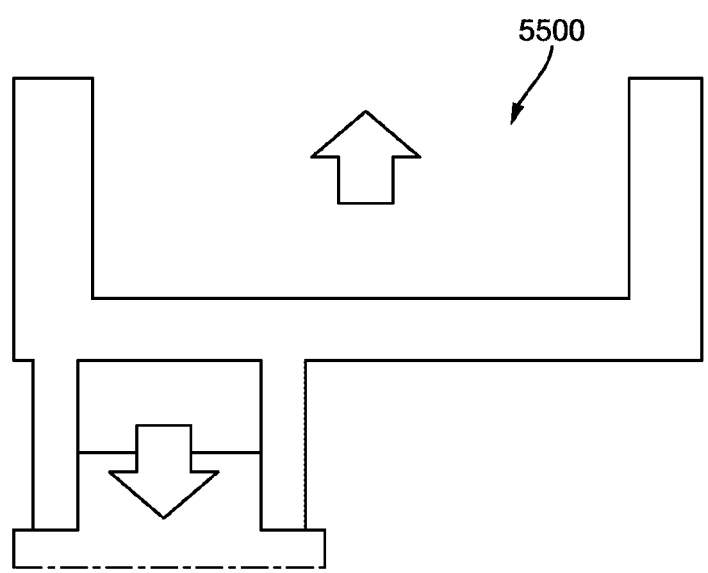
FIG. 58 shows a detailed view of another portion of FIG. 55.

FIGS. 55-58 illustrate cross-sectional views of another filter assembly according to multiple example embodiments. In this concept, sealing is achieved on the horizontal surface by the cartridge assembly force. In some embodiments, such as are shown in FIGS. 55 and 58, a single gasket is used that covers the entire opening of the drain port in the housing.

Referring to FIG. 55, a bottom endplate 5500 is shown with a first bottom endplate projection 5502, a second bottom endplate projection 5504, and a seal member 5506 according to an example embodiment. Rather than forming a seal in a return passage 5508, the bottom endplate 5500 forms a seal over the return passage 5508 by compressing the seal member 5506 against a filter housing 5510 around the return passage 5508. Specifically, the first bottom endplate projection 5502 and the second bottom endplate projection 5504 each compress the seal member 5506 against the filter housing 5510.

Referring to FIG. 56, a bottom endplate 5600 is shown with a first bottom endplate projection 5602, a second bottom endplate projection 5604, a third bottom endplate projection 5606, a fourth bottom endplate projection 5608, a first seal member 5610, and a second seal member 5612 according to an example embodiment. Rather than forming a seal in a return passage 5614, the bottom endplate 5600 forms a seal over the return passage 5614 by compressing the first seal member 5610 and the second seal member 5612 against a filter housing 5616 around the return passage 5614. Specifically, the first bottom endplate projection 5602 and the second bottom endplate projection 5604 compress the first seal member 5610 against the filter housing 5616 and the third bottom endplate projection 5606 and the fourth bottom endplate projection 5608 compress the second seal member 5612 against the filter housing 5616.

Figure 59:
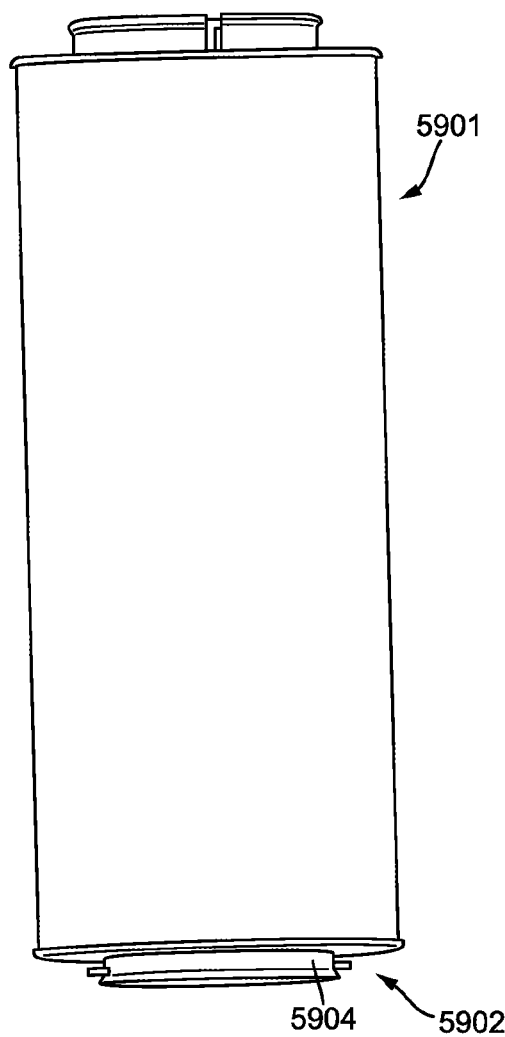
FIG. 59 shows a perspective view of a portion of a filter assembly according to an example embodiment.
Figure 60:
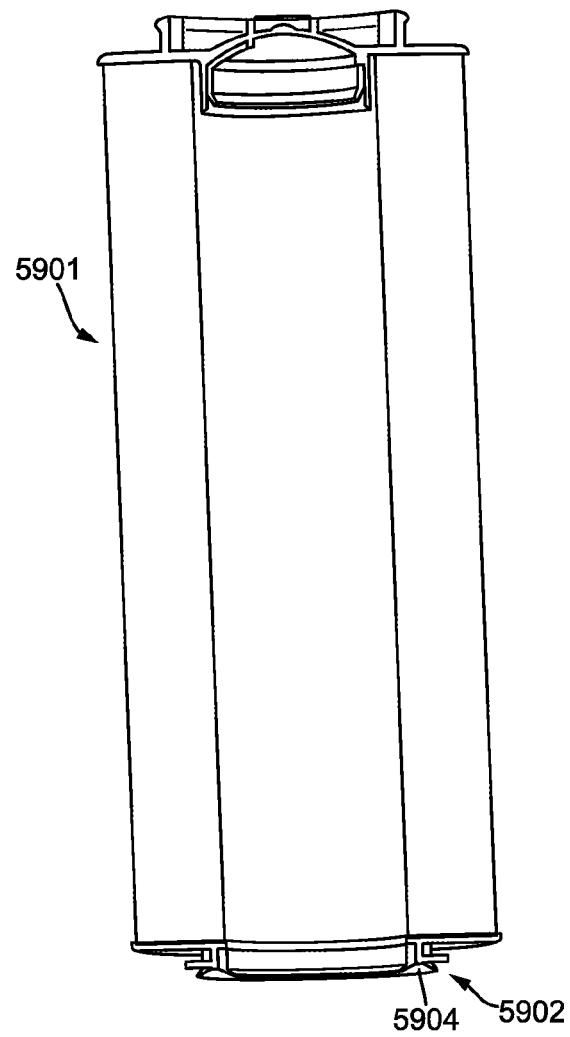
FIG. 60 shows a cross-sectional view of the portion of the filter assembly shown in FIG. 59.
Figure 61:
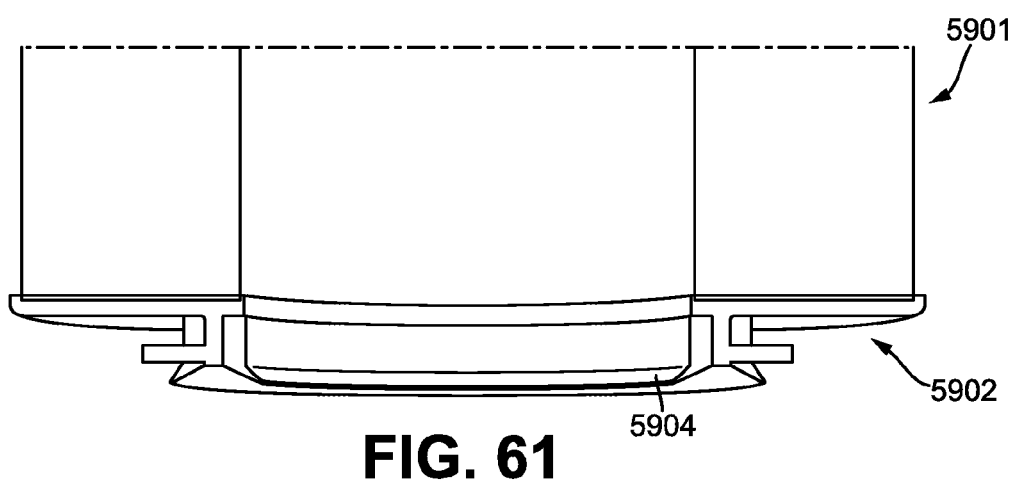
FIG. 61 shows a detailed view of a portion of FIG. 60.
Figure 62:
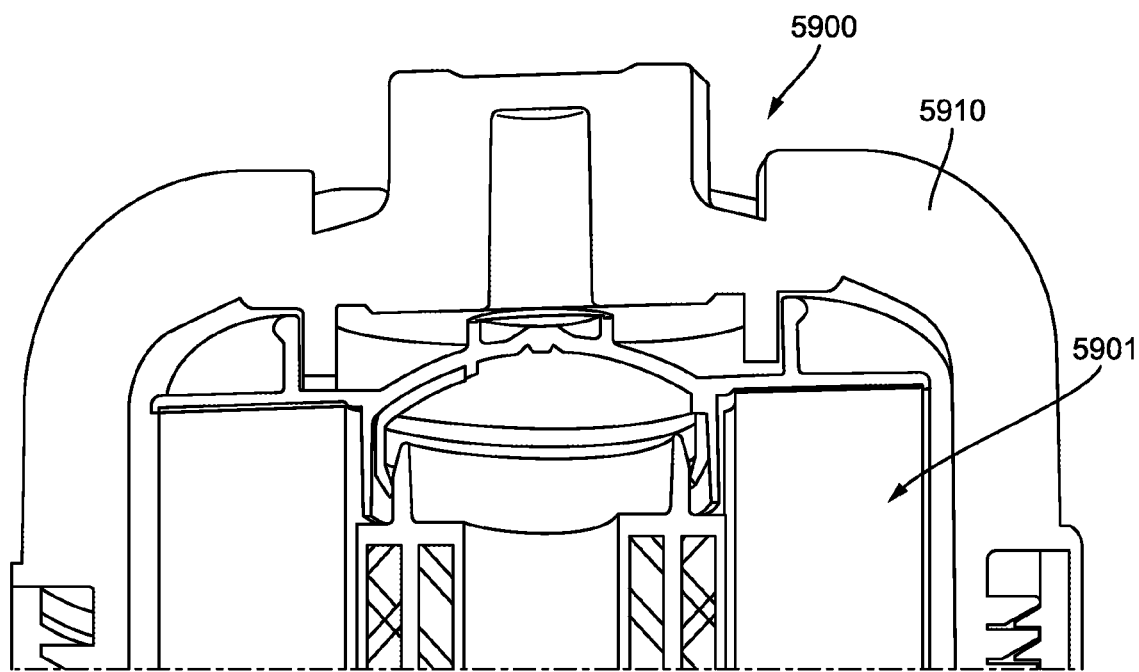
FIG. 62 shows a perspective view of another portion of a filter assembly.

In other embodiments, such as are shown in FIGS. 56 and 59, two separate gaskets are used, each one will obstruct the corresponding fluid path. The end plate is manufactured as a single part in one draw. The core out directions for end plates are shown in FIGS. 57 and 58. The gasket is then installed in the groove of end plate using glue.

Figure 63:
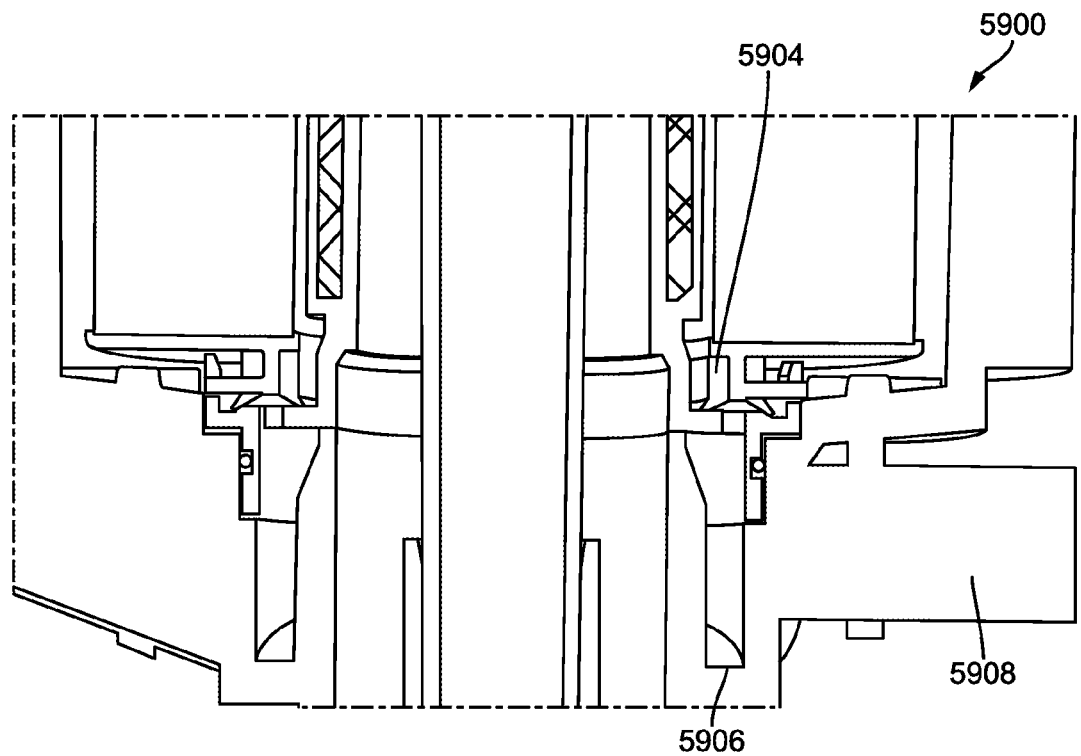
FIG. 63 shows a detailed view of a portion of FIG. 62.
Figure 69:
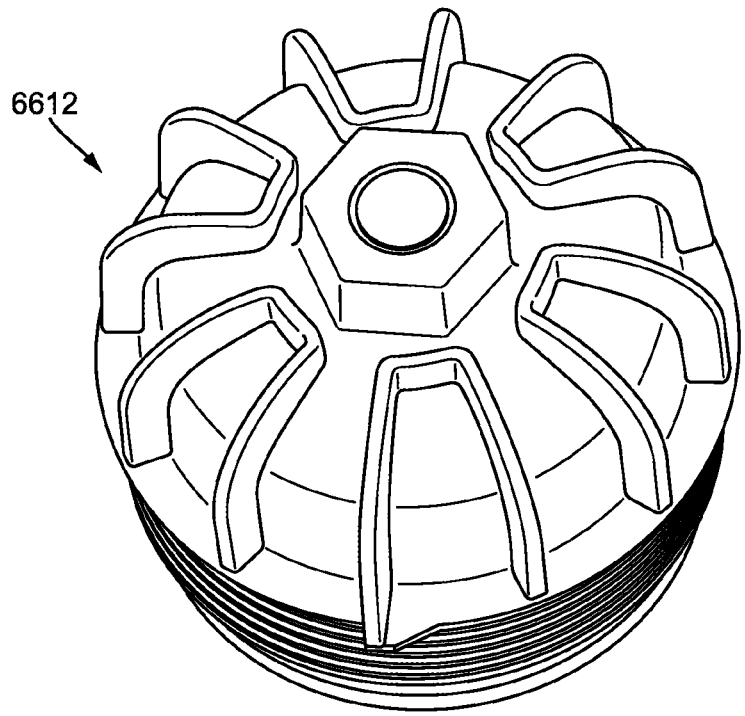
FIG. 69 shows a perspective view of another portion of a filter assembly.
Figure 70:
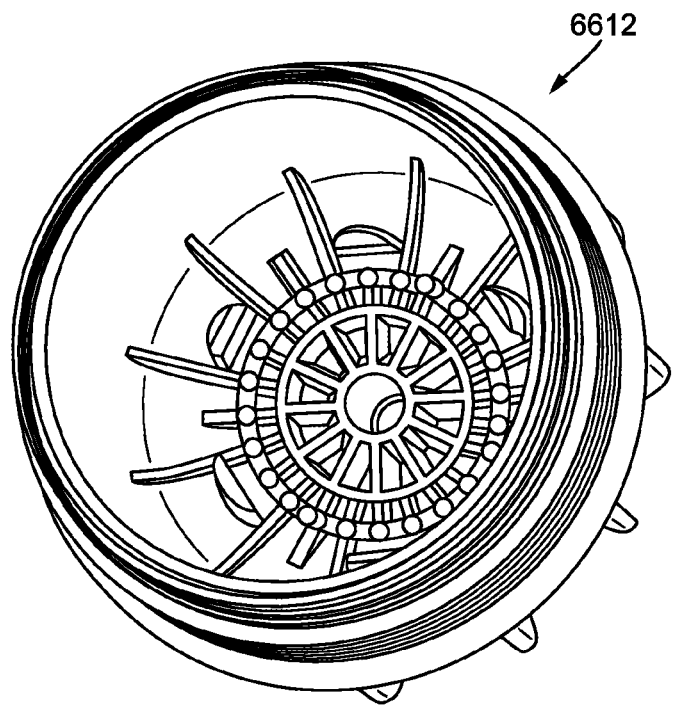
FIG. 70 shows another perspective view of the portion of a filter assembly shown in FIG. 69.
Figure 71:
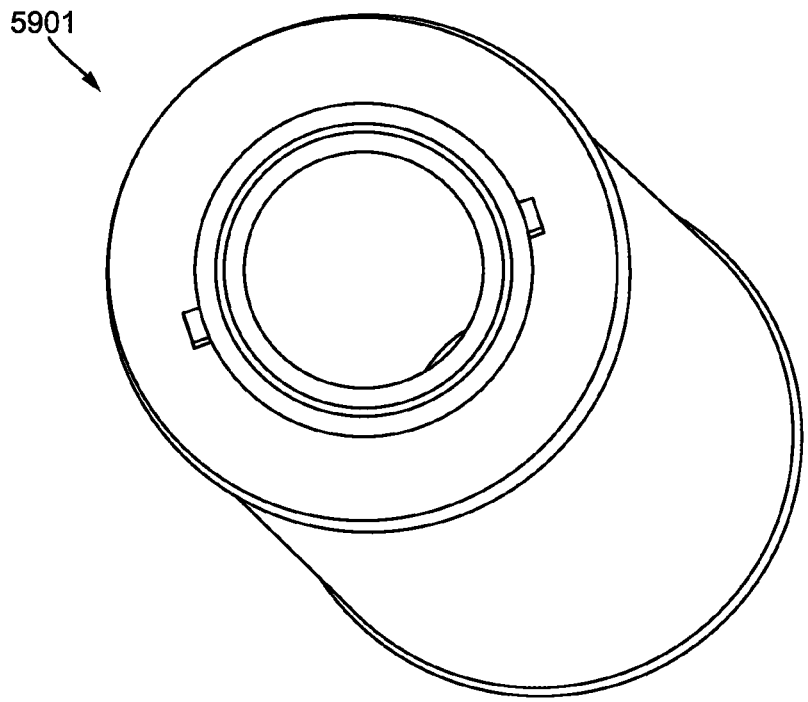
FIG. 71 shows a perspective view of another portion of a filter assembly.
Figure 72:
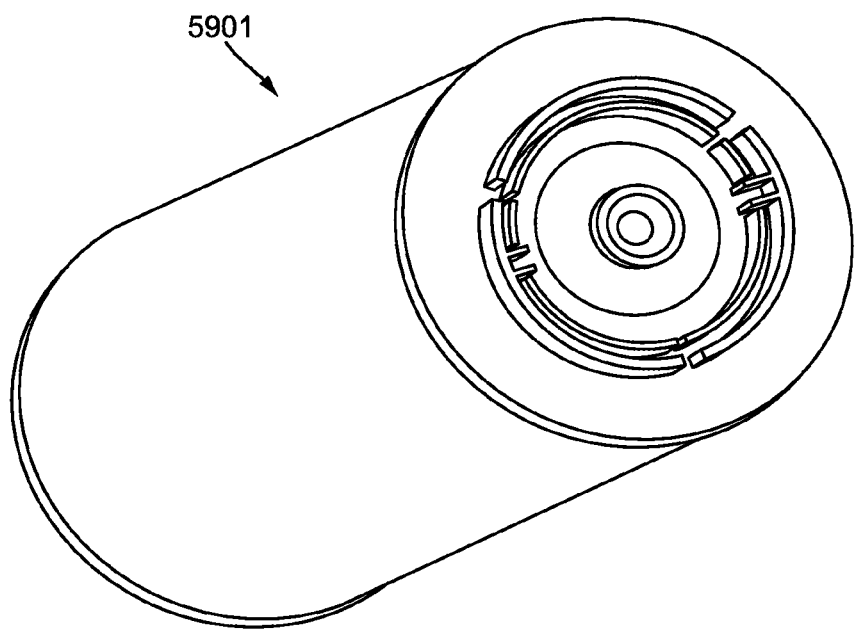
FIG. 72 shows another perspective view of the portion of a filter assembly shown in FIG. 71.
Figure 73:
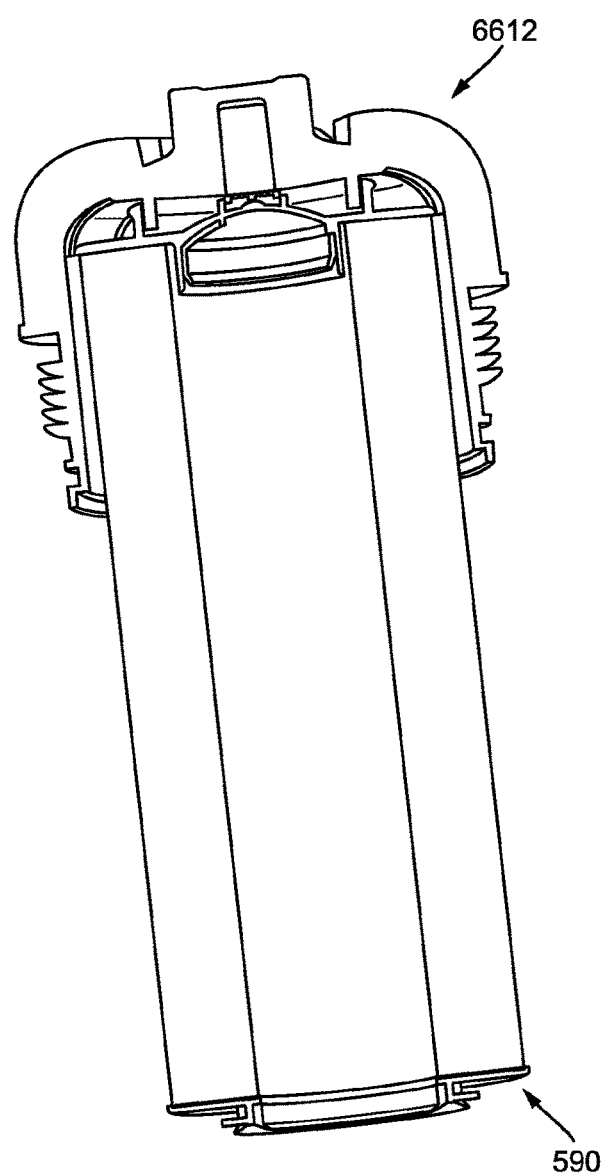
FIG. 73 shows a cross-sectional view of another portion of a filter assembly.
Figure 74:
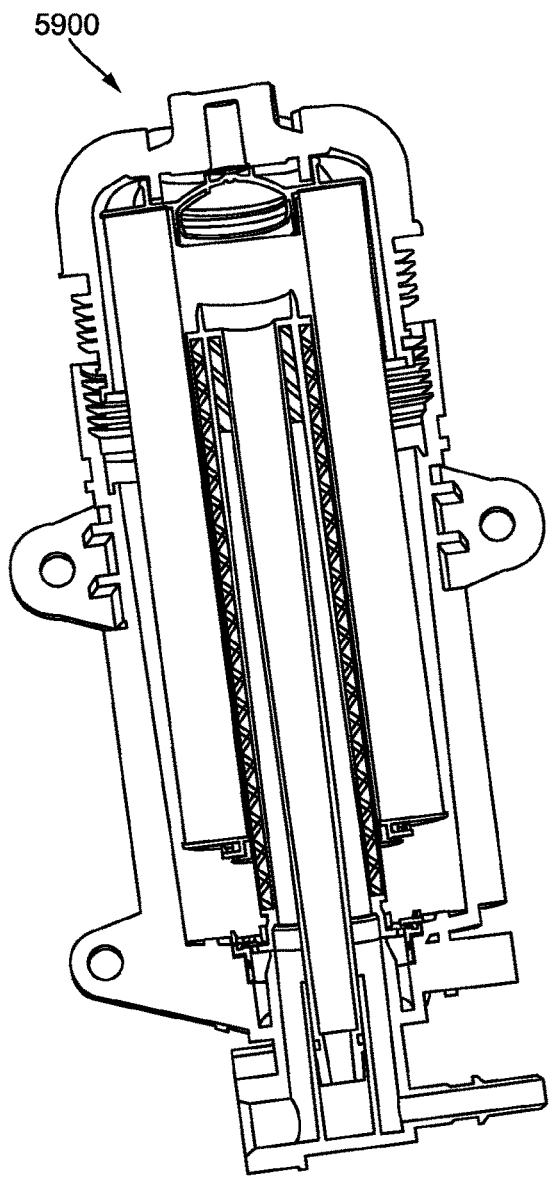
FIG. 74 shows a cross-sectional view of another portion of a filter assembly.
Figure 75:
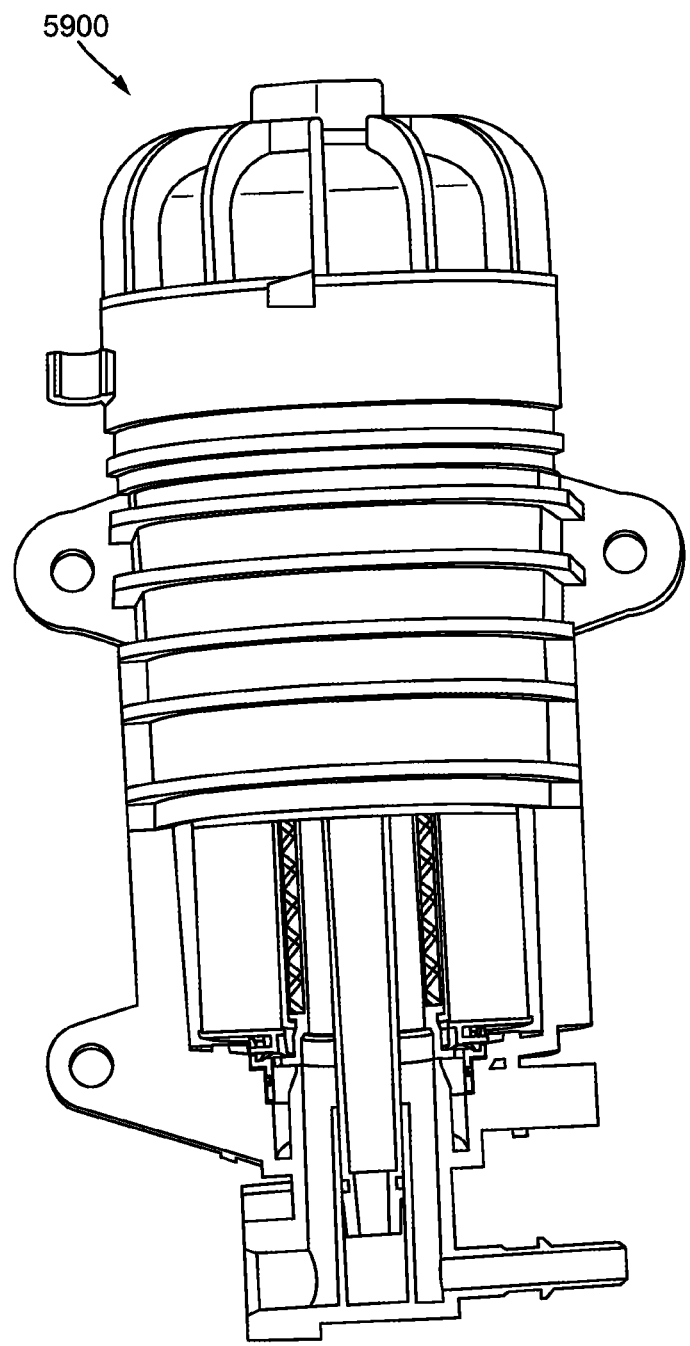
FIG. 75 shows a cross-sectional view of another portion of a filter assembly.
Figure 76:
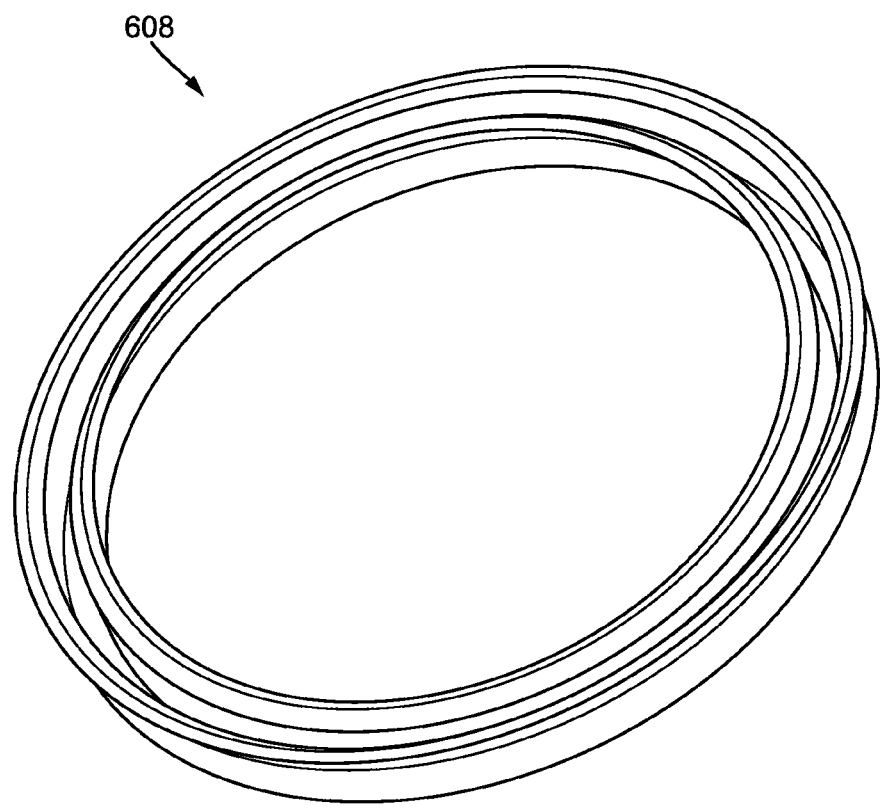
FIG. 76 shows a perspective view of another portion of a filter assembly.
Figure 77:
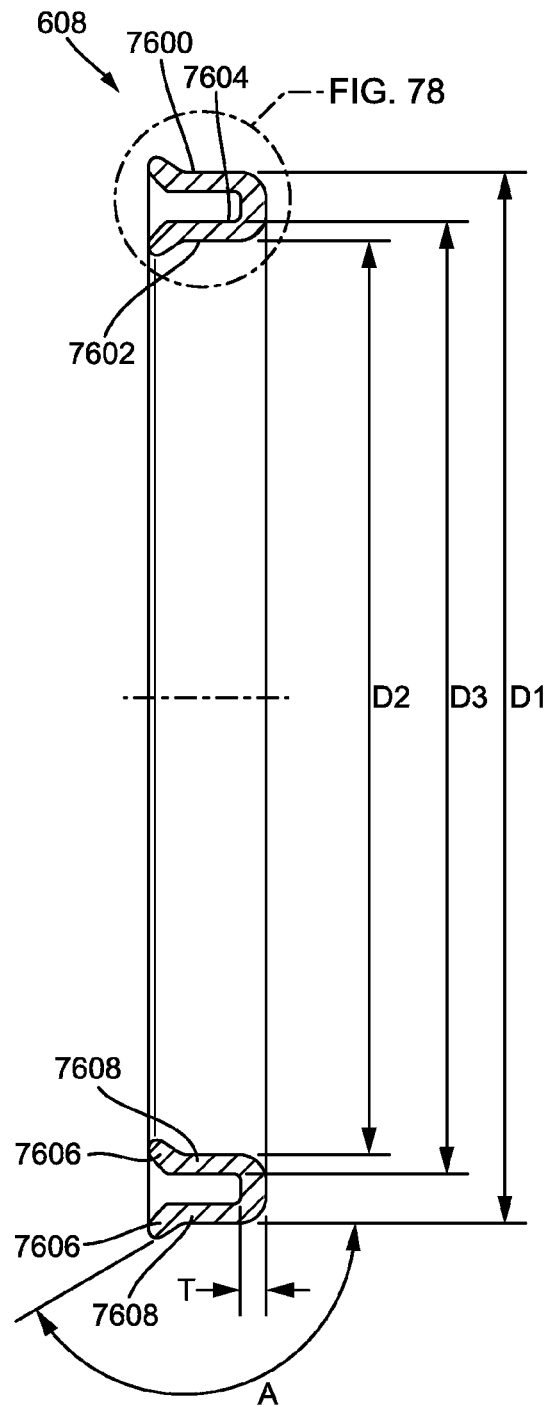
FIG. 77 shows a cross-sectional view of another portion of a filter assembly.
Figure 78:
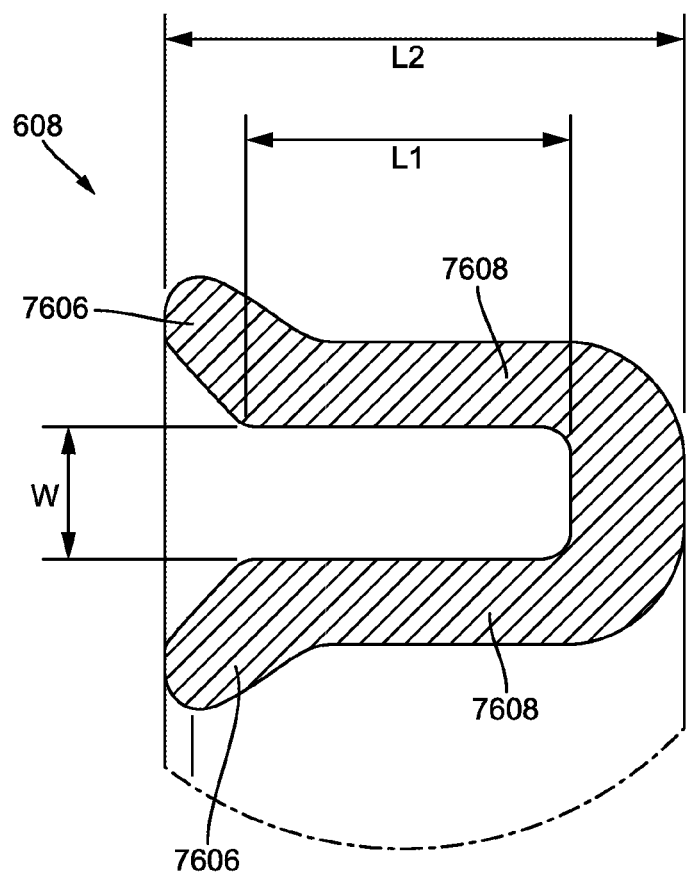
FIG. 78 shows a cross-sectional view of another portion of a filter assembly.
Figure 79:
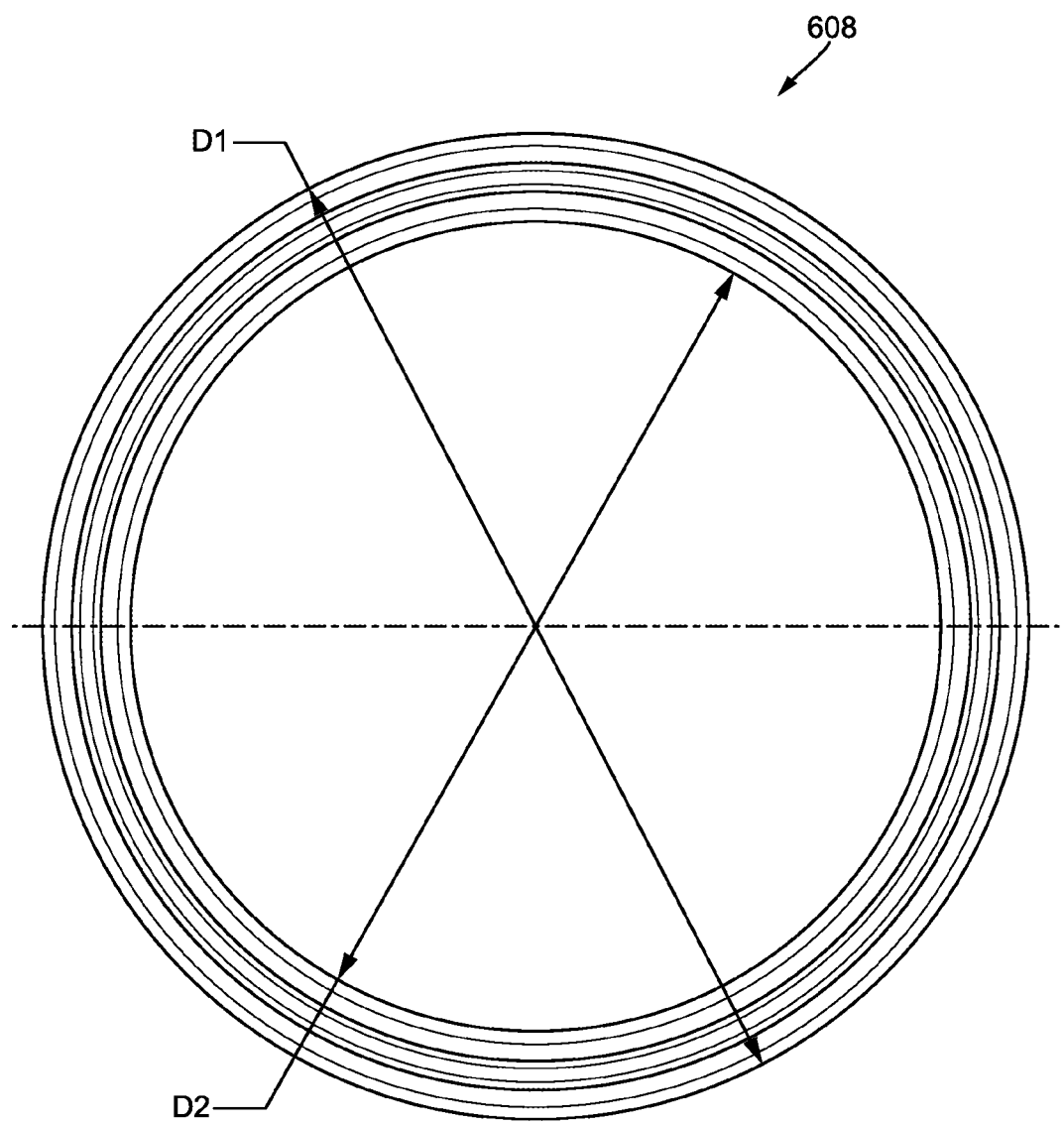
FIG. 79 shows a top view of another portion of a filter assembly.
Figure 80:
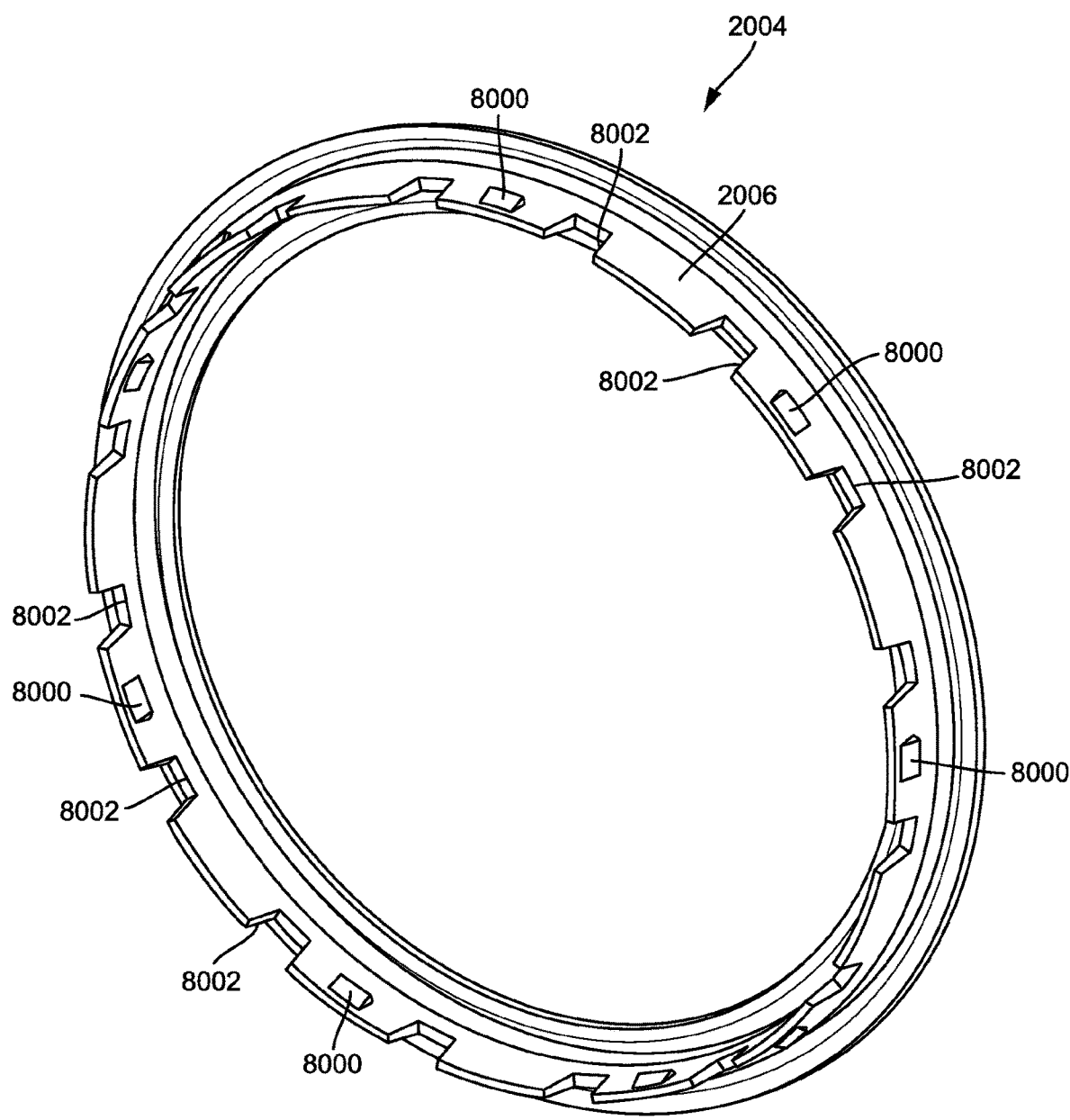
FIG. 80 shows a perspective view of another portion of a filter assembly.
Figure 81:
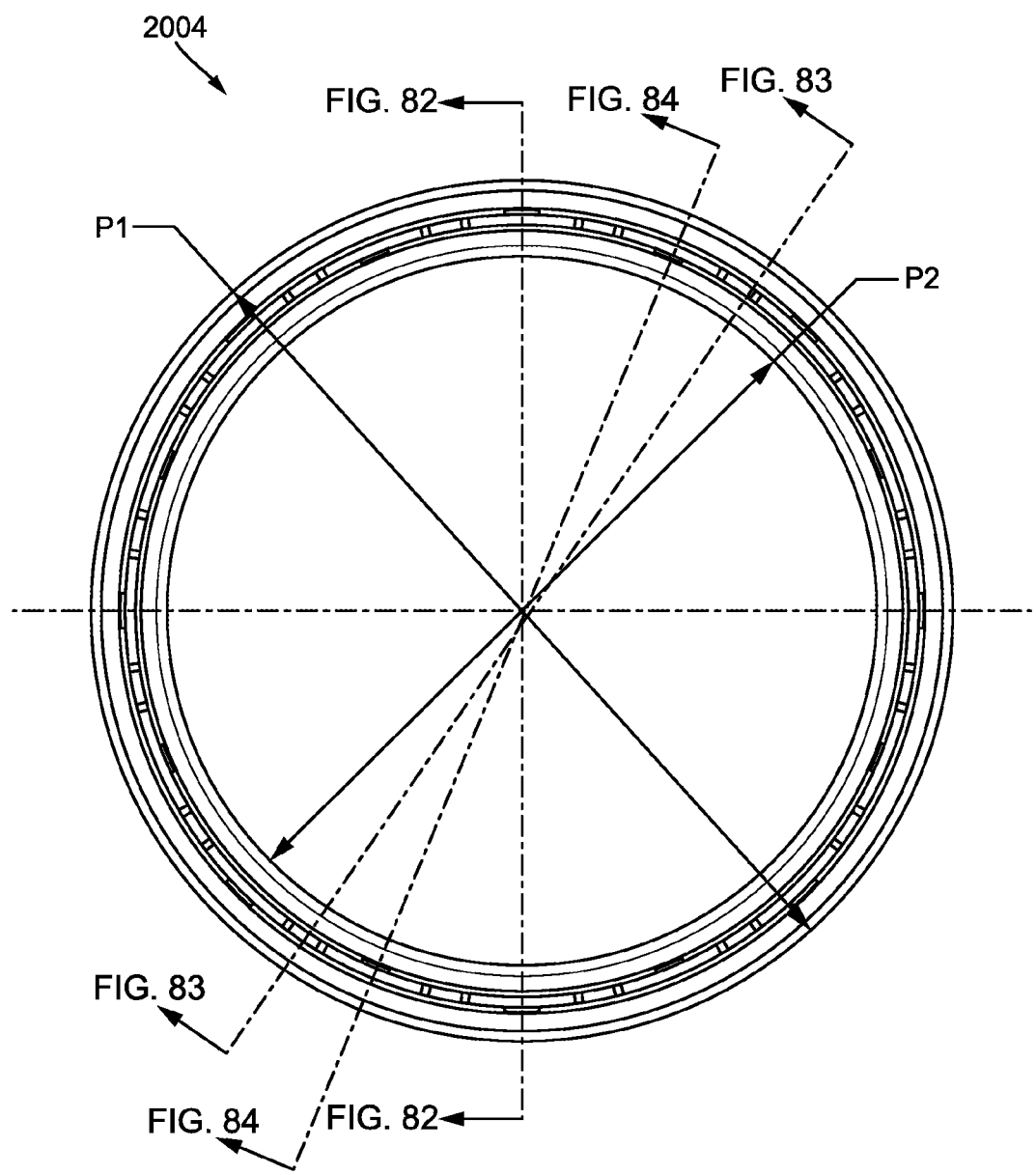
FIG. 81 shows a top view of another portion of a filter assembly.
Figure 82:
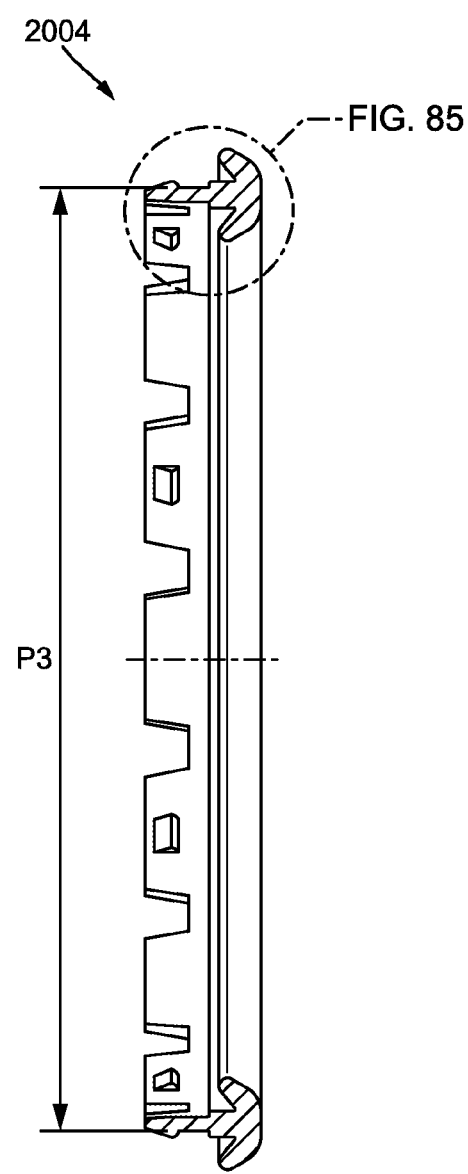
FIG. 82 shows a cross-sectional view of another portion of a filter assembly.
Figure 83:
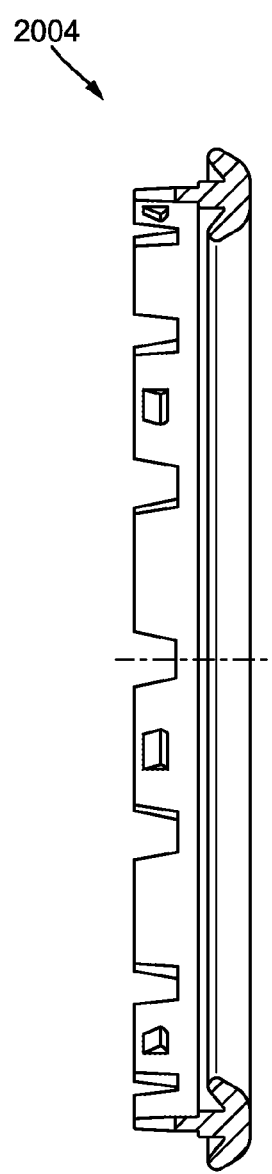
FIG. 83 shows a cross-sectional view of another portion of a filter assembly.
Figure 84:
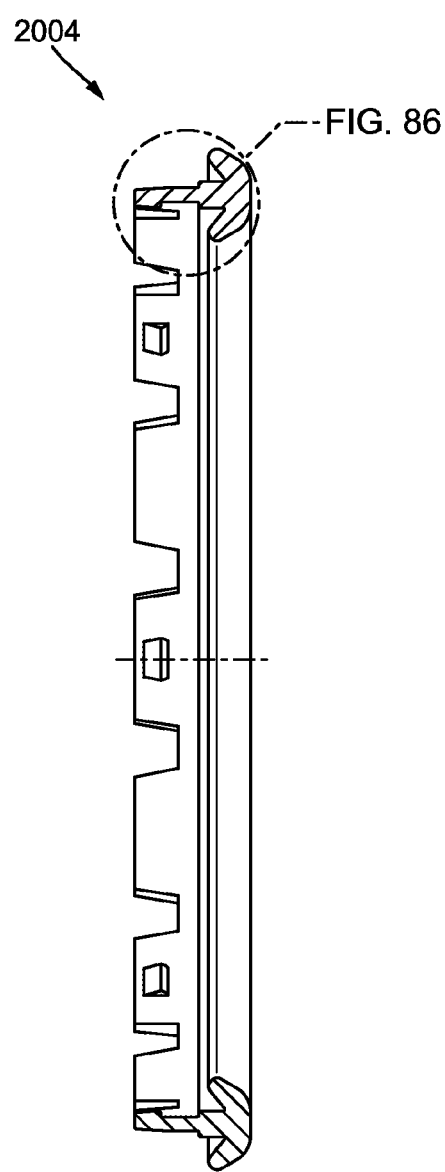
FIG. 84 shows a cross-sectional view of another portion of a filter assembly.
Figure 85:
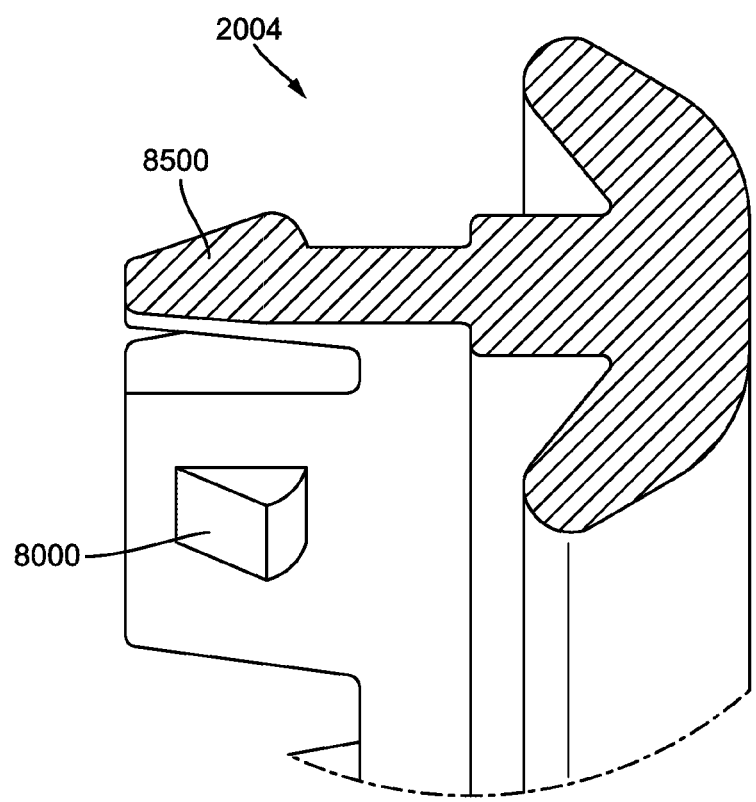
FIG. 85 shows a cross-sectional view of another portion of a filter assembly.
Figure 86:
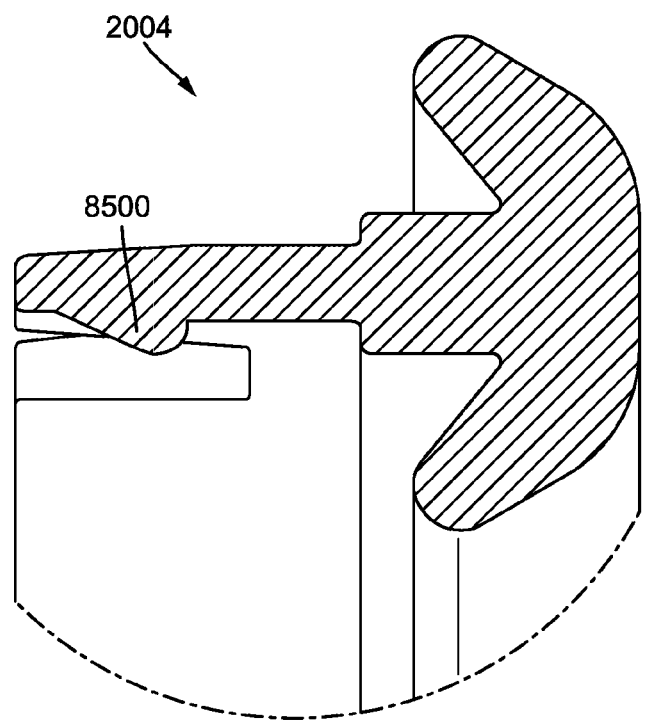
FIG. 86 shows a cross-sectional view of another portion of a filter assembly.

FIGS. 59-63 illustrate a filter assembly 5900 having a filter cartridge 5901 according to various example embodiments. The filter cartridge 5901 includes a bottom endcap 5902 and a seal member 5904. The seal member 5904 is configured to form a seal over a return passage 5906 in a filter housing 5908 upon compression of the seal member 5904 against the filter housing 5908 by a filter housing lid 5910. The filter housing lid 5910 may be included as part of the filter housing 5908. The seal member 5904 may be overmolded onto the bottom endcap 5902. FIG. 63 illustrates a seal with two lips to plug a single drain groove along both sides of the single drain groove. The single drain groove may be located between a housing and a support tube of the filter cartridge.

FIGS. 64-75 illustrate the filter assembly 5900 and components thereof according to various example embodiments. In these embodiments, the filter cartridge 5901 includes a filter cartridge core 6600 which has a filter cartridge core baseplate 6602. The filter cartridge core baseplate 6602 includes bayonet members 6604 that are configured to be received within bayonet slots 6608 in a filter housing 6610. The filter housing 6610 also have a filter housing lid 6612.

FIGS. 76-79 illustrate the seal member 608 according to an example embodiment. The seal member 608 has a seal member outer surface 7600 that is defined by a first diameter D1, a seal member inner surface 7602 that is defined by a second diameter D2, and a seal member aperture inner surface 7604 that is defined by a third diameter D3. In some embodiments, the first diameter D1 is equal to approximately 71 millimeters (mm). In some embodiments, the first diameter D1 is equal to approximately 73 mm. In various applications, the first diameter D1 is between 70.85 mm and 71.35 mm, inclusive. In various applications, the first diameter D1 is between 72.75 mm and 73.25 mm, inclusive. In some embodiments, the second diameter D2 is equal to approximately 62 mm. In some embodiments, the second diameter D2 is equal to approximately 60 mm. In various applications, the second diameter D2 is between 61.55 mm and 62.05 mm, inclusive. In various applications, the second diameter D2 is between 59.65 mm and 60.15 mm, inclusive. In some embodiments, the third diameter D3 is equal to approximately 64 mm. In various applications, the third diameter D3 is between 64.2 mm and 64.7 mm, inclusive. The seal member 608 also includes a thickness T. In various embodiments, T is equal to approximately 1.78 mm.

The seal member 608 also includes two seal member flanges 7606 and two seal member arm 7608. The seal member flange 7606 is deflected an angle A from the seal member arm 7608. In various embodiments, the angle A is equal to approximately 150 degrees. The seal member arms 7608 are separated by a width W. In some applications, the width W is equal to approximately 2 mm. In various applications, the width W is between 1.9 mm and 2.11 mm, inclusive. The seal member arm 7608 is defined by a first length L1. In some embodiments, the first length L1 is equal to approximately 5 mm. In various applications, the first length L1 is between 4.9 mm and 5.1 mm, inclusive. The seal member 608 is defined by a second length L2 (e.g., overall length, etc.). In some embodiments, the second length L2 is equal to approximately 8 mm. In various applications, the second length L2 is between 7.85 mm and 8.15 mm, inclusive.

FIGS. 80-86 illustrate the seal member 2004 according to an example embodiment. The seal member projection 2006 includes a plurality of seal locking members 8000 and a plurality of seal projection recesses 8002. In various embodiments, the seal locking members 8000 and seal projection recesses 8002 are arranged in altering fashion along the seal member projection 2006.

The seal member 2004 is defined by a first diameter P1 and a second diameter P2. In some embodiments, the first diameter P1 is equal to approximately 73 mm. In various applications, the first diameter P1 is between 72.75 mm and 73.25 mm, inclusive. In some embodiments, the second diameter P2 is equal to approximately 60 mm. In various applications, the second diameter P2 is between 59.65 mm and 60.15 mm, inclusive. The seal member projection 2006 is defined by a third diameter P3. In some embodiments, the third diameter P3 is equal to approximately 67.5 mm.

In addition to including the seal locking members 8000 on an inner surface of the seal member projection 2006, the seal member 2004 includes seal snapping members 8500 on an outer surface of the seal member projection 2006. The seal snapping members 8500 may cooperate with the seal locking members 8000 to secure the seal member 2004 within a return passage (e.g., by increasing compression of the seal locking member 8000 due to the seal snapping member 8500, etc.).

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filter assembly comprising:
a filter housing defining a first cavity and comprising:
a first surface, and
a return passage in fluid communication with the first cavity, the return passage extending through the first surface;
a filter cartridge positioned within the first cavity, the filter cartridge centered on a center axis;
an endplate coupled to a first end of the filter cartridge, the endplate configured to partially separate the filter housing from the filter cartridge, the endplate comprising an endplate aperture extending around the center axis; and
a seal member extending around the center axis, the seal member comprising:
a seal member projection configured to be received within the endplate aperture so as to couple the seal member to the endplate; and
a seal member flange integrally formed with the seal member projection and configured to be received in the return passage when the endplate is in confronting relation with the first surface, protrude from the endplate when the seal member projection is received within the endplate aperture, and deflect relative to the seal member projection when the seal member projection is received within the endplate aperture.

2. The filter assembly of claim 1, further comprising a filter housing lid selectively coupled to the filter housing and defining a second cavity coextensive with the first cavity;
wherein the filter cartridge is positioned within the first cavity and the second cavity.

3. The filter assembly of claim 1, wherein the filter housing further comprises an inlet passage in fluid communication with the return passage and configured to receive fluid from a fluid source.

4. The filter assembly of claim 3, wherein:
the filter housing further comprises a filter housing inlet in fluid communication with the inlet passage;
the filter cartridge comprises a filter cartridge inlet configured to be coupled to the filter housing inlet and a filter cartridge cavity configured to receive the fluid from the filter cartridge inlet; and
the filter cartridge is configured to provide the fluid from the filter cartridge cavity into the first cavity.

5. The filter assembly of claim 4, wherein the filter housing further comprises a filter housing outlet in fluid communication with the first cavity.

6. The filter assembly of claim 1, wherein a fluid seal is formed between the seal member flange and the return passage when the seal member flange is received in the return passage.

7. The filter assembly of claim 1, wherein:
the endplate comprises an endplate flange configured to interface with the filter cartridge and an endplate projection configured to be aligned with the return passage, the endplate projection being annular or extending annularly; and
the seal member is coupled to the endplate projection.

8. The filter assembly of claim 7, wherein the endplate projection comprises the endplate aperture.

9. The filter assembly of claim 8, wherein:
the endplate projection is configured to be received in the return passage; and
the endplate projection is separated from the return passage when the endplate projection and the seal member flange are received in the return passage.

10. The filter assembly of claim 7, wherein:
the endplate projection comprises an endplate bonding aperture; and
the seal member is coupled to the endplate projection via adhesive that extends through the endplate bonding aperture.

11. The filter assembly of claim 7, wherein:
the endplate projection comprises the endplate aperture; and
the seal member comprises a mechanical lock that is configured to be received within the endplate aperture such that the seal member is retained relative to the endplate projection.

12. The filter assembly of claim 1, further comprising an endplate insert threadably coupled to the endplate, the endplate insert configured to be received in the return passage;
wherein the seal member is coupled to the endplate via the endplate insert.

13. The filter assembly of claim 1, further comprising an endplate insert comprising an endplate insert shelf and an endplate insert projection, the endplate insert shelf configured to interface with the first end of the filter cartridge;
wherein the endplate comprises an endplate projection configured to be aligned with the return passage; and
wherein the endplate comprises an endplate shelf configured to receive the endplate insert shelf such that the endplate insert projection is disposed adjacent the endplate projection.

14. The filter assembly of claim 1, wherein the seal member is structurally integrated with the endplate.

15. The filter assembly of claim 1, wherein the seal member flange is configured to interface with the return passage and deflect towards the seal member flange upon insertion of the seal member flange within the return passage.

16. The filter assembly of claim 15, wherein:
the endplate further comprises:
an endplate flange configured to interface with the filter cartridge, and
an endplate shelf separated from the filter cartridge;
the endplate is a bottom endplate, the endplate flange comprises a bottom endplate flange, and the endplate shelf comprises a bottom endplate shelf, and further comprising a top endplate coupled to an end of the filter cartridge opposite the bottom endplate.

17. The filter assembly of claim 1, wherein:
the filter housing comprises a bottom surface that is contiguous with the first cavity; and
the return passage extends through a portion of the bottom surface.

18. The filter assembly of claim 1, wherein the return passage is configured such that the return passage extends around the seal member flange when the seal member flange is received in the return passage.

19. The filter assembly of claim 1, wherein:
the endplate further comprises:
an endplate flange configured to interface with the filter cartridge, and
an endplate projection extending from the endplate flange away from the filter cartridge, at least a portion of the endplate projection being configured to be received in the return passage when the seal member flange is received in the return passage; and
the endplate aperture is positioned in the endplate projection.

20. The filter assembly of claim 1, wherein:
the seal member has a first width when the seal member flange is not received in the return passage; and
the return passage has a second width that is less than the first width.

21. A filter assembly for a filter cartridge assembly, the filter assembly comprising a filter housing configured to receive the filter cartridge assembly and including:
an inlet passage configured to receive fluid from a fluid source;
a filter housing inlet configured to receive fluid from the inlet passage and provide fluid to the filter cartridge assembly when the filter cartridge assembly is received within the filter housing;
a filter housing outlet configured to receive fluid from the filter cartridge assembly when the filter cartridge assembly is received within the filter housing; and
a return passage configured to removably receive a seal member coupled to the filter cartridge assembly when the filter cartridge assembly is received within the filter housing, the return passage configured to receive fluid when the filter cartridge assembly is removed from the filter housing, provide fluid to the inlet passage, and be isolated from fluid within the filter cartridge assembly when the seal member is received within the return passage, the return passage fluidly coupled to the filter housing inlet via the inlet passage.

22. The filter assembly of claim 21, wherein the return passage is located underneath the filter cartridge assembly when the filter cartridge assembly is received within the filter housing.

23. The filter assembly of claim 21, further comprising a filter housing lid configured to be selectively coupled to the filter housing and configured to cooperate with the filter housing to encapsulate the filter cartridge assembly when the filter housing lid is coupled to the filter housing.

24. The filter assembly of claim 23, wherein the filter housing lid includes a retaining element configured to be selectively coupled to the filter cartridge assembly such that decoupling of the filter housing lid from the filter housing causes the filter cartridge assembly to be at least partially removed from the filter housing.

25. The filter assembly of claim 21, wherein:
the filter cartridge assembly has a filter cartridge inlet; and
the inlet passage is configured to be threadably coupled to the filter cartridge inlet.

\* \* \* \* \*